United States Patent
Sato et al.

(10) Patent No.: US 7,649,340 B2
(45) Date of Patent: Jan. 19, 2010

(54) BATTERY PACK

(75) Inventors: Bunya Sato, Fukushima (JP); Masahiko Hayakawa, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/256,934

(22) Filed: Oct. 23, 2008

(65) Prior Publication Data
US 2009/0051323 A1 Feb. 26, 2009

Related U.S. Application Data

(62) Division of application No. 10/973,163, filed on Oct. 26, 2004, now Pat. No. 7,456,614.

(30) Foreign Application Priority Data

Oct. 27, 2003 (JP) ............................ P2003-365855
Oct. 28, 2003 (JP) ............................ P2003-367233
Oct. 31, 2003 (JP) ............................ P2003-373053

(51) Int. Cl.
 *H02J 7/00* (2006.01)
(52) U.S. Cl. ........................ 320/134; 320/135; 320/136; 320/137; 320/127; 320/128
(58) Field of Classification Search ................. 320/134, 320/127, 136, 135, 138, 140, 148, 149
See application file for complete search history.

(56) References Cited

U.S. PATENT DOCUMENTS 5,828,202 A  10/1998 Tamai
5,990,664 A * 11/1999 Rahman ...................... 320/136
6,486,635 B1 * 11/2002 Matsuda et al. ............. 320/134
7,183,748 B1  2/2007 Unno et al.

* cited by examiner

*Primary Examiner*—Edward Tso
*Assistant Examiner*—Alexis Boateng
(74) *Attorney, Agent, or Firm*—Sonnenschein Nath & Rosenthal LLP

(57) ABSTRACT

A protecting circuit monitors a voltage of a secondary battery and supplies the signal to permit a discharge to a gate terminal of a discharge control FET when the voltage is equal to or more than a lower limit value in a rated voltage range. When the discharge control FET receives this signal, it is connected and passes a discharge current. In the other cases, it shuts off the discharge current. Further, when the voltage is equal to or more than a predetermined value, a signal of a voltage of a battery voltage or more is supplied from a voltage converter to the gate terminal. When the voltage is equal to or less than an upper limit value in the rated voltage range, the protecting circuit supplies the signal to permit a charge to a gate terminal of a charge control FET. Further, when the voltage is equal to or more than a predetermined value, the voltage output from the voltage converter is supplied to the gate terminal. A battery pack in which by applying the voltage of the battery voltage or more to the gate terminal, the discharge control FET and the charge control FET are controlled and an energy loss is suppressed to the minimum is provided.

8 Claims, 44 Drawing Sheets

US 7,649,340 B2

BATTERY PACK

CROSS REFERENCE TO RELATED APPLICATIONS

The present application is a divisional of U.S. patent application Ser. No. 10/973,163, filed Oct. 26, 2004, fully incorporated herein by reference for all purposes. The present application also claims priority to claims priority to Japanese Application(s) No(s). P2003-365855 filed Oct. 27, 2003, P2003-367233 filed Oct. 28, 2003, and P2003-373053 filed Oct. 31, 2003, which application(s) is/are incorporated herein by reference to the extent permitted by law.

BACKGROUND OF THE INVENTION

1. Field of the Invention

The invention relates to a battery pack of a secondary battery such as a lithium ion battery or the like.

2. Description of the Related Art

Since a lithium ion battery is weak against an overcharge or an overdischarge, generally, it has a construction of a battery pack in which a battery cell and a protecting circuit are integrated. The protecting circuit has three functions of protection against the overcharge, the overdischarge, and an overcurrent. Those protecting functions will be simply explained hereinbelow.

The overcharge protecting function will now be described. When the lithium ion battery is charged, a battery voltage continues to rise even after exceeding a full charge state. Such an overcharge state can cause a danger. Therefore, it is necessary to charge the battery at a constant current and a constant voltage and at a charge control voltage that is equal to or less than a rated value (for example, 4.2 V) of the battery. However, there is a risk of occurrence of the overcharge due to a failure of a charger or use of a charger for a different kind of battery. When the battery is overcharged and the battery voltage is equal to or more than a certain value, the protecting circuit turns off a charge control FET (Field Effect Transistor), thereby shutting off a charge current. Such a function is the overcharge protecting function.

The overcharge protecting function will be further described with reference to FIGS. 14 to 16. FIG. 14 is a schematic diagram showing a normal state of a lithium ion battery pack 150. The lithium ion battery pack 150 has two cells 152 and 153, a discharge control FET 154, and a charge control FET 155. An IC for control 151 measures voltages at a plurality of predetermined positions, controls the discharge control FET 154 and the charge control FET 155 in accordance with results of the measurement, and shuts off a flow of a current in a predetermined direction. The discharge control FET 154 is controlled by a signal which is sent from the control IC 151 through a signal line 156. The charge control FET 155 is controlled by a signal which is sent from the control IC 151 through a signal line 157.

The lithium ion battery pack 150 is connected to a load 158 and a charger 159. Arrows (A and B) indicative of the directions of the currents flowing in the discharge control FET 154 and the charge control FET 155 are shown in a lower portion of FIG. 14. That is, when the load 158 is connected, a discharge current flows in the direction shown by the arrow A and when the charger 159 is connected, a charge current flows in the direction shown by the arrow B.

FIG. 15 is a schematic diagram showing a state of a lithium ion battery pack 160 in the case where the foregoing overcharge protecting function acts. An IC for control 161 detects that, for example, a voltage of either a cell 162 or a cell 163 is equal to or more than 4.3 V±50 mV and controls so as to turn off a charge control FET 165 (a discharge control FET 164 is ON), thereby shutting off the charge current. In this case, however, since the discharge current by a load 168 flows through a parasitic diode, only a charge by a charger 169 is inhibited.

The overdischarge protecting function will now be described. When the battery is discharged down to a rated discharge terminating voltage or less and enters the overdischarge state where the battery voltage is equal to or less than, for example, 2 to 1.5 V, there is a case where the battery fails. When the battery is discharged and the battery voltage is equal to or less than a certain voltage value, the protecting circuit turns off a discharge control FET, thereby shutting off a discharge current. Such a function is the overdischarge protecting function.

FIG. 16 is a schematic diagram showing a state of a lithium ion battery pack 170 in the case where the foregoing overdischarge protecting function acts. An IC for control 171 detects that, for example, a voltage of either a cell 172 or a cell 173 is equal to or less than 3.0 V and controls so as to turn off a discharge control FET 174 (a charge control FET 175 is ON), thereby shutting off the discharge current. In this case, however, since the charge current by a charger 179 flows through a parasitic diode, only a discharge by a load 178 is inhibited.

The overcurrent protecting function will now be described. When (+) and (−) terminals of the battery are short-circuited, a large current flows, so that there is a risk of abnormal heat generation. When a discharge current of a certain value or more flows, the protecting circuit turns off the discharge control FET, thereby shutting off the discharge current. Such a function is the overcurrent protecting function.

Although an explanation in conjunction with diagrams is omitted with respect to the overcurrent protecting function, the overcurrent protecting function is fundamentally similar to the overdischarge protecting function and is controlled so that the charge control FET is turned on when the discharge control FET is OFF.

As mentioned above, in the battery pack of the secondary battery such as a lithium ion battery or the like, the protecting functions are realized by controlling the discharge control FET and the charge control FET. The control of those FETs is made by applying a battery voltage to a gate terminal of each FET. A resistance (ON resistance) between a drain and a source of the FET depends on the voltage which is applied to the gate terminal.

Such a relation is shown in a graph of FIG. 17. For example, when the gate voltage is equal to 3 V, the resistance between the drain and the source is equal to 18.1 mΩ and when the gate voltage is equal to 10 V, the resistance between the drain and the source is equal to 12.8 mΩ. In the case of the battery pack comprising one lithium ion battery, the battery voltage usually changes from 4.2 V to 3.0 V. Therefore, the resistance of the FET changes from 15.8 mΩ to 18.1 mΩ.

Hitherto, a battery pack which comprises a protecting circuit including a discharge switch, a charge switch, and the like and outputs a predetermined voltage by combining a secondary battery and a step-down type voltage converter has been disclosed in JP-A-7-7864.

However, there was not such an idea that the resistance of the FET upon discharging and that upon charging are reduced by applying a signal of a high voltage to the gate terminals of the discharge control FET and the charge control FET. Since there are such problems that when the resistance of the FET is large, a voltage drop due to the FET at the time of the large current discharge increases and the like, it is unpreferable. For example, the voltage drop at the time of the discharge of 2 A is equal to 36.2 mV when the gate voltage is equal to 3 V, and it is equal to 31.6 mV when the gate voltage is equal to 4.2 V. If the gate voltage is high, a voltage loss and an energy loss decrease, so that a duration time of a main body using such a battery pack can be prolonged.

SUMMARY OF THE INVENTION

It is, therefore, an object of the invention to provide a battery pack in which by applying a voltage of a battery voltage or more to a gate terminal, a discharge control FET and a charge control FET are controlled and an energy loss is suppressed to the minimum.

According to one aspect of the invention, there is provided a battery pack having a secondary battery therein, comprising: one or more voltage converters; a discharge control FET for permitting or shutting off a discharge of the secondary battery in accordance with a signal which is supplied to a gate terminal; and a protecting circuit for controlling in such a manner that when a voltage of the secondary battery is equal to or more than a lower limit value in a rated voltage range of the secondary battery, the signal to permit the discharge is outputted to the gate terminal of the discharge control FET, wherein an output terminal of the voltage converter is connected to the gate terminal.

According to another aspect of the invention, there is provided a battery pack having a secondary battery therein, comprising: one or more voltage converters; a discharge control FET for permitting or shutting off a discharge of the secondary battery in accordance with a signal which is supplied to a gate terminal; a charge control FET for permitting or shutting off a charge of the secondary battery in accordance with a signal which is supplied to a gate terminal; and a protecting circuit for controlling in such a manner that when a voltage of the secondary battery is equal to or more than a lower limit value in a rated voltage range of the secondary battery, the signal to permit the discharge is outputted to the gate terminal of the discharge control FET, and when the voltage of the secondary battery is equal to or less than an upper limit value in the rated voltage range of the secondary battery, the signal to permit the charge is outputted to the gate terminal of the charge control FET, wherein an output terminal of the voltage converter is connected to at least either the gate terminal of the discharge control FET or the gate terminal of the charge control FET.

According to further another aspect of the invention, there is provided a battery pack having a secondary battery therein, comprising: one or more voltage converters; a discharge control FET for permitting or shutting off a discharge of the secondary battery in accordance with a signal which is supplied to a gate terminal; a charge control FET for permitting or shutting off a charge of the secondary battery in accordance with a signal which is supplied to a gate terminal; a voltage comparator for comparing an output voltage of the voltage converter with a voltage of the secondary battery and outputting a result of the comparison as a voltage comparison signal; a first switch for the discharge control FET for controlling the supply of the signal of the voltage of the secondary battery to the gate terminal of the discharge control FET; a second switch for the discharge control FET for controlling the supply of the signal of the output voltage of the voltage converter to the gate terminal of the discharge control FET; a first switch for the charge control FET for controlling the supply of the signal of the voltage of the secondary battery to the gate terminal of the charge control FET; a second switch for the charge control FET for controlling the supply of the signal of the output voltage of the voltage converter to the gate terminal of the charge control FET; and a protecting circuit for controlling in such a manner that when the voltage of the secondary battery is equal to or more than a lower limit value in a rated voltage range of the secondary battery, the signal to permit the discharge is outputted to the gate terminal of the discharge control FET, and when the voltage of the secondary battery is equal to or less than an upper limit value in the rated voltage range of the secondary battery, the signal to permit the charge is outputted to the gate terminal of the charge control FET, wherein the protecting circuit receives the voltage comparison signal from the voltage comparator and controls opening/closure of each of the first switch for the discharge control FET, the second switch for the discharge control FET, the first switch for the charge control FET, and the second switch for the charge control FET so as to output the signal to permit the discharge or the signal to permit the charge by using the higher one of the output voltage of the voltage converter and the voltage of the secondary battery.

According to the invention, there is provided the battery pack in which by supplying a voltage which is equal to or more than the battery voltage to the gate terminals of the discharge control FET and the charge control FET, while the protection against the conventional overdischarge and overcharge is realized, the energy losses at the time of the discharge and the charge are suppressed to the minimum.

The above and other objects and features of the present invention will become apparent from the following detailed description and the appended claims with reference to the accompanying drawings.

DETAILED DESCRIPTION OF THE PRESENTLY PREFERRED EMBODIMENTS

Figure 1:
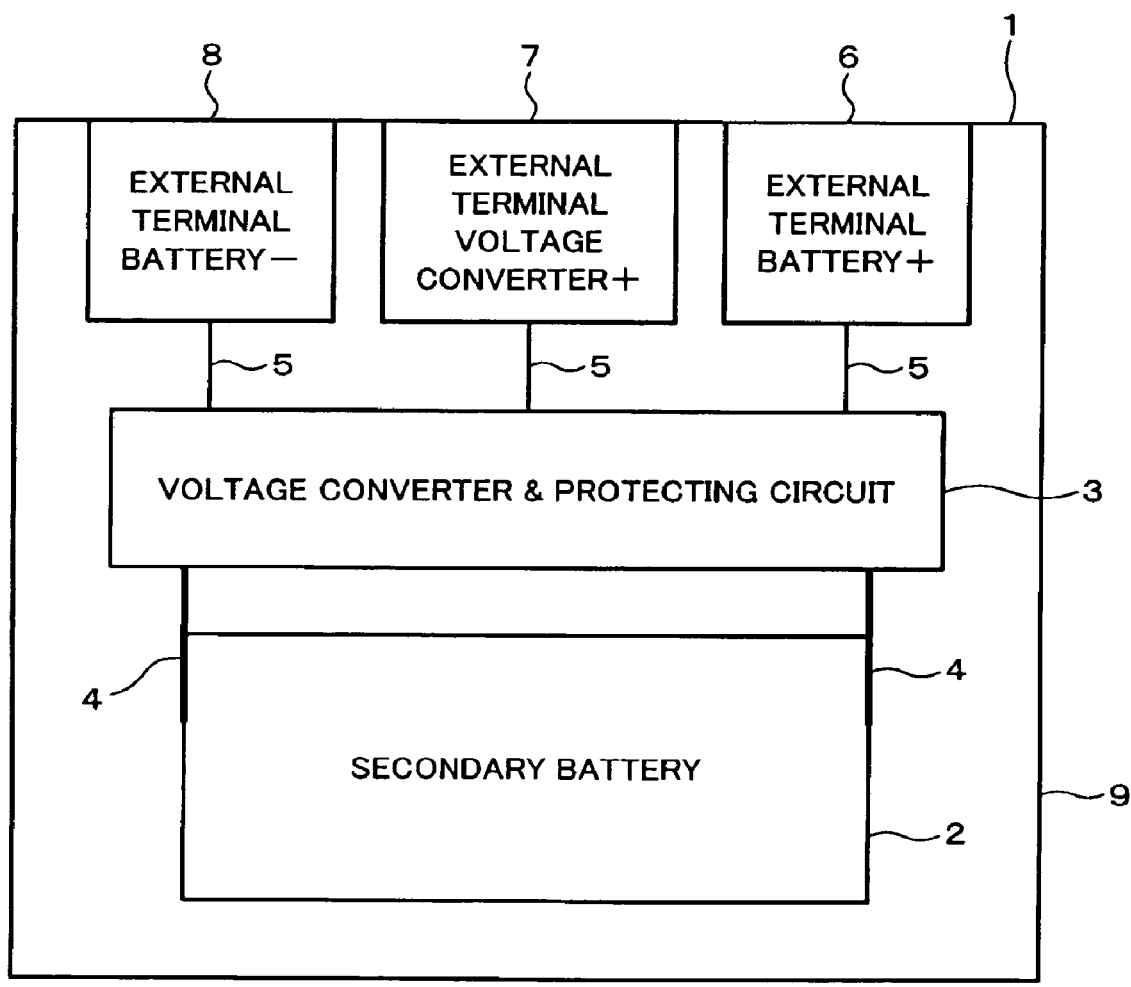
FIG. 1 is a block diagram showing a structure of a battery pack for providing a plurality of voltages.

Although a voltage which is equal to or more than a battery voltage is used as a gate voltage in the invention as mentioned above, for this purpose, it is preferable that the voltage which is equal to or more than the battery voltage can be provided in a battery pack. Therefore, first, a battery pack having such a function will be described. The invention is realized in the battery pack having such a function.

An electronic apparatus using a battery pack ordinarily needs several kinds of power voltages. For example, since the following five power voltages exist in a cellular phone, the battery pack needs to provide voltages corresponding to them, respectively.

Voltage 1: 2.9 to 4.2 V: power source for an antenna radio wave generator

Voltage 2: 3.0 V: power source for a microcomputer

Voltage 3: 5.0 V: power source for a CCD device of a digital camera, power source for driving a speaker Voltage 4: 15 V: power source 1 for a liquid crystal display Voltage 5: −10 V: power source 2 for the liquid crystal display A battery pack 1 for providing such a plurality of voltages will now be described with reference to a block diagram of FIG. 1. The battery pack 1 has a secondary battery 2 and a voltage converter and a protecting circuit 3. The voltage converter/protecting circuit 3 is connected to the secondary battery 2 through electrical wirings 4.

Any of a lithium ion battery, a lithium polymer battery, a nickel hydrogen battery, a nickel-cadmium (Ni—Cd) battery, a lithium metal battery, and the like can be used as a secondary battery 2. In the case of the lithium ion battery, for example, it is constructed as a rectangular battery and the whole secondary battery 2 is covered with a battery can of iron. In the case of the lithium polymer battery, it is sealed by a laminated film of aluminum. The secondary battery 2 can be also replaced with a secondary battery of a kind which will be developed in the future.

External terminals 6, 7, and 8 connected to the voltage converter/protecting circuit 3 through electrical wirings 5 are provided for the battery pack 1. The secondary battery 2 and the voltage converter/protecting circuit 3 are built in a relatively hard casing 9 made of a material such as plastics or the like. The external terminals are connected to the voltage converter/protecting circuit 3 through the electrical wirings 5 and the discharge or charge is executed by those wirings.

Figure 2:
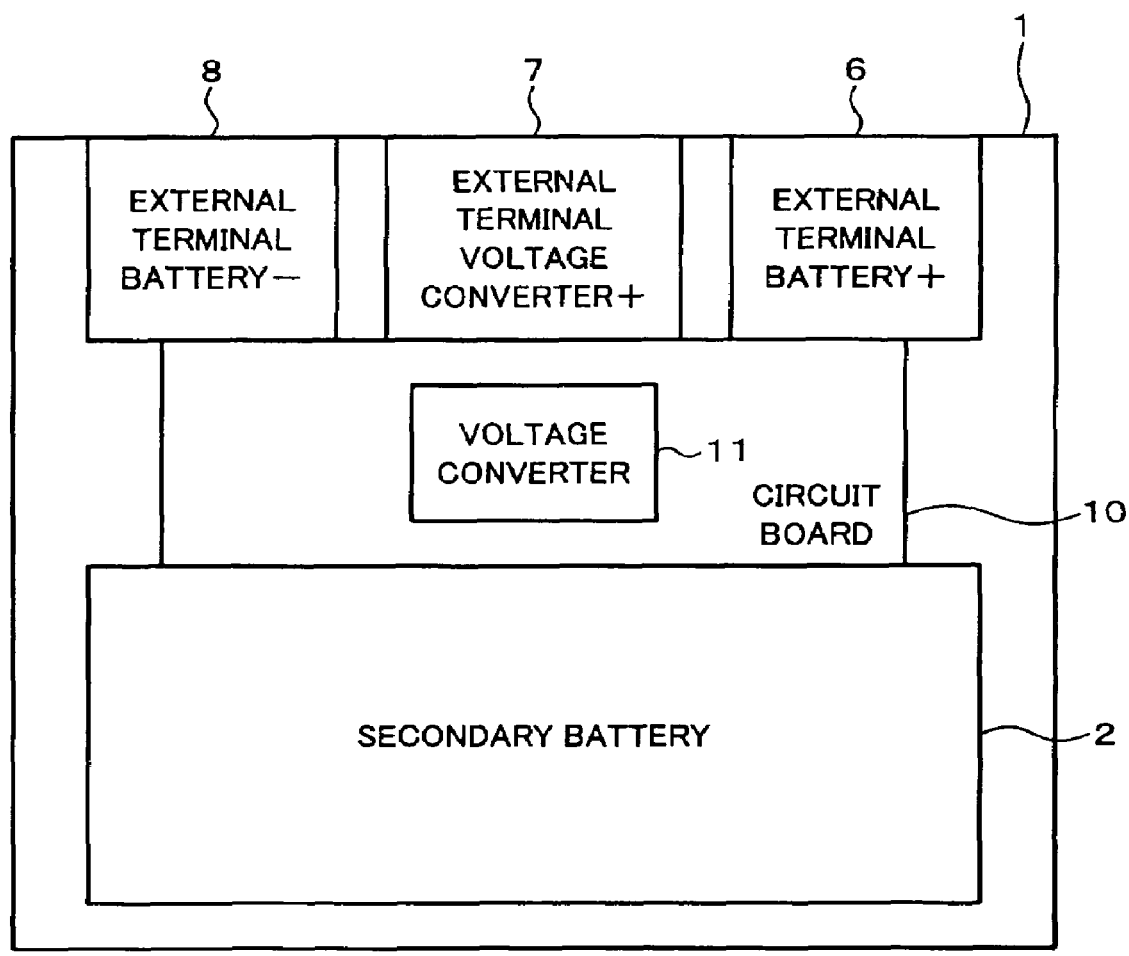
FIG. 2 is a schematic diagram showing an internal layout of the battery pack shown in FIG. 1.

FIG. 2 shows an internal layout of the battery pack 1 shown in FIG. 1. For example, a voltage converter 11 in the voltage converter/protecting circuit 3 is mounted on the obverse surface of a circuit board 10. The protecting circuit is mounted on the surface of the circuit board 10 opposite to the obverse surface. The secondary battery 2 is arranged adjacent to the circuit board 10. Unlike the construction shown in FIG. 2, the voltage converter 11 can be arranged in the secondary battery 2.

The voltage converter 11 is a circuit for forming a stabilized output voltage whose value differs from that of the input voltage (battery voltage). Any of various kinds of converters can be used as a voltage converter 11. That is, any of the following constructions can be used: a converter of a charger pump system using a capacitor and a switching element; a step-up converter (step-down converter) using a diode, an inductor, a capacitor, and a switching element; and a switching regulator using a transformer and a switching element. Further, a piezoelectric inverter using a piezoelectric transformer or a series regulator using a bipolar transistor device can be also used as a voltage converter 11. Since a very small device in about 4 mm square has already been developed as a voltage converter of the charger pump system or a switching regulator, the voltage converter 11 can be relatively easily built in the battery pack 1 together with the protecting circuit.

Figure 3:
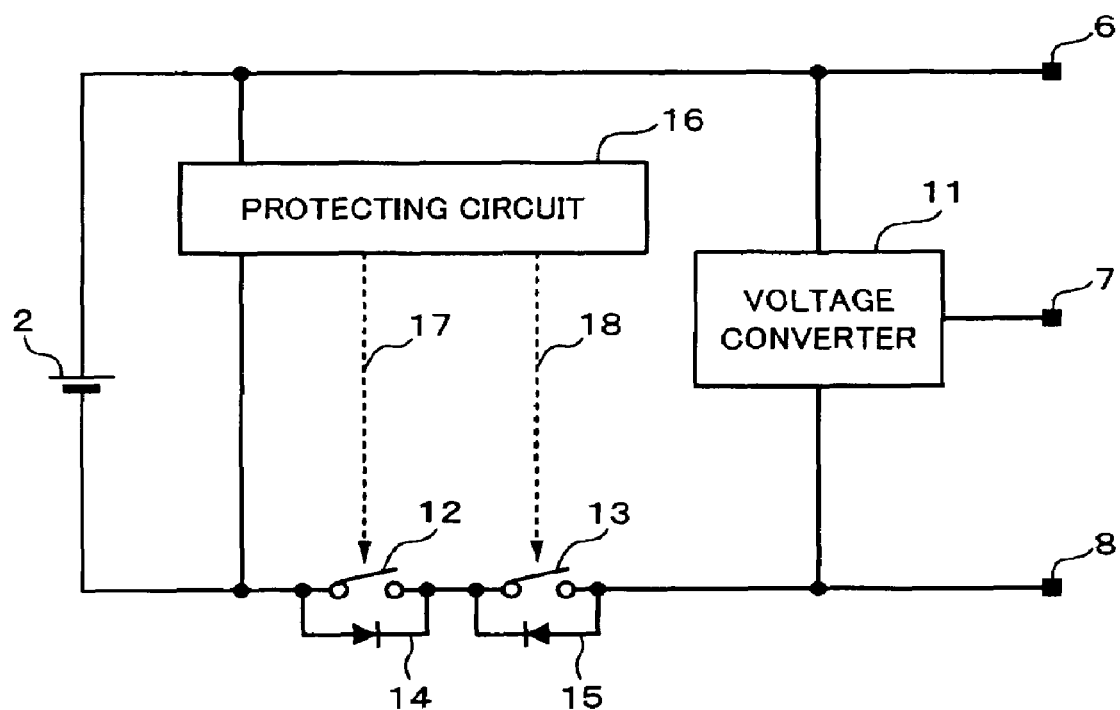
FIG. 3 is a schematic diagram showing a circuit construction of the battery pack shown in FIG. 1.

FIG. 3 shows a circuit construction of the battery pack 1 mentioned above. A positive polarity of the secondary battery 2 is connected to the external terminal 6. A negative polarity of the secondary battery 2 and the external terminal 8 are connected through a switch 12 for a discharge current and a switch 13 for a charge current. A battery voltage of the secondary battery 2 is directly outputted to a circuit between the external terminals 6 and 8. For example, the battery voltage of the secondary battery 2 is set to 2.3 to 4.3 V as a voltage value in the normal state. A voltage whose value differs from that of the battery voltage of the secondary battery 2 is supplied to a circuit between the external terminals 6 and 7.

Each of the switch 12 for the discharge current and the switch 13 for the charge current is constructed by, for example, an n-channel type FET. A parasitic diode 14 is connected in parallel with the switch 12 for the discharge current and a parasitic diode 15 is connected in parallel with the switch 13 for the charge current, respectively. The switch 12 for the discharge current and the switch 13 for the charge current are controlled by a discharge control signal 17 and a charge control signal 18 from a protecting circuit 16, respectively.

The protecting circuit 16 has a general circuit construction. The switch 12 for the discharge current and the switch 13 for the charge current are controlled by the protecting circuit 16 and the overcharge protection, the overdischarge protection, and the overcurrent protection are performed. If the battery is in the normal state where the battery voltage is within a set voltage range, both the discharge control signal 17 and the charge control signal 18 are set to "1" (this means a logical level) and the switch 12 for the discharge current and the switch 13 for the charge current are turned on. Therefore, the discharge from the secondary battery 2 to a load and the charge from the charger to the secondary battery 2 can be freely executed.

When the battery voltage is lower than the set voltage range (for example, 2.5 V or less), the discharge control signal 17 is set to "0" (this means a logical level) and the switch 12 for the discharge current is turned off, thereby inhibiting the discharge current from flowing. After that, when the charger is connected, the battery is charged through the parasitic diode 14.

When the battery voltage is higher than the set voltage range (for example, 4.3 V or more), the charge control signal 18 is set to "0" and the switch 13 for the charge current is turned off, thereby inhibiting the charge. The discharge to the load is performed through the parasitic diode 15.

Further, if the circuit between the external terminals 6 and 8 is short-circuited, there is a possibility that the overdischarge current flows and the FETs (the switch 12 for the discharge current and the switch 13 for the charge current) are broken. Therefore, when the discharge current reaches a predetermined current value, the discharge control signal 17 is set to "0" and the switch 12 for the discharge current is turned off, thereby inhibiting the discharge current from flowing.

Figure 4:
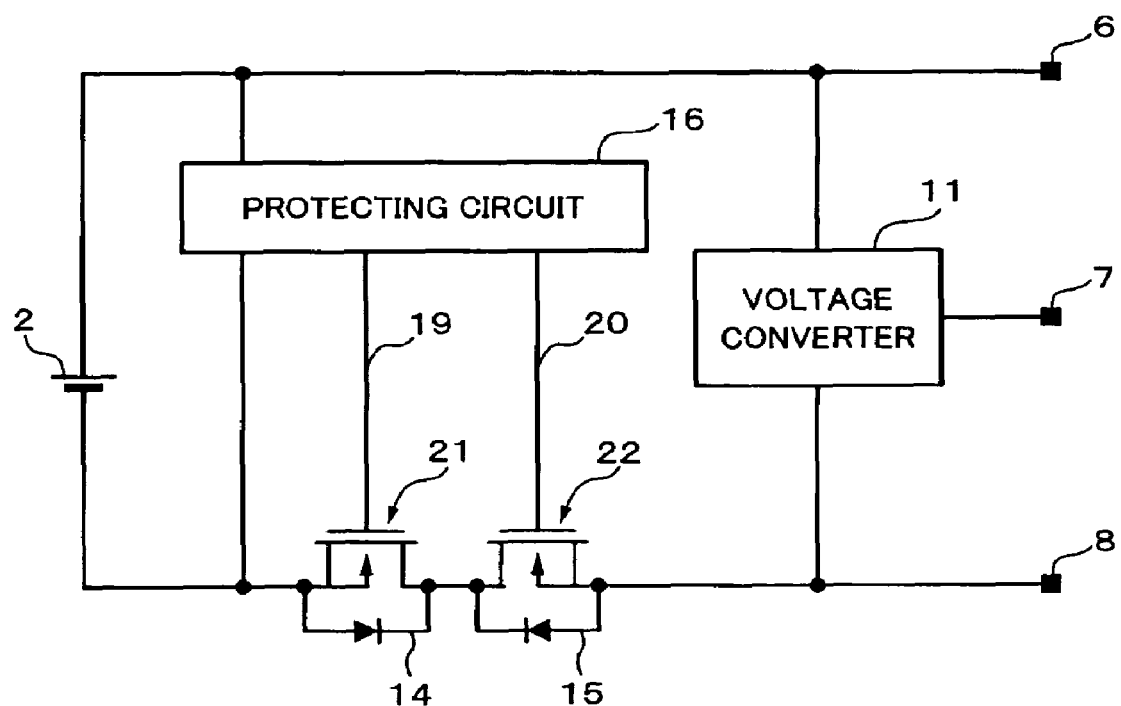
FIG. 4 is a schematic diagram showing more specifically the circuit construction of the battery pack shown in FIG. 3.

FIG. 4 is a circuit diagram showing more specifically the circuit construction shown in FIG. 3. The switch 12 for the discharge current and the switch 13 for the charge current in FIG. 3 are constructed by n-channel type FETs 21 and 22, respectively. The discharge control signal 17 is supplied to a gate terminal of the discharge control FET (n-channel type FET) 21 through a control signal line 19. The charge control signal 18 is supplied to a gate terminal of the charge control FET (n-channel type FET) 22 through a control signal line 20.

In the invention, as shown in the foregoing construction, in the battery pack 1 which can provide the voltage higher than the battery voltage of the secondary battery 2 by using the voltage converter 11, by inputting such a high voltage to the gate terminals of the discharge control FET 21 and the charge control FET 22, the proper protection of the battery pack can be realized while suppressing an energy loss of the secondary battery 2 to the minimum.

Figure 5:
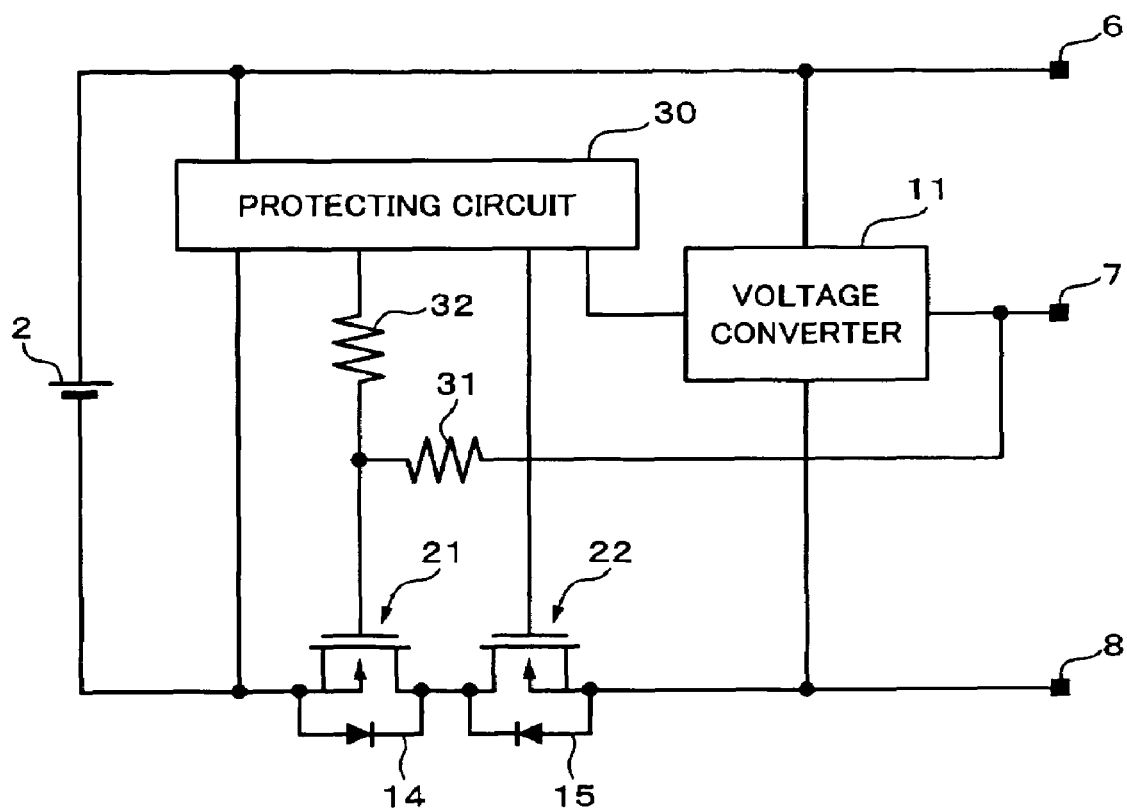
FIG. 5 is a schematic diagram showing a circuit construction of a battery pack according to the first embodiment of the invention.

The first embodiment of the invention will now be described with reference to FIG. 5. FIG. 5 shows a circuit construction of a battery pack. The secondary battery 2, the external terminals 6, 7, and 8, the voltage converter 11, the discharge control FET 21 (switch for the discharge current), the charge control FET 22 (switch for the charge current), and the parasitic diodes 14 and 15 are substantially the same as those described in conjunction with FIGS. 3 and 4. It is assumed that the same or similar component elements are designated by the same reference numerals hereinbelow. In the embodiment, an improved protecting circuit 30 is arranged and resistors 31 and 32 are further added. The voltage converter 11 is a step-up type voltage converter for supplying the voltage higher than the voltage of the secondary battery 2 which is supplied.

In the embodiment, a middle point of the resistors 31 and 32 connecting an output terminal of the voltage converter 11 and an output terminal of a discharge control signal of the protecting circuit 30 is connected to the gate terminal of the discharge control FET 21. The resistor 31 is connected to the output terminal of the voltage converter 11. The resistor 32 is connected to the output terminal of the discharge control signal of the protecting circuit 30. The output terminal of the discharge control signal of the protecting circuit 30 is connected to the gate terminal of the discharge control FET 21.

In this example, there is such an effect that a gate voltage of the discharge control FET 21 is raised and a resistance of the FET is reduced by using the two low-priced resistors.

For example, the output voltage of the voltage converter 11 is set to 10.0 V, a resistance value of the resistor 31 is set to 200 kΩ), and a resistance value of the resistor 32 is set to 100 kΩ. A gate voltage for switching the connection/disconnection of the field effect transistor FET is assumed to be 1.4 V and a voltage conversion minimum voltage of the voltage converter 11 is set to 3.0 V. For example, this minimum voltage is a voltage at which the voltage conversion is started. An example of the operation in each state will be described hereinbelow.

(1) Normal State

The voltage of the secondary battery 2 is assumed to be 3.6 V. It is a value in the normal state. In this case, the voltage at the gate terminal of the discharge control FET 21 is set to 5.7 V (voltage: $3.6+(10-3.6)\times1\div3 \rightarrow 57$ V). Therefore, the voltage at the gate terminal of the discharge control FET 21 is higher than the battery voltage due to the output voltage from the voltage converter 11 and a value of a resistance between a drain and a source of the FET becomes smaller. The normal state denotes the state where, for example, the voltage of the secondary battery lies within the rated voltage range and, in the case of the lithium ion battery, it lies within a range from 2.3 V to 4.3 V.

However, when the voltage of the secondary battery 2 is less than, for example, 3.0 V, the output voltage from the voltage converter 11 is equal to zero (0 V) as will be explained hereinafter. The protecting circuit 30 monitors the voltage of the secondary battery 2. When it is lower than a predetermined voltage (in this example, 3.0 V), the protecting circuit 30 controls the voltage converter 11 and stops the converting operation by turning off the power source or the like. Thus, current consumption of the voltage converter 11 can be suppressed.

(2) Overdischarge State

When the discharge progresses and a discharge capacitance of the secondary battery 2 decreases, the voltage of the secondary battery 2 drops to 2.3 V or less. Thus, the protecting circuit 30 determines that such a state is the overdischarge protecting state and switches the voltage at the output terminal of the discharge control signal of the protecting circuit 30 to zero (0 V). Further, since the power voltage has dropped, the voltage converter 11 stops the voltage conversion and does not output any voltage to the outside, the output voltage is set to zero (0 V). Therefore, the voltage at the gate terminal of the discharge control FET 21 is set to zero (0 V), thereby shutting off the discharge current.

(3) Overdischarge Recovery (Normal State of the Lowest Voltage)

When the charge from the charger to the secondary battery 2 is started and the discharge capacitance of the secondary battery 2 increases, the voltage of the secondary battery rises to 2.3 V or more. In this case, the protecting circuit 30 determines that such a state is the normal state and switches the voltage at the output terminal of the discharge control signal to the battery voltage (2.3 V or more). Therefore, the voltage at the gate terminal of the discharge control FET 21 is set to 1.53 V and the FET is switched to the connecting state (voltage: 2.3×2÷3→1.53 V).

If the resistance value of the resistor 31 is changed to 100 kΩ, the voltage at the gate terminal of the discharge control FET 21 is set to 1.15 V and the FET cannot be switched to the connecting state. From such a situation, it is preferable that the resistance value of the resistor 31 is about twice as large as that of the resistor 32.

(4) Voltage Converter Recovery State (Normal State of the Lowest Voltage at which the Voltage Converter can Operate)

When the charge is further continued and the discharge capacitance of the secondary battery 2 increases and the voltage of the secondary battery 2 rises to 3.0 V, the voltage converter 11 starts the voltage conversion and outputs the voltage of 10 V to the outside. Thus, the voltage at the gate terminal of the discharge control FET 21 is set to 5.3 V and its resistance value becomes smaller (voltage: 3+(10−3)×1÷3→5.3 V).

(5) Overcharge State

After the charge is further continued at the high voltage exceeding the rated voltage, the discharge capacitance of the secondary battery 2 increases and the voltage of the secondary battery 2 rises to 4.3 V. In this case, the protecting circuit 30 determines that such a state is the overvoltage charge state and switches the voltage at the output terminal of the charge control signal to zero (0 V). At this time, the charge current is shut off and the charge is stopped. The voltage at the gate terminal of the discharge control FET 21 at this time is equal to about 6 V or more (voltage: 4.3+(10−4.3)×1÷3→6.2V). Therefore, the circuit is in the state where the discharge current can flow.

Although the voltage higher than the battery voltage is provided only to the switch (discharge control FET 21) for permitting or shutting off the discharge current in the first embodiment, the high voltage can be also provided to the switch (charge control FET 22) for permitting or shutting off the charge current as shown in an embodiment, which will be explained hereinafter. It is also possible to construct so as to provide the high voltage only to the charge control FET 22 on the contrary to the first embodiment.

Figure 6:
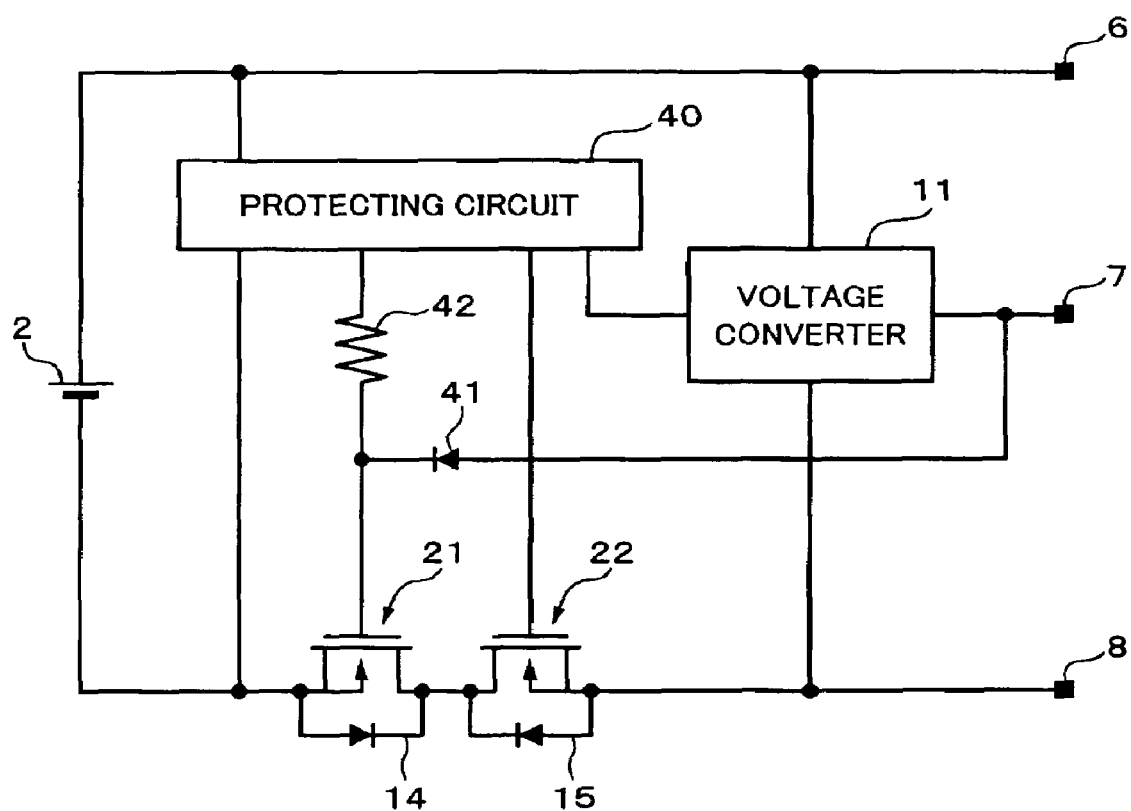
FIG. 6 is a schematic diagram showing a circuit construction of a battery pack according to the second embodiment of the invention.

The second embodiment of the invention will now be described with reference to FIG. 6. FIG. 6 shows a circuit construction of a battery pack. The secondary battery 2, the external terminals 6, 7, and 8, the voltage converter 11, the discharge control FET 21, the charge control FET 22, and the parasitic diodes 14 and 15 are substantially the same as those described in conjunction with FIGS. 3 and 4. In the embodiment, an improved protecting circuit 40 is arranged and a diode 41 and a resistor 42 are arranged.

In this embodiment, the resistor connected to the output terminal of the voltage converter 11 is changed to the diode 41 as compared with the first embodiment shown in FIG. 5. An anode terminal of the diode 41 is connected to the output terminal of the voltage converter 11 and a cathode terminal is connected to the gate terminal of the discharge control FET 21.

An output terminal of a discharge control signal of the protecting circuit 40 and the gate terminal of the discharge control FET 21 are connected through the resistor 42. According to the embodiment, the gate voltage of the discharge control FET 21 is raised and the FET resistance is reduced by using one resistor and one diode. Since the gate voltage of the FET can be raised more than that in the foregoing first embodiment, a larger FET resistance reducing effect is obtained.

For example, the output voltage of the voltage converter 11 is set to 10.0 V and a resistance value of the resistor 42 is set to 100 kΩ. The gate voltage for switching the connection/disconnection of the field effect transistor FET is assumed to be 1.4 V and the voltage conversion minimum voltage of the voltage converter 11 is set to 3.0 V. For example, this minimum voltage is a voltage at which the voltage conversion is started. Further, a forward-direction voltage drop is assumed to be 0.6 V. The operation in each state will be described hereinbelow.

(1) Normal State

The voltage of the secondary battery 2 is assumed to be 3.6 V. It is a value in the normal state. In this case, the voltage at the gate terminal of the discharge control FET 21 is set to 9.4 V (voltage: 10−0.6→9.4 V). Therefore, since the voltage at the gate terminal of the discharge control FET 21 is higher than the battery voltage, a value of a resistance between the drain and the source of the FET becomes smaller.

(2) Overdischarge State

When the discharge progresses and the discharge capacitance of the secondary battery 2 decreases, the voltage of the secondary battery 2 drops to 2.3 V or less. Thus, the protecting circuit 40 determines that such a state is the overdischarge protecting state and switches the voltage at the output terminal of the discharge control signal to zero (0 V). Further, since the power voltage has dropped, the voltage converter 11 stops the voltage conversion and does not output any voltage to the outside, so that the output voltage is set to zero (0 V). Therefore, the voltage at the gate terminal of the discharge control FET 21 is set to zero (0 V), thereby shutting off the discharge current.

(3) Overdischarge Recovery (Normal State of the Lowest Voltage)

When the charge from the charger to the secondary battery 2 is started and the discharge capacitance of the secondary battery 2 increases, the voltage of the secondary battery 2 rises to 2.3 V or more. In this case, the protecting circuit 40 determines that such a state is the normal state and switches the voltage at the output terminal of the discharge control signal to the battery voltage (2.3 V or more). Therefore, the voltage at the gate terminal of the discharge control FET 21 is set to 2.3 V and the FET is switched to the connecting state. Since the diode 41 does not allow the current in the reverse direction to flow, zero V of the output voltage of the voltage converter 11 is not concerned with the voltage at the gate terminal of the FET.

(4) Voltage Converter Recovery State (Normal State of the Lowest Voltage at which the Voltage Converter can Operate)

When the charge is further continued and the discharge capacitance of the secondary battery 2 increases and the voltage of the secondary battery 2 rises to 3.0 V, the voltage converter 11 starts the voltage conversion and outputs the voltage of 10 V to the outside. Thus, the voltage at the gate terminal of the discharge control FET 21 is set to 9.4 V and its resistance value becomes smaller (voltage: 10−0.6→9.4 V).

(5) Overcharge State

After the charge is further continued at the high voltage exceeding the rated voltage and the discharge capacitance of the secondary battery 2 increases and the voltage of the secondary battery 2 rises to 4.3 V, the protecting circuit 40 determines that such a state is the overvoltage charge state and switches the voltage at the output terminal of the charge control signal to zero (0 V). At this time, the charge current is shut off and the charge is stopped. The voltage at the gate terminal of the discharge control FET 21 is equal to about 9.6 V (voltage: 10−0.6→9.4 V). Therefore, the circuit is in the state where the discharge current can flow.

Figure 7:
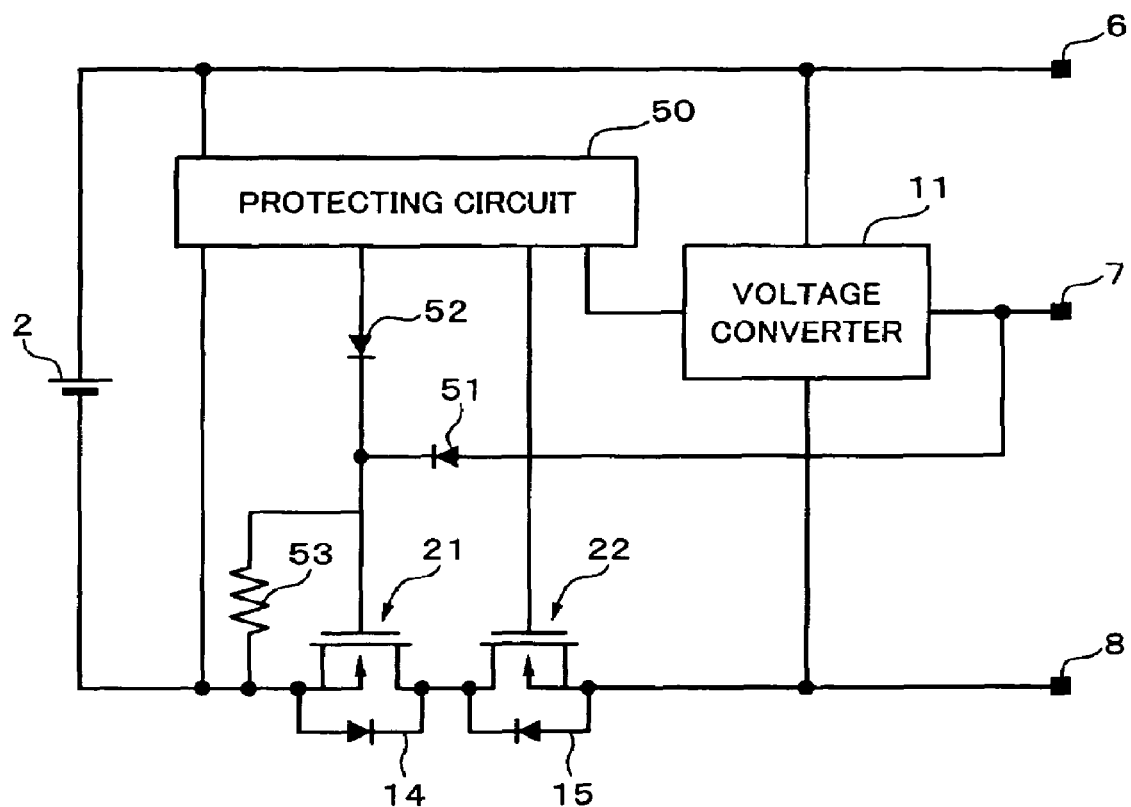
FIG. 7 is a schematic diagram showing a circuit construction of a battery pack according to the third embodiment of the invention.

The third embodiment of the invention will now be described with reference to FIG. 7. FIG. 7 shows a circuit construction of a battery pack. The secondary battery 2, the external terminals 6, 7, and 8, the voltage converter 11, the discharge control FET 21, the charge control FET 22, and the parasitic diodes 14 and 15 are substantially the same as those described in conjunction with FIGS. 3 and 4. In the embodiment, an improved protecting circuit 50 is arranged and diodes 51 and 52 and a resistor 53 are arranged.

In this embodiment, the resistor connected to the output terminal of the discharge control signal of the protecting circuit 40 is changed to the diode 52 as compared with the second embodiment shown in FIG. 6. An anode terminal of the diode 51 is connected to the output terminal of the voltage converter 11 and a cathode terminal is connected to the gate terminal of the discharge control FET 21. An anode terminal of the diode 52 is connected to the output terminal of the discharge control signal of the protecting circuit 50 and a cathode terminal is connected to the gate terminal of the discharge control FET 21. Both end terminals of the resistor 53 are connected to the gate terminal and a source terminal of the discharge control FET 21.

According to the embodiment, there is such an effect that the gate voltage of the discharge control FET 21 is raised and the FET resistance is reduced by using two diodes. Since the current flowing from the output terminal of the voltage converter 11 to the output terminal of the discharge control signal of the protecting circuit 50 is smaller in the normal state of the battery voltage than that in the second embodiment, the current consumption is small.

A resistance value of the resistor 53 is equal to, for example, about 100 kΩ to about 4.7 MΩ. Generally, it is preferably set to about 3.3 MΩ. The output voltage of the voltage converter 11 is set to 10.0 V and the gate voltage for switching the connection/disconnection of the discharge control FET 21 is assumed to be 1.4 V. The voltage conversion minimum voltage of the voltage converter 11 is set to 3.0 V (this minimum voltage is a voltage at which the voltage conversion is started). The forward-direction voltage drop of the diode is assumed to be 0.6 V. The operation in each state in this case will be described.

(1) Normal State

The operation in this case is similar to that in the normal state in the second embodiment.

(2) Overdischarge State

When the discharge progresses and the discharge capacitance of the secondary battery 2 decreases, the voltage of the secondary battery 2 drops to 2.3 V or less. Thus, the protecting circuit 50 determines that such a state is the overdischarge protecting state and switches the voltage at the output terminal of the discharge control signal of the protecting circuit 50 to zero (0 V). Further, since the power voltage has dropped, the voltage converter 11 stops the voltage conversion and does not output any voltage to the outside, so that the output voltage is set to zero (0 V). Further, the resistor 53 discharges the voltage between the gate terminal and the source terminal of the discharge control FET 21 so as to be zero (0 V). Thus, the voltage at the gate terminal of the FET is set to zero (0 V), thereby shutting off the discharge current.

(3) Overdischarge Recovery (Normal State of the Lowest Voltage)

When the charge from the charger to the secondary battery 2 is started and the discharge capacitance of the secondary battery 2 increases, the voltage of the secondary battery 2 rises to 2.3 V or more. In this case, the protecting circuit 50 determines that such a state is the normal state and switches the voltage at the output terminal of the discharge control signal of the protecting circuit 50 to the battery voltage (2.3 V or more). Therefore, the voltage at the gate terminal of the discharge control FET 21 is set to 1.7 V and the FET is switched to the connecting state (voltage: 2.3−0.6→1.7 V). Since the diode 51 does not allow the current in the reverse direction to flow, zero V of the output voltage of the voltage converter 11 is not concerned with the voltage at the gate terminal of the FET.

(4) Voltage Converter Recovery State (Normal State of the Lowest Voltage at which the Voltage Converter can Operate)

When the charge is further continued and the discharge capacitance of the secondary battery 2 increases and the voltage of the secondary battery 2 rises to 3.0 V, the voltage converter 11 starts the voltage conversion and outputs the voltage of 10 V to the outside. Thus, the voltage at the gate terminal of the discharge control FET 21 is set to 9.4 V and its resistance value becomes smaller (voltage: 10−0.6→9.4 V). At this time, no current flows from the output terminal of the voltage converter 11 to the output terminal of the discharge control signal of the protecting circuit 50 through the diodes 51 and 52.

(5) Overcharge State

The operation in this case is similar to that in the normal state in the second embodiment.

Figure 8:
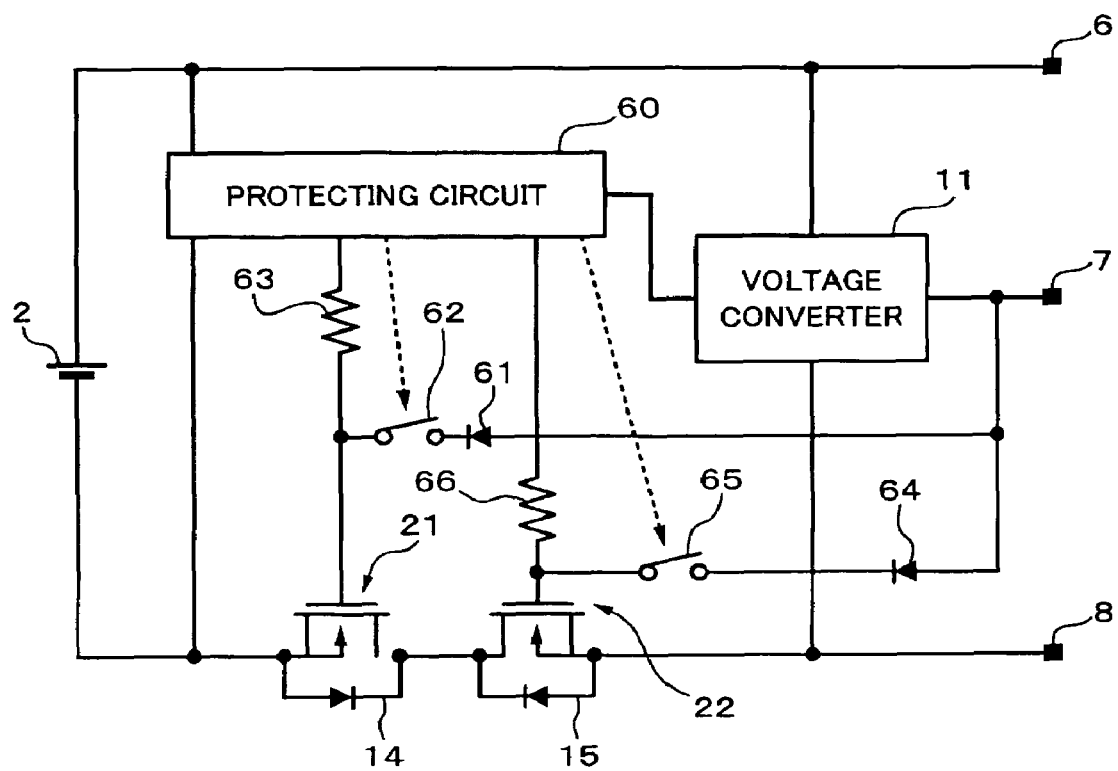
FIG. 8 is a schematic diagram showing a circuit construction of a battery pack according to the fourth embodiment of the invention.

The fourth embodiment of the invention will now be described with reference to FIG. 8. FIG. 8 shows a circuit construction of a battery pack. The secondary battery 2, the external terminals 6, 7, and 8, the voltage converter 11, the discharge control FET 21, the charge control FET 22, and the parasitic diodes 14 and 15 are substantially the same as those described in conjunction with FIGS. 3 and 4. In the embodiment, an improved protecting circuit 60 is arranged and diodes 61 and 64, resistors 63 and 66, a switch 62 for a discharge control FET, and a switch 65 for a charge control FET are added.

This embodiment has a construction in which the voltage at the output terminal of the voltage converter 11 is provided to both the gate terminal of the discharge control FET 21 and the gate terminal of the charge control FET 22. Therefore, a total resistance value of the two FETs in which the battery voltage is in the normal state is small and higher discharge efficiency is obtained. An anode terminal of the diode 61 is connected to the output terminal of the voltage converter 11 and a cathode terminal is connected to the gate terminal of the discharge control FET 21 through the switch 62 for the discharge control FET. An anode terminal of the diode 64 is connected to the output terminal of the voltage converter 11 and a cathode terminal is connected to the gate terminal of the charge control FET 22 through the switch 65 for the charge control FET.

An output terminal of the discharge control signal of the protecting circuit 60 is connected to the gate terminal of the discharge control FET 21 through the resistor 63. An output terminal of the charge control signal of the protecting circuit 60 is connected to the gate terminal of the charge control FET 22 through the resistor 66. In the discharge possible state, the protecting circuit 60 controls the switch 62 for the discharge control FET so as to enter the connecting state. In the charge possible state, the protecting circuit 60 controls the switch 65 for the charge control FET so as to enter the connecting state.

It is now assumed that the output voltage of the voltage converter 11 is equal to 10.0 V and the gate voltage for switching the connection/disconnection of the field effect transistor FET is equal to 1.4 V. The voltage conversion minimum voltage of the voltage converter 11 is set to 3.0 V (this minimum voltage is, for example, a voltage at which the voltage conversion is started) and the forward-direction voltage drop of the diode is set to 0.6 V. The operation in each state in this case will be described.

(1) Normal State

The voltage of the secondary battery 2 is assumed to be 3.6 V. It is a value in the normal state. The switch 62 for the discharge control FET is in the connecting state. Thus, the voltage at the gate terminal of the discharge control FET 21 is set to 9.4 V (voltage: 10−0.6→9.4 V). Similarly, the voltage at the gate terminal of the charge control FET 22 is equal to 9.4 V. Therefore, the voltage at the gate terminal of the discharge control FET 21 is higher than the battery voltage, so that the value of the resistance between the drain and the source of the FET becomes smaller. This is true of the charge control FET 22.

(2) Overdischarge State

When the discharge progresses and the discharge capacitance of the secondary battery 2 decreases, the voltage of the secondary battery 2 drops to 2.3 V or less. In this case, the protecting circuit 60 determines that such a state is the overdischarge protecting state and switches the voltage at the output terminal of the discharge control signal of the protecting circuit 60 to zero (0 V). Further, the protecting circuit 60 switches the switch 62 for the discharge control FET to the open state. Therefore, the voltage at the gate terminal of the discharge control FET 21 is set to zero (0 V), thereby shutting off the discharge current.

(3) Overdischarge Recovery (Normal State of the Lowest Voltage)

When the charge from the charger to the secondary battery 2 is started and the discharge capacitance of the secondary battery 2 increases, the voltage of the secondary battery 2 rises to 2.3 V or more. In this case, the protecting circuit 60 determines that such a state is the normal state and switches the voltage at the output terminal of the discharge control signal of the protecting circuit 60 to the battery voltage (2.3 V or more). Therefore, the voltage at the gate terminal of the discharge control FET 21 is set to 2.3 V and the FET is switched to the connecting state. The switch 62 for the discharge control FET and the switch 65 for the charge control FET are in the connecting state. Since the current in the reverse direction does not flow in the diode, zero V of the output voltage of the voltage converter 11 is not concerned with the voltage at the gate terminal of the FET.

(4) Voltage Converter Recovery State (Normal State of the Lowest Voltage at which the Voltage Converter can Operate)

When the charge is further continued and the discharge capacitance of the secondary battery 2 increases and the voltage of the secondary battery 2 rises to 3.0 V, the voltage converter 11 starts the voltage conversion and outputs the voltage of 10 V to the outside. The switch 62 for the discharge control FET and the switch 65 for the charge control FET are in the connecting state. Thus, the voltage at the gate terminal of the discharge control FET 21 is set to 9.4 V and its resistance value becomes smaller (voltage: 10−0.6→9.4 V). Further, the voltage at the gate terminal of the charge control FET 22 is also set to 9.4 V.

(5) Overcharge State

After the charge is further continued at the high voltage exceeding the rated voltage, the discharge capacitance of the secondary battery 2 increases and the voltage of the secondary battery 2 rises to 4.3 V. In this case, the protecting circuit 60 determines that such a state is the overvoltage charge state and switches the voltage at the output terminal of the charge control signal of the protecting circuit 60 to zero (0 V). The protecting circuit 60 transmits a predetermined control signal and switches the switch 65 for the charge control FET to the open state. Thus, the voltage at the gate terminal of the charge control FET 22 is set to zero (0 V). At this time, the charge current is shut off and the charge is stopped. In this case, the voltage at the gate terminal of the discharge control FET 21 is equal to about 9.4 V (voltage: 10−0.6→9.4 V). The circuit is in the state where the discharge current can flow.

Figure 9:
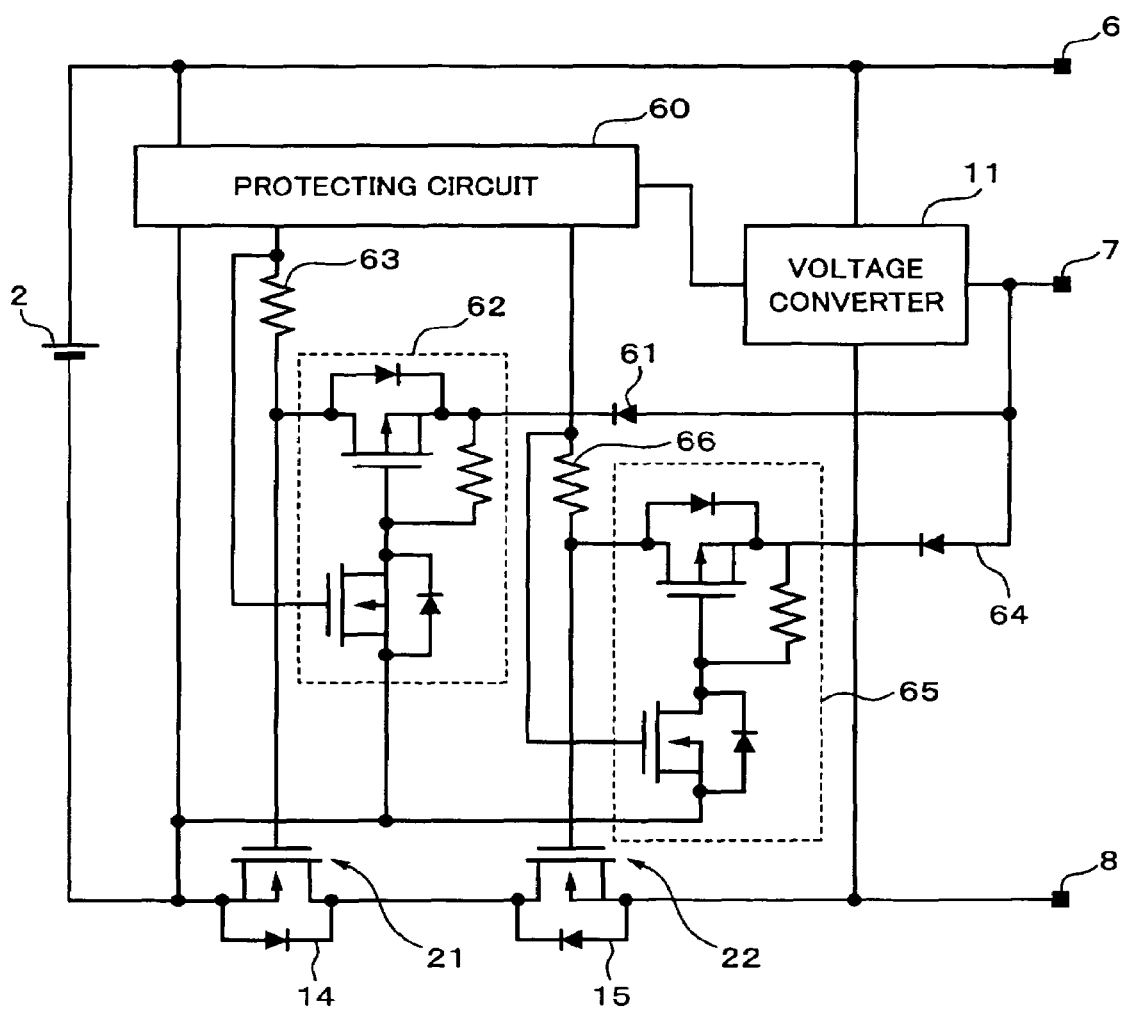
FIG. 9 is a schematic diagram showing the circuit construction of FIG. 8 in more detail.

A circuit diagram of FIG. 9 is substantially equivalent to that of FIG. 8 and shows the switch 62 for the discharge control FET and the switch 65 for the charge control FET in FIG. 8 in more detail. In the example of FIG. 9, each of those switches 62 and 65 is constructed by one n-channel type FET, one p-channel type FET, one resistor, and two diodes.

In the construction of the circuit shown in FIG. 9, in a manner similar to the construction of FIG. 8, the output terminal voltage of the voltage converter 11 is provided to both the gate terminal of the discharge control FET 21 and the gate terminal of the charge control FET 22. The anode terminal of the diode 61 is connected to the output terminal of the voltage converter 11 and the cathode terminal is connected to a source terminal of the p-channel type FET of the switch 62 for the discharge control FET. A drain terminal of the p-channel type FET of the switch 62 for the discharge control FET is connected to the gate terminal of the discharge control FET 21. Both end terminals of the resistor of the switch 62 for the discharge control FET are connected to a gate terminal and the source terminal of the p-channel type FET.

A drain terminal of the n-channel type FET of the switch 62 for the discharge control FET is connected to the gate terminal of the p-channel type FET and a gate terminal is connected to the output terminal of the discharge control signal of the protecting circuit 60. A source terminal is connected to a minus terminal of the secondary battery 2. The output terminal of the discharge control signal of the protecting circuit 60 is connected to the gate terminal of the discharge control FET 21 through the resistor 63.

The anode terminal of the diode 64 is connected to the output terminal of the voltage converter 11 and the cathode terminal is connected to a source terminal of the p-channel type FET of the switch 65 for the charge control FET. A drain terminal of the p-channel type FET is connected to the gate terminal of the charge control FET 22. Both end terminals of the resistor of the switch 65 for the charge control FET are connected to a gate terminal and the source terminal of the p-channel type FET. A drain terminal of the n-channel type FET of the switch 65 for the charge control FET is connected to the gate terminal of the p-channel type FET. A gate terminal of the n-channel type FET is connected to the output terminal of the charge control signal of the protecting circuit 60. A source terminal is connected to the minus terminal of the secondary battery 2.

The output terminal of the charge control signal of the protecting circuit 60 is connected to the gate terminal of the charge control FET 22 through the resistor 66.

Figure 10:
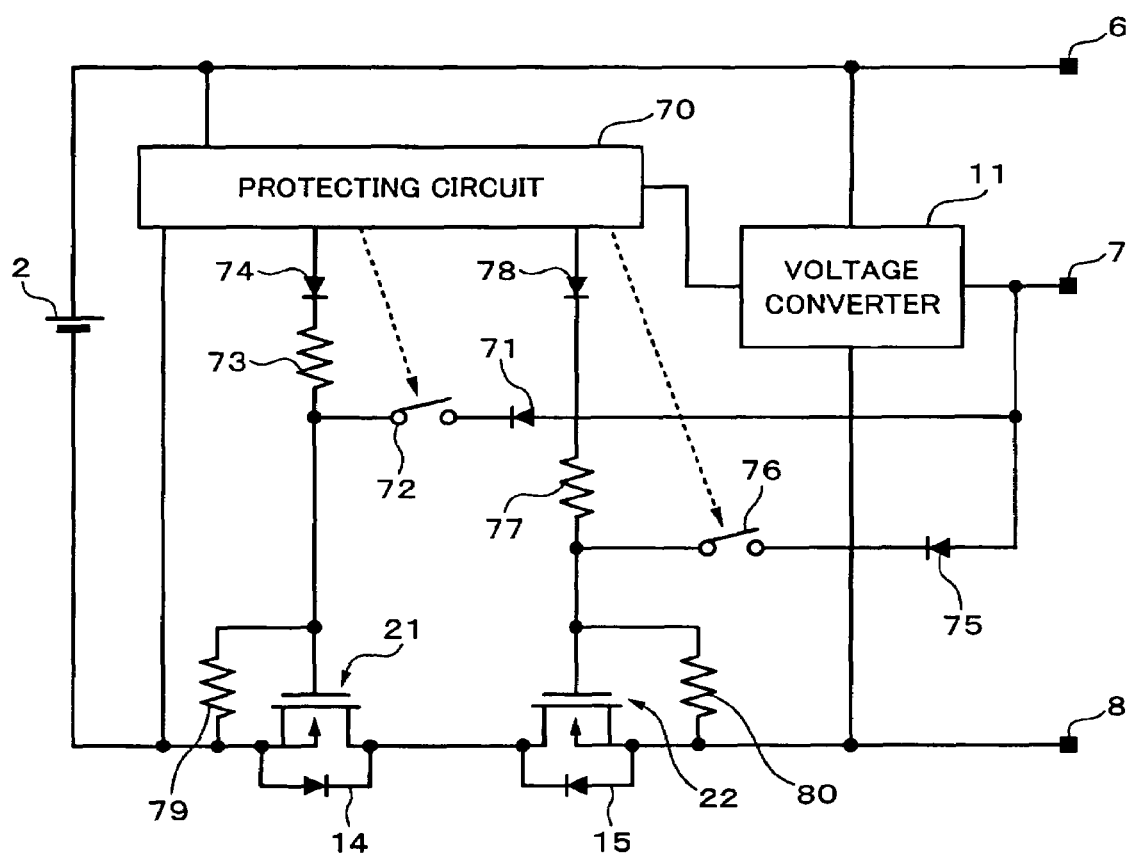
FIG. 10 is a schematic diagram showing a circuit construction of a battery pack according to the fifth embodiment of the invention.

The fifth embodiment of the invention will now be described with reference to FIG. 10. FIG. 10 shows a circuit construction of a battery pack. The secondary battery 2, the external terminals 6, 7, and 8, the voltage converter 11, the discharge control FET 21, the charge control FET 22, and the parasitic diodes 14 and 15 are substantially the same as those described in conjunction with FIGS. 3 and 4. In the embodiment, an improved protecting circuit 70 is arranged and diodes 71, 74, 75, and 78, resistors 73, 77, 79, and 80, a switch 72 for a discharge control FET, and a switch 76 for a charge control FET are added.

According to this embodiment, the output voltage from the voltage converter 11 is provided to both the discharge control FET 21 and the charge control FET 22. Therefore, a total resistance value of the two FETs in the case where the battery voltage is in the normal state is small and higher discharge efficiency is obtained.

An anode of the diode 71 is connected to the output terminal of the voltage converter 11 and a cathode is connected to the gate terminal of the discharge control FET 21 through the switch 72 for the discharge control FET. An anode of the diode 75 is connected to the output terminal of the voltage converter 11 and a cathode is connected to the gate terminal of the charge control FET 22 through the switch 76 for the charge control FET.

An output terminal of the discharge control signal of the protecting circuit 70 is connected to the gate terminal of the discharge control FET 21 through the diode 74 and the resistor 73. An output terminal of the charge control signal of the protecting circuit 70 is connected to the gate terminal of the charge control FET 22 through the diode 78 and the resistor 77. In the discharge possible state, the protecting circuit 70 controls the switch 72 for the discharge control FET so that it can be connected. In the charge possible state, the protecting circuit 70 controls the switch 76 for the charge control FET so that it can be connected.

According to this embodiment, the current consumption can be reduced more than that in the fourth embodiment. In this example, in the normal state of the battery voltage, the current flowing from the output terminal of the voltage converter 11 to the output terminal of the discharge control signal of the protecting circuit 70 through the resistor 73 is decreased. This is because the diode 74 does not allow the current to flow in a predetermined direction.

Further, the current flowing from the output terminal of the voltage converter 11 to the output terminal of the charge control signal of the protecting circuit 70 through the resistor 77 is decreased. This is because the diode 78 does not allow the current to flow in a predetermined direction.

It is now assumed that the output voltage of the voltage converter 11 is equal to 10.0 V and the gate voltage for switching the connection/disconnection of the field effect transistor FET is equal to 1.4 V. The voltage conversion minimum voltage of the voltage converter 11 is set to 3.0 V (this minimum voltage is a voltage at which the voltage conversion is started) and the forward-direction voltage drop of the diode is set to 0.6 V. The operation in each state in this case will be described.

(1) Normal State

The voltage of the secondary battery 2 is assumed to be 3.6 V. It is a value in the normal state. The switch 72 for the discharge control FET and the switch 76 for the charge control FET are in the connecting state. Thus, the voltage at the gate terminal of the discharge control FET 21 is set to 9.4 V (voltage: 10−0.6→9.4 V). The voltage at the output terminal of the discharge control signal of the protecting circuit 70 is equal to about 3.6 V. Since the diode 74 exists, 9.4 V of the voltage at the gate terminal of the discharge control FET 21 is not applied to the output terminal of the discharge control signal of the protecting circuit 70. Therefore, the protecting circuit 70 is not broken.

Similarly, since the voltage at the gate terminal of the charge control FET 22 is equal to 9.4 V, the voltage at the gate terminal of the discharge control FET 21 is higher than the battery voltage. Thus, the value of the resistance between the drain and the source of the FET becomes smaller.

(2) Overdischarge State

When the discharge progresses and the discharge capacitance of the secondary battery 2 decreases, the voltage of the secondary battery 2 drops to 2.3 V or less. In this case, the protecting circuit 70 determines that such a state is the overdischarge protecting state and switches the voltage at the output terminal of the discharge control signal of the protecting circuit 70 to zero (0 V). Further, the protecting circuit 70 switches the switch 72 for the discharge control FET to the open state. The resistor 79 connected between the gate terminal and the source terminal of the discharge control FET 21 functions so as to set the gate voltage to zero (0 V). Therefore, the voltage at the gate terminal of the discharge control FET 21 is set to zero (0 V), thereby shutting off the discharge current.

(3) Overdischarge Recovery (Normal State of the Lowest Voltage)

When the charge from the charger to the secondary battery 2 is started and the discharge capacitance of the secondary battery 2 increases, the voltage of the secondary battery 2 rises to 2.3 V or more. In this case, the protecting circuit 70 determines that such a state is the normal state and switches the voltage at the output terminal of the discharge control signal of the protecting circuit 70 to the battery voltage (2.3 V or more). Therefore, the voltage at the gate terminal of the discharge control FET 21 is set to 2.3 V and the FET is switched to the connecting state. The switch 72 for the discharge control FET and the switch 76 for the charge control FET are in the connecting state. Since the current in the reverse direction does not flow in the diode, zero V of the output voltage of the voltage converter 11 is not concerned with the voltage at the gate terminal of the FET.

(4) Voltage Converter Recovery State (Normal State of the Lowest Voltage at which the Voltage Converter can Operate)

When the charge is further continued and the discharge capacitance of the secondary battery 2 increases and the voltage of the secondary battery 2 rises to 3.0 V, the voltage converter 11 starts the voltage conversion and outputs the voltage of by to the outside. The switch 72 for the discharge control FET and the switch 76 for the charge control FET are in the connecting state. Thus, the voltage at the gate terminal of the discharge control FET 21 is set to 9.4 V and its resistance value becomes smaller (voltage: 10−0.6→9.4 V). Further, the voltage at the gate terminal of the charge control FET 22 is also set to 9.4 V.

(5) Overcharge State

After the charge is further continued at the high voltage exceeding the rated voltage, the discharge capacitance of the secondary battery 2 increases and the voltage of the secondary battery 2 rises to 4.3 V. In this case, the protecting circuit 70 determines that such a state is the overvoltage charge state and switches the voltage at the output terminal of the discharge control signal of the protecting circuit 70 to zero (0 V). The protecting circuit 70 transmits a predetermined control signal and switches the switch 76 for the charge control FET to the open state. The resistor 80 connected between the gate terminal and the source terminal of the charge control FET 22 acts so as to set the gate voltage to zero (0 V). Thus, the voltage at the gate terminal of the charge control FET 22 is set to zero (0 V). At this time, the charge current is shut off and the charge is stopped. In this case, the voltage at the gate terminal of the discharge control FET 21 is equal to about 9.4 V (voltage: 10−0.6→9.4 V). Therefore, the circuit is in the state where the discharge current can flow.

Figure 11:
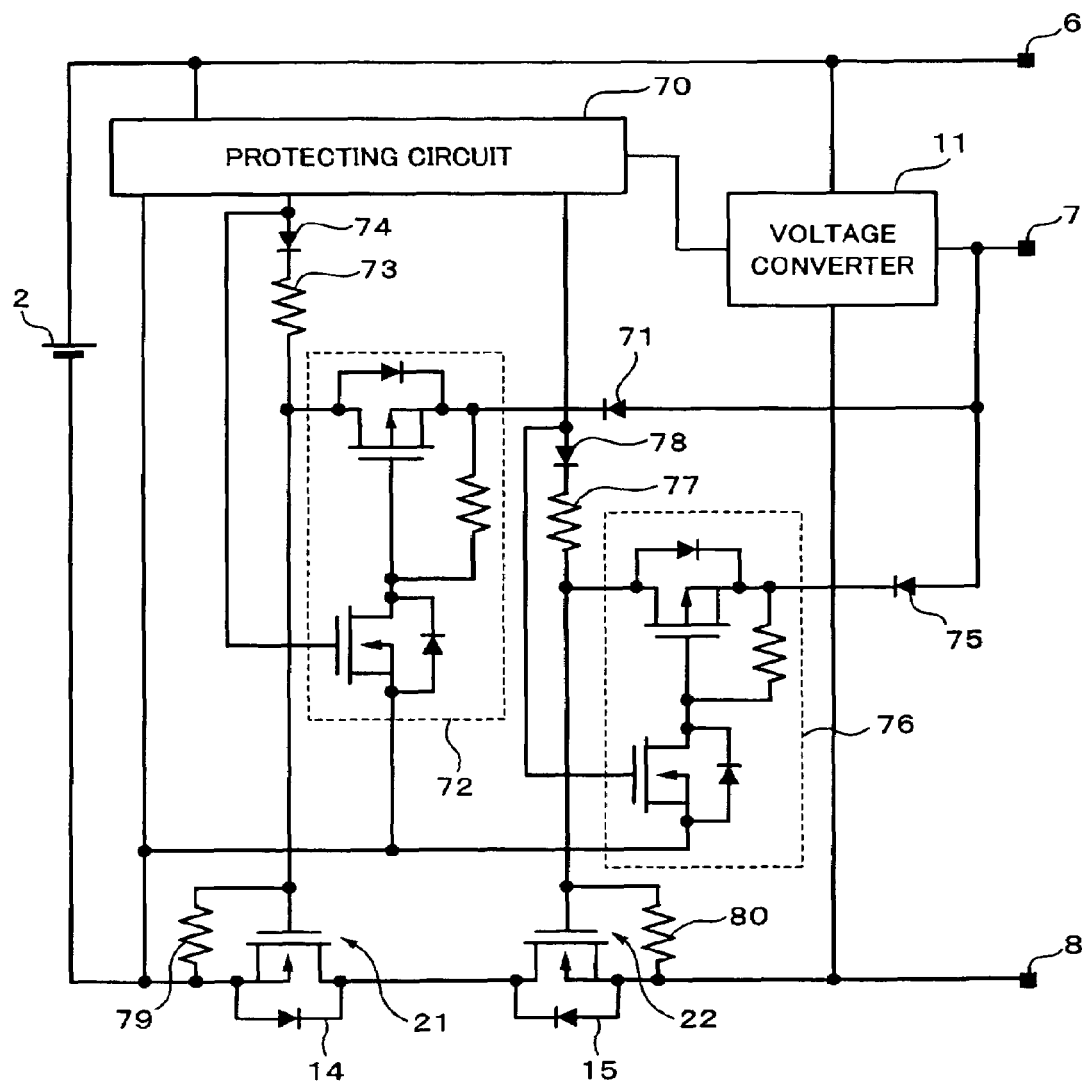
FIG. 11 is a schematic diagram showing the circuit construction of FIG. 10 in more detail.

A circuit diagram of FIG. 11 is substantially equivalent to that of FIG. 10 and shows the switch 72 for the discharge control FET and the switch 76 for the charge control FET in FIG. 10 in more detail. In the example of FIG. 11, each of those switches 72 and 76 is constructed by one n-channel type FET, one p-channel type FET, one resistor, and two diodes.

Figure 12:
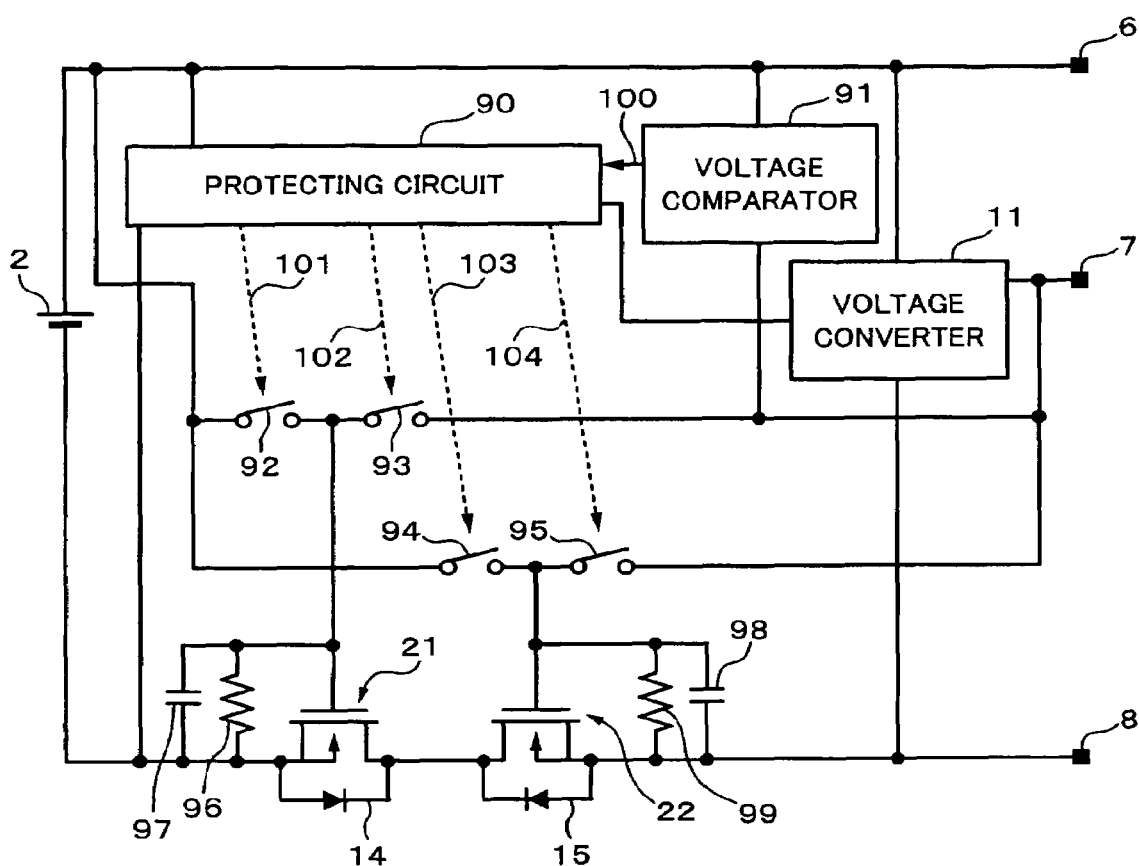
FIG. 12 is a schematic diagram showing a circuit construction of a battery pack according to the sixth embodiment of the invention.

The sixth embodiment of the invention will now be described with reference to FIG. 12. FIG. 12 shows a circuit construction of a battery pack. The secondary battery 2, the external terminals 6, 7, and 8, the voltage converter 11, the discharge control FET 21, the charge control FET 22, and the parasitic diodes 14 and 15 are substantially the same as those described in conjunction with FIGS. 3 and 4. In the embodiment, an improved protecting circuit 90 is arranged and a voltage comparator 91, resistors 96 and 99, switches 92 and 93 for a discharge control FET, switches 94 and 95 for a charge control FET, and capacitors 97 and 98 are added.

According to this embodiment, the output voltage of the voltage converter 11 is compared with the battery voltage and the terminal of the higher voltage is connected to the gate terminal of the discharge control FET 21 and the gate terminal of the charge control FET 22. Therefore, when the battery voltage is in the normal state, the maximum voltage is always applied to the gate terminal of the discharge control FET 21 and the gate terminal of the charge control FET 22. The voltage comparator 91 compares the output voltage of the voltage converter 11 with the voltage of the secondary battery 2 and outputs a voltage comparison signal 100 to the protecting circuit 90.

In the case where the battery voltage is in the normal state and the discharge current is allowed to flow, the protecting circuit 90 connects the higher one of the output voltage of the voltage converter 11 and the battery voltage to the gate terminal of the discharge control FET 21. On the other hand, in the case where the battery voltage is in the normal state and the charge current is allowed to flow, the protecting circuit 90 connects the higher one of the output voltage of the voltage converter 11 and the battery voltage to the gate terminal of the charge control FET 22. In the case where the battery voltage is in the overdischarge voltage state and the discharge current is shut off, the protecting circuit 90 switches the voltage at the gate terminal of the discharge control FET 21 to zero (0 V). In the case where the battery voltage is in the overcharge voltage state and the charge current is shut off, the protecting circuit 90 switches the voltage at the gate terminal of the charge control FET 22 to zero (0 V).

In this embodiment, the resistor 96 is connected to the gate terminal and the source terminal of the discharge control FET 21 and the resistor 99 is connected to the gate terminal and the source terminal of the charge control FET 22. The capacitor 97 is connected to the gate terminal and the source terminal of the discharge control FET 21 and the capacitor 98 is connected to the gate terminal and the source terminal of the charge control FET 22. The capacitor 97 is provided to prevent the reduction in gate voltage of the FET and the FET disconnecting operation for a short period of time until the switch 93 for the discharge control FET is switched to ON after the switch 92 for the discharge control FET is switched to OFF.

By turning on both the switch 92 for the discharge control FET and the switch 93 for the discharge control FET, the current at the output terminal of the voltage converter 11 is discharged into the secondary battery 2, so that the voltage at the output terminal of the voltage converter 11 drops and it is unpreferable.

The capacitor 98 is provided to prevent the reduction in gate voltage of the FET and the FET disconnecting operation for a short period of time until the switch 94 for the charge control FET is switched to ON after the switch 95 for the charge control FET is switched to OFF.

When the voltage at the output terminal of the voltage converter 11 is higher than the voltage of the secondary battery 2, the protecting circuit 90 switches a discharge ON signal 101 to the OFF state and, thereafter, switches a discharge ON signal 102 to the ON state. At this time, after the switch 92 for the discharge control FET is switched to OFF, the switch 93 for the discharge control FET is switched to ON. The battery pack is constructed in such a manner that when the ON states of the switch 92 for the discharge control FET and the switch 93 for the discharge control FET are exchanged as mentioned above, both the switch 92 for the discharge control FET and the switch 93 for the discharge control FET are set to the OFF state for a short time. By this construction, such a situation that the output current of the voltage converter 11 is discharged into the secondary battery 2, the output current of the voltage converter 11 increases, and the voltage at the output terminal of the voltage converter 11 drops is prevented. Since the capacitor 97 is connected to the gate terminal and the source terminal of the discharge control FET 21, such a situation that the voltage at the gate terminal of the discharge control FET 21 drops and the FET is disconnected is prevented.

It is now assumed that the output voltage of the voltage converter 11 is equal to 10.0 V and the gate voltage for switching the connection/disconnection of the field effect transistor FET is equal to 1.4 V. The voltage conversion minimum voltage of the voltage converter 11 is set to 3.0 V (this minimum voltage is a voltage at which the voltage conversion is started). The operation in each state in this case will be described.

(1) Normal State

The voltage of the secondary battery 2 is assumed to be 3.6 V. It is a value in the normal state. The voltage comparison signal 100 of the voltage comparator 91 is ON and it is determined that the voltage of the voltage converter 11 is higher. The protecting circuit 90 sets the discharge ON signal 102 and a charge ON signal 104 to the ON state. Therefore, the switch 93 for the discharge control FET and the switch 95 for the charge control FET are in the connecting state.

The switch 92 for the discharge control FET and the switch 94 for the charge control FET are in the open state. In this case, the voltage at the gate terminal of the discharge control FET 21 is set to 10 V. Similarly, the voltage at the gate terminal of the charge control FET 22 is equal to 10 V. At this time, since the voltage at the gate terminal of the discharge control FET 21 is higher than the battery voltage, the value of the resistance between the drain and the source of the FET becomes smaller. This is true of the charge control FET 22.

(2) Overdischarge State

When the discharge progresses and the discharge capacitance of the secondary battery 2 decreases, the voltage of the secondary battery 2 drops to 2.3 V or less. In this case, the protecting circuit 90 determines that such a state is the overdischarge protecting state and switches the discharge ON signal 101 to the OFF state. At this time, the discharge ON signal 102 is already in the OFF state. Therefore, both the switch 92 for the discharge control FET and the switch 93 for the discharge control FET are in the open state. The resistor 96 fixes the voltages at the gate terminal and the source terminal of the discharge control FET 21 to zero (0 V). Therefore, the voltage at the gate terminal of the discharge control FET 21 is set to zero (0 V), thereby shutting off the discharge current. The switch 94 for the charge control FET is in the connecting state and the switch 95 for the charge control FET is in the open state. Therefore, the voltage at the gate terminal of the charge control FET 22 is equal to about 2 V and does not shut off the charge current.

(3) Overdischarge Recovery (Normal State of the Lowest Voltage)

When the charge from the charger to the secondary battery 2 is started and the discharge capacitance of the secondary battery 2 increases, the voltage of the secondary battery 2 rises to 2.3 V or more. Thus, the protecting circuit 90 determines that such a state is the normal state and switches the discharge ON signal 101 to the ON state. At this time, the discharge ON signal 102 is in the OFF state. Therefore, the voltage at the gate terminal of the discharge control FET 21 is set to 2.3 V or more and the FET is switched to the connecting state. The voltage comparison signal 100 of the voltage comparator 91 is OFF and it is determined that the voltage of the secondary battery 2 is higher. Therefore, the switch 92 for the discharge control FET and the switch 94 for the charge control FET are set into the connecting state.

(4) Voltage Converter Recovery State (Normal State of the Lowest Voltage at which the Voltage Converter can Operate)

When the charge is further continued and the discharge capacitance of the secondary battery 2 increases and the voltage of the secondary battery 2 is set to 3.0 V, the voltage converter 11 starts the voltage conversion and outputs the voltage of 10 V to the outside. The voltage comparison signal 100 of the voltage comparator 91 is ON and it is determined that the voltage of the voltage converter 11 is higher. Therefore, the protecting circuit 90 switches the discharge ON signal 101 to the OFF state and, thereafter, switches the discharge ON signal 102 to the ON state. The protecting circuit 90 further switches a charge ON signal 103 to the OFF state and, thereafter, switches the charge ON signal 104 to the ON state. Thus, the voltage at the gate terminal of the discharge control FET 21 is set to 10 V and the resistance value becomes smaller. Further, the voltage at the gate terminal of the charge control FET 22 is also set to 10 V.

(5) Overcharge State

After the charge is further continued at the high voltage exceeding the rated voltage, the discharge capacitance of the secondary battery 2 increases and the voltage of the secondary battery 2 rises to 4.3 V. In this case, the protecting circuit 90 determines that such a state is the overvoltage charge state and switches the charge ON signal 104 to the OFF state. The charge ON signal 103 is already in the OFF state. Thus, the voltage at the gate terminal of the charge control FET 22 is set to zero (0 V). At this time, the charge current is shut off and the charge is stopped. The voltage at the gate terminal of the discharge control FET 21 is equal to about 10 V.

Figure 13:
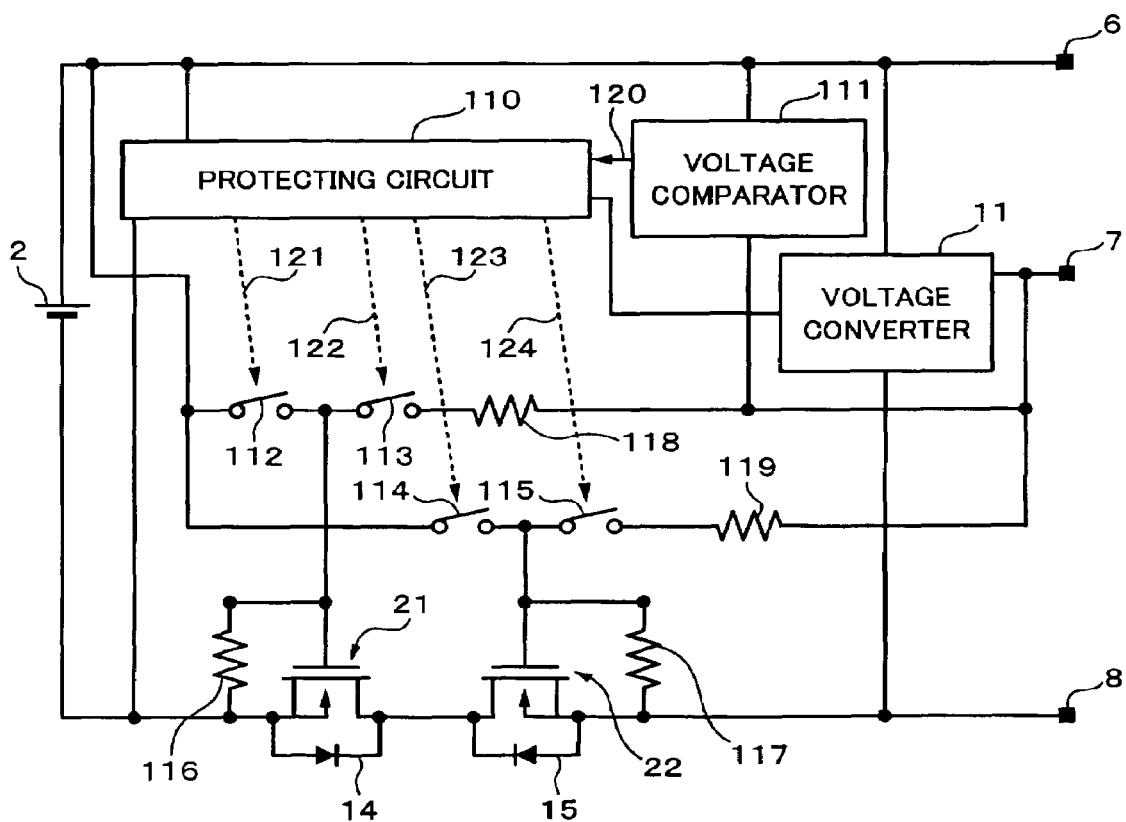
FIG. 13 is a schematic diagram showing a circuit construction of a battery pack according to the seventh embodiment of the invention.
Figure 14:
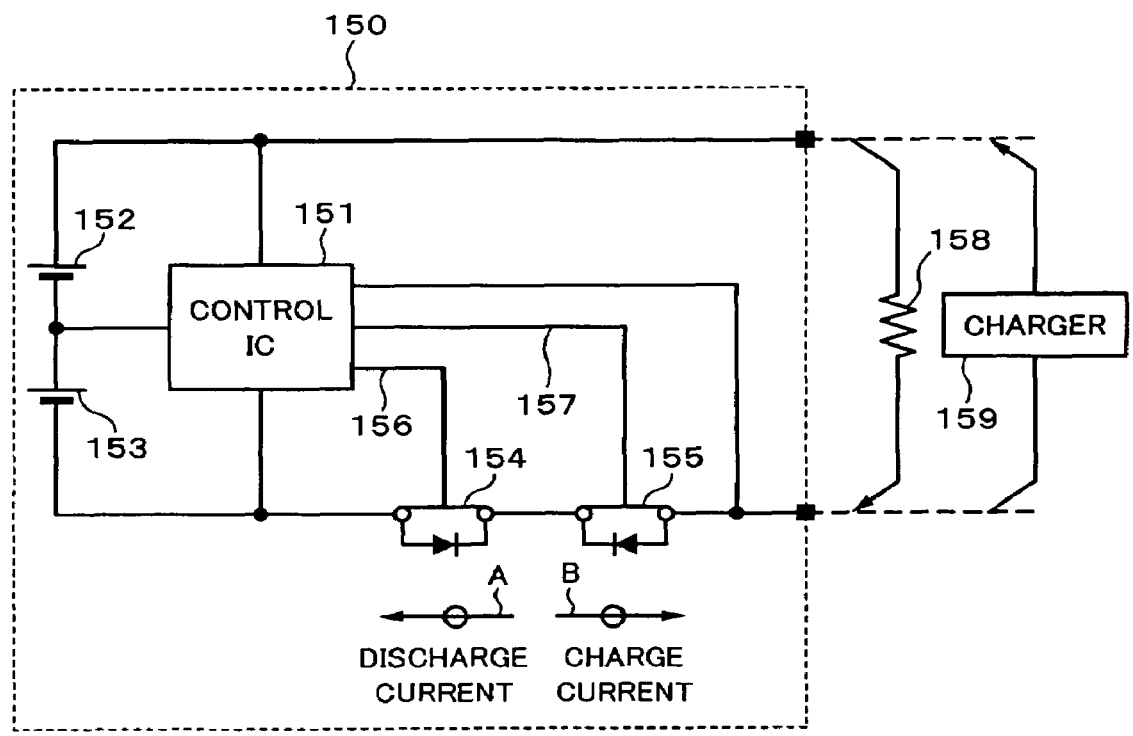
FIG. 14 is a schematic diagram showing a normal state of a lithium ion battery pack.
Figure 15:
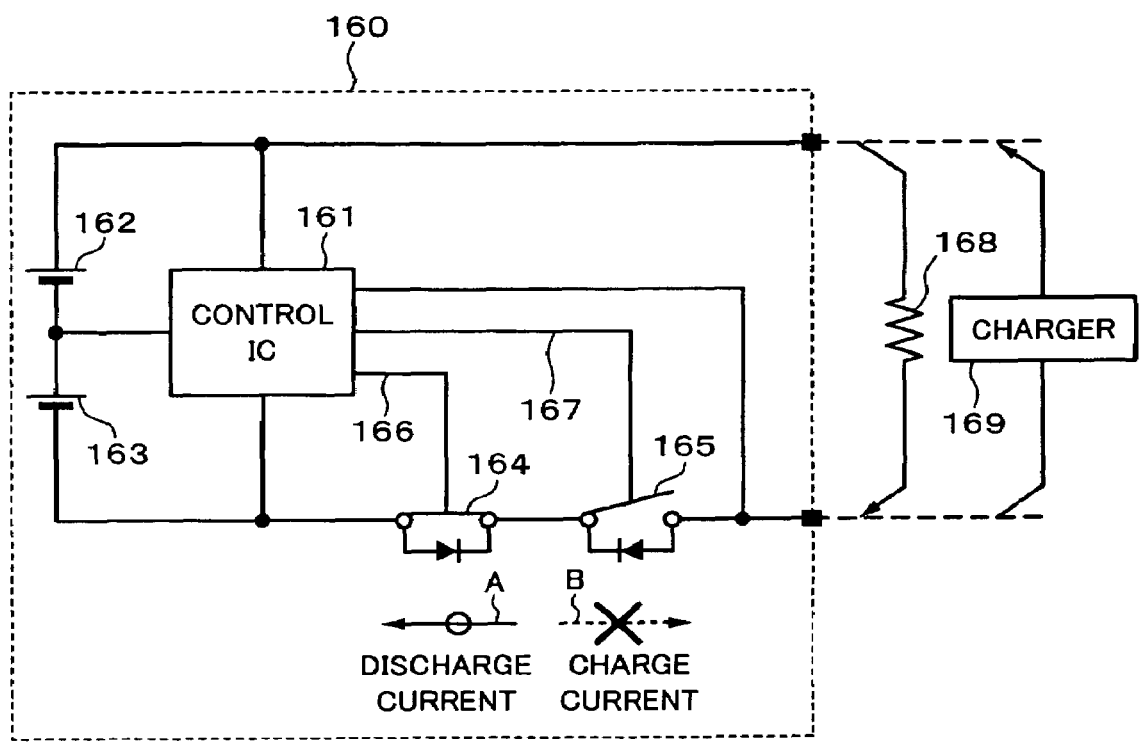
FIG. 15 is a schematic diagram showing the normal state of the lithium ion battery pack in the case where an overcharge protecting function acts.
Figure 16:
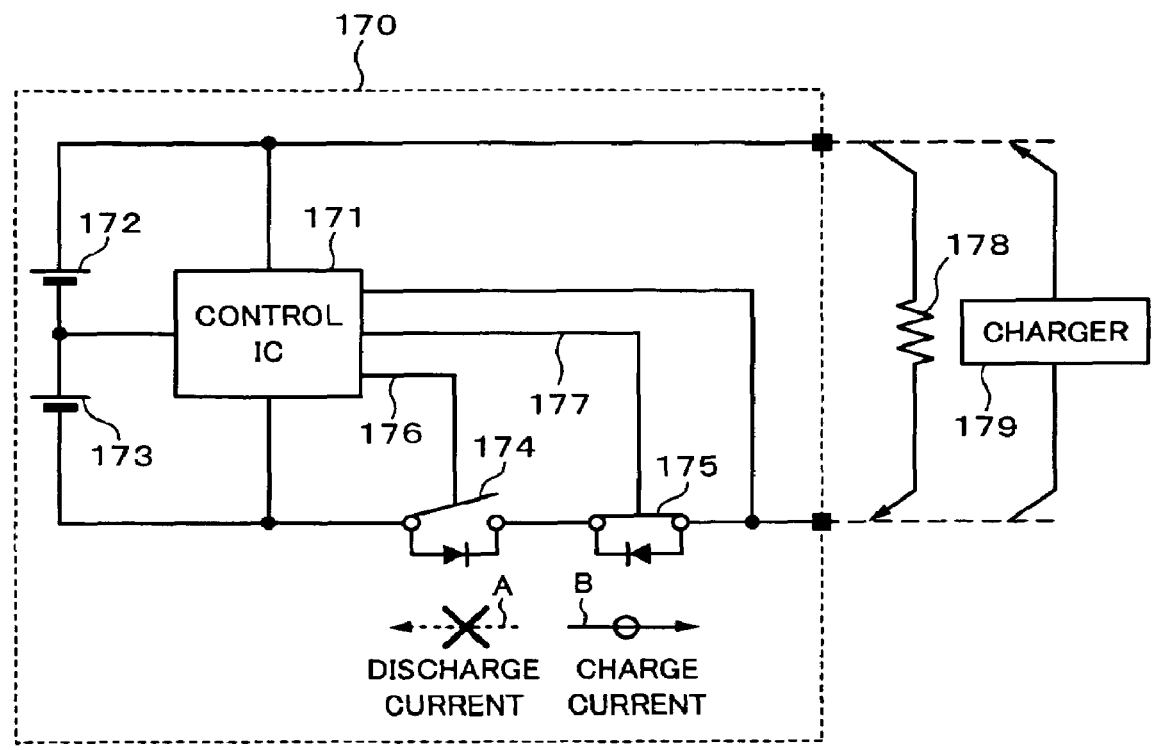
FIG. 16 is a schematic diagram showing the normal state of the lithium ion battery pack in the case where an overdischarge protecting function acts.
Figure 17:
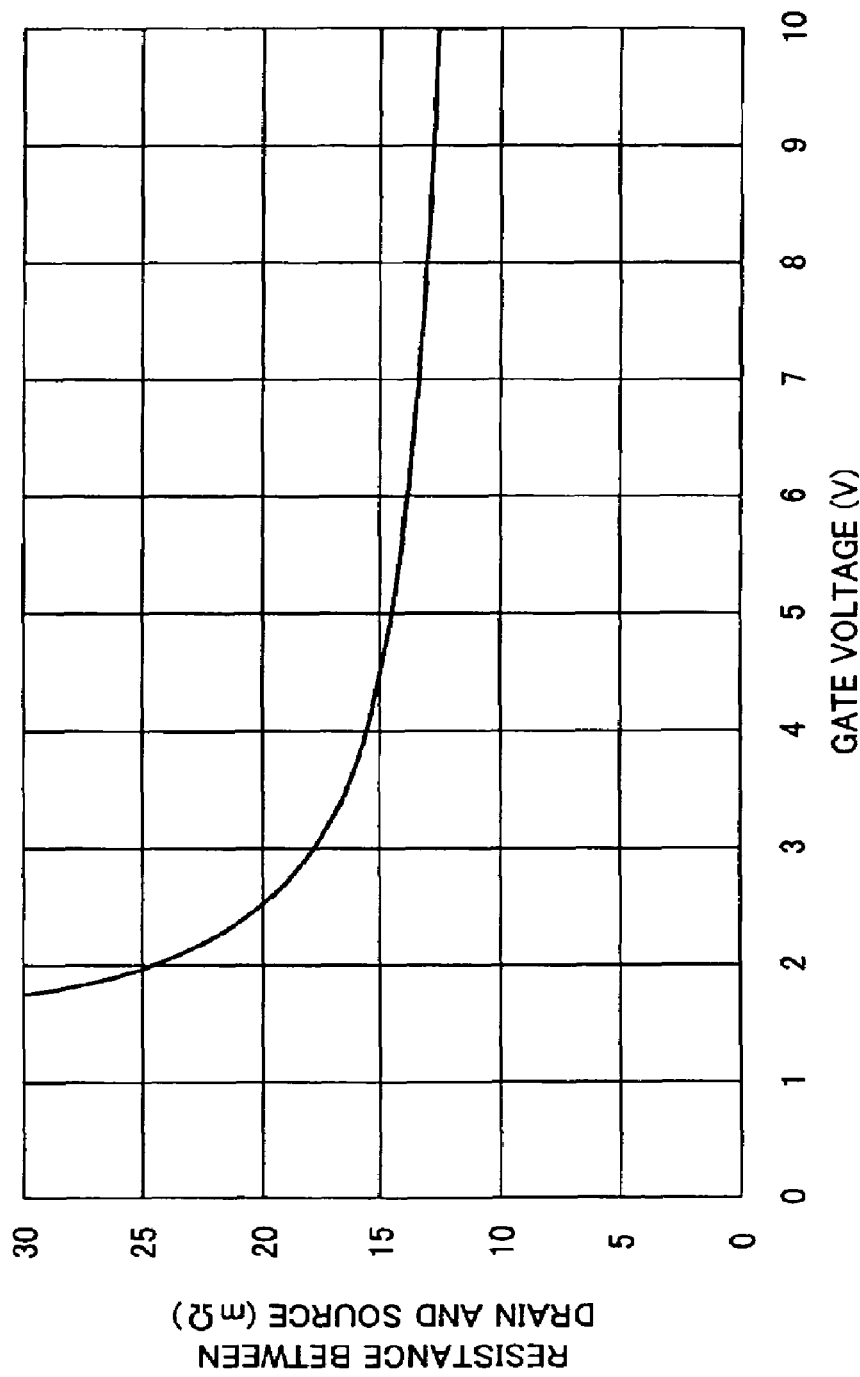
FIG. 17 is a graph showing a relation between a gate voltage and a resistance between a drain and a source.

The seventh embodiment of the invention will now be described with reference to FIG. 13. FIG. 13 shows a circuit construction of a battery pack. The secondary battery 2, the external terminals 6, 7, and 8, the voltage converter 11, the discharge control FET 21, the charge control FET 22, and the parasitic diodes 14 and 15 are substantially the same as those described in conjunction with FIGS. 3 and 4. In the embodiment, an improved protecting circuit 110 is arranged and a voltage comparator 111, resistors 116, 117, 118, and 119, switches 112 and 113 for a discharge control FET, and switches 114 and 115 for a charge control FET are added.

According to this embodiment, as compared with FIG. 12, two capacitors are deleted and two resistors are added. The resistor 118 is arranged between the output terminal of the voltage converter 11 and the switch 113 for the discharge control FET. The resistor 119 is arranged between the output terminal of the voltage converter 11 and the switch 115 for the charge control FET.

When the voltage at the output terminal of the voltage converter 11 is higher than the voltage of the secondary battery 2, the protecting circuit 110 switches a discharge ON signal 122 to the ON state and, thereafter, switches a discharge ON signal 121 to the OFF state. Thus, after the switch 113 for the discharge control FET was switched to the ON state, the switch 112 for the discharge control FET is switched to the OFF state.

As mentioned above, in the case where the ON states of the switch 112 for the discharge control FET and the switch 113 for the discharge control FET are alternated, both the switch 112 for the discharge control FET and the switch 113 for the discharge control FET are turned on for a short period of time. By this construction, such a situation that the voltage at the gate terminal of the discharge control FET 21 drops and the FET enters the disconnecting state is prevented. When both the switch 112 for the discharge control FET and the switch 113 for the discharge control FET are in the ON state, only an extremely small current flows because the resistor 118 exists. Therefore, such a problem that the voltage at the output terminal of the voltage converter 11 drops does not occur.

This is true of the switches on the charging side. When the voltage at the output terminal of the voltage converter 11 is higher than the voltage of the secondary battery 2, the protecting circuit 110 switches a charge ON signal 124 to the ON state and, thereafter, switches a charge ON signal 123 to the OFF state. Thus, after the switch 115 for the charge control FET was switched to the ON state, the switch 114 for the charge control FET is switched to the OFF state. As mentioned above, in the case where the ON states of the switch 114 for the charge control FET and the switch 115 for the charge control FET are alternated, both the switch 114 for the charge control FET and the switch 115 for the charge control FET are turned on for a short period of time. By this construction, such a situation that the voltage at the gate terminal of the charge control FET 22 drops and the FET enters the disconnecting state is prevented. When both the switch 114 for the charge control FET and the switch 115 for the charge control FET are in the ON state, only an extremely small current flows because the resistor 119 exists.

Effects of the Battery Pack According to the Invention Will Now be Described in Detail.

(1) Increase in Duration of the Main Body Owing to Decrease in FET Resistance of the Protecting Circuit of the Secondary Battery Assuming that the output voltage of the voltage converter is equal to 5.0 V, since it is higher than the voltage 4.2 V of the secondary battery, the value of the resistance between the drain terminal and the source terminal of the FET can be more reduced. When the value of the resistance between the drain terminal and the source terminal of the FET is small, the voltage drop due to the FET when the battery is discharging decreases and the duration of the main body increases.

(2) Reduction in Costs Owing to Decrease in FET Resistance of the Protecting Circuit of the Secondary Battery Since the gate voltage of the FET can be set to be high, the FET in which the value of the resistance between the drain terminal and the source terminal is relatively large can be selected. Therefore, the lower-priced or smaller FET can be selected.

For example, the case where it is necessary that the maximum discharge current is so large as to be 4 A and the value of the resistance between the drain terminal and the source terminal of the FET is equal to or less than 16 mΩ will be described. When the FET resistance is more than 16 mΩ, the FET generates heat, the resistance of the FET increases, an excessive current is detected, and the discharge current is shut off or the FET is broken. In the conventional circuit using no voltage converter, it is necessary to select the FET in which the gate voltage is equal to 3.0 V and the value of the resistance between the drain terminal and the source terminal is equal to or less than 16 mΩ.

In the circuit of the invention using the voltage converter, the FET in which the gate voltage is equal to 5.0 V and the value of the resistance between the drain terminal and the source terminal of the FET is equal to or less than 16 mΩ can be selected. The resistance value of the FET is inversely proportional to an area of silicon region. Therefore, a resistance of the FET having the large silicon area is low. A manufacturing cost of the FET having the large silicon area is high. Since the value of the resistance between the drain terminal and the source terminal of the FET depends on the gate voltage, in the circuit of the invention, there is no problem even if the FET having a relatively small silicon region is used. Therefore, the lower-priced FET can be selected.

(3) Prevention of Deterioration in Battery Performance Due to Decrease in FET Resistance of the Protecting Circuit of the Secondary Battery and Realization of Long Life In the lithium ion secondary battery, if a temperature is not set to a high temperature of 40° C. or more, the deterioration in battery performance can be prevented and the long life can be realized. For example, there is a case where if the battery temperature is held at 50° C. for one month, the discharge capacitance is reduced by about 10%. Therefore, it is important to keep the battery temperature at 30° C. or lower in order to hold the performance. In the case where the FET resistance of the protecting circuit of the secondary battery is large, the heat generation of the FET increases when the large current is discharged. When the heat generation of the FET is large, the battery is heated and the battery temperature rises. Therefore, if the FET resistance of the protecting circuit of the secondary battery is reduced, even when the large current is discharged, it is possible to prevent the battery temperature from rising. That is, in this circuit, since the gate voltage of the FET is held to be high and the resistance of the FET is decreased, the battery hardly deteriorates.

(4) Increase in Charging Time by Decrease in FET Resistance of the Protecting Circuit of the Secondary Battery In the case where the value of the resistance between the drain terminal and the source terminal of the FET is small, the voltage drop due to the FET when the battery is charged decreases and the voltage which is applied to the battery rises. Therefore, the charge is finished for a shorter period of time.

(5) Stability of Overcurrent Shut-Off Value by Making FET Resistance of the Protecting Circuit of the Secondary Battery Constant After the battery voltage is equal to or more than 3 V and is equal to or less than 4.3 V, since the gate voltage of the FET is adjusted to a value near, for example, 5 V irrespective of the battery voltage, the value of the resistance between the drain terminal and the source terminal of the FET is set to a predetermined value to a certain extent. Although the value of the resistance between the drain terminal and the source terminal of the FET depends on the temperature, the increase in resistance value is equal to about 10% (the case of 25° C. and the case of 60° C. are compared). In the case of the specification in which the discharge current is shut off when there are two protecting circuits of the secondary battery and the voltage between the drain terminal and the source terminal of the FET is equal to or more than a set voltage, the range of the value of the overdischarge current to be shut off decreases.

For example, in the case of the following conditions, the value of the overdischarge current to be shut off is equal to 5.14 A.

(A) The gate voltage of the FET is equal to about 5.0 V (output voltage of the voltage converter).
(B) The value of the resistance between the drain terminal and the source terminal of the FET whose gate voltage is equal to 5.0 V is equal to 14.6 mΩ.
(C) When the voltage between the drain terminal and the source terminal of the FET is equal to or more than 150 mV, the protecting circuit of the secondary battery shuts off the discharge current.

However, in the case of the following conditions, the value of the overdischarge current to be shut off is equal to 4.14 to 4.75 A.

(A) The gate voltage of the FET is equal to 3.0 to 4.2 V and the same as the battery voltage.
(B) The value of the resistance between the drain terminal and the source terminal of the FET whose gate voltage is equal to 3.0 V is equal to 18.1 mΩ.
(C) The value of the resistance between the drain terminal and the source terminal of the FET whose gate voltage is equal to 4.2 V is equal to 15.8 mΩ.
(D) When the voltage between the drain terminal and the source terminal of the FET is equal to or more than 150 mV, the protecting circuit of the secondary battery shuts off the discharge current.

Therefore, the value of the overdischarge current to be shut off is more stabilized and its precision is higher in the case where the gate voltage of the FET is equal to the output voltage of the voltage converter. If the range of the value of the overdischarge current to be shut off is narrow, it is advantageous to protect against the deterioration of the secondary battery and assure the load current of the main body.

A construction of the eighth embodiment of a battery pack to which the invention is applied will now be described with reference to FIG. 18. This battery pack comprises a secondary battery 201, a temperature protecting device 202, and a voltage converter 203. A minus (−) external terminal 205, a voltage conversion external terminal 206, a plus (+) external terminal 207 are provided for a casing 204. The temperature protecting device 202 is provided between a positive polarity of the secondary battery 201 and the plus external terminal 207. The temperature protecting device 202 and the voltage converter 203 are serially connected between the positive polarity of the secondary battery 201 and the voltage conversion external terminal 206. The minus external terminal 205 is led out from a negative polarity of the secondary battery 201.

Figure 18:
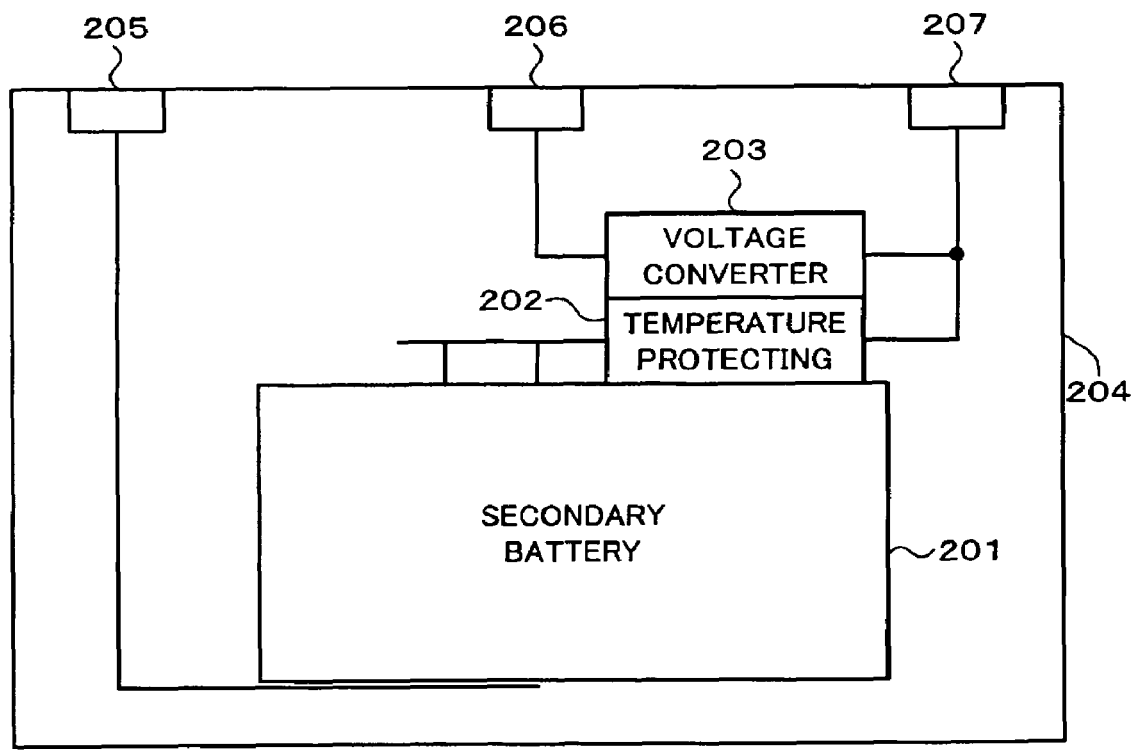
FIG. 18 is a schematic diagram for explaining a construction of a battery pack in the eighth embodiment to which the invention is applied.

As shown in FIG. 18, the temperature protecting device 202 is arranged near both the secondary battery 201 and the voltage converter 203 in terms of the distance. For example, the temperature protecting device 202 and the voltage converter 203 are arranged so as to be physically come into contact with a surface of an outer casing of the secondary battery 201. Although not shown, the temperature protecting device 202 and the voltage converter 203 can be also arranged in a deposited portion of a metal film, for example, a laminated film provided in an end portion of the secondary battery 201.

Figure 19:
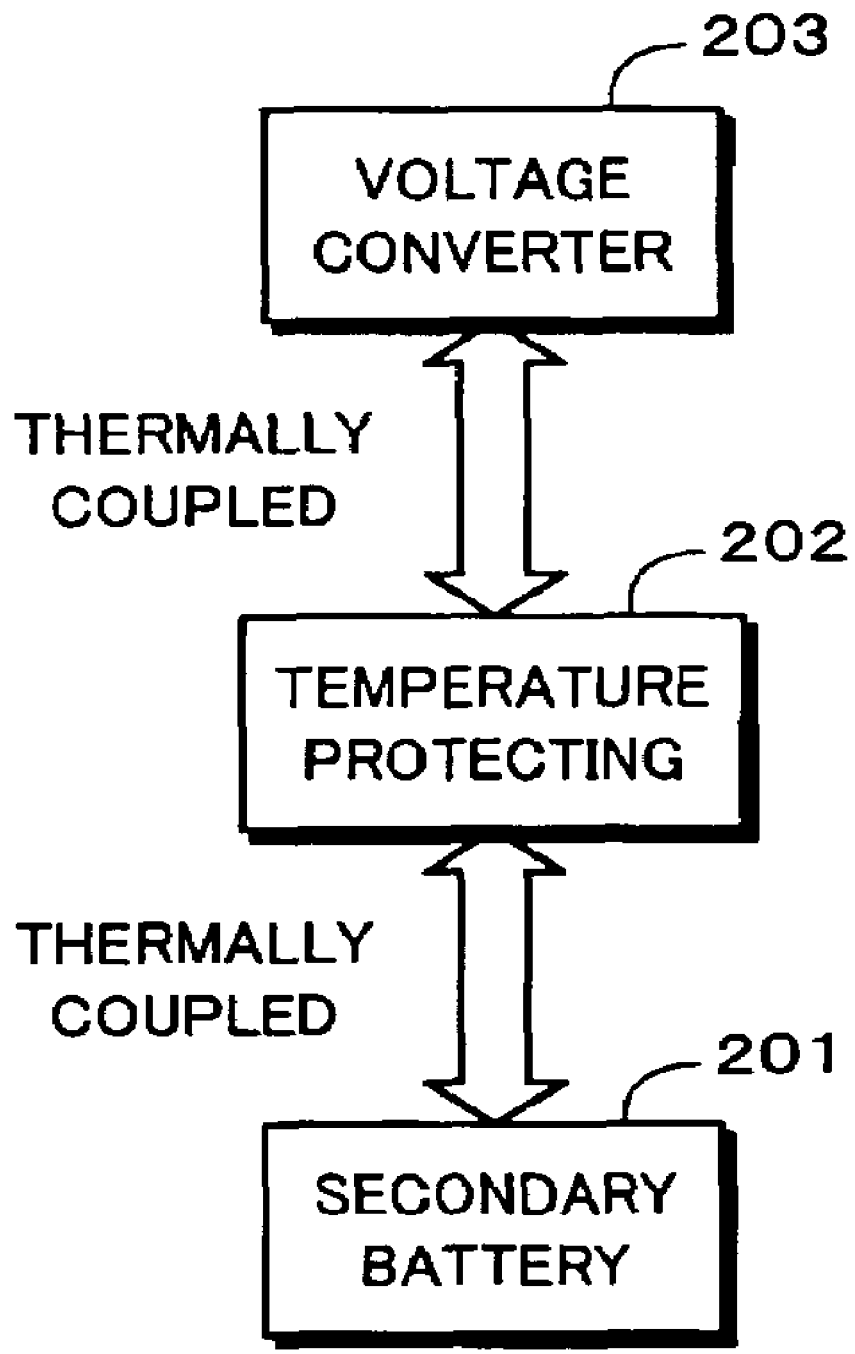
FIG. 19 is a schematic diagram for explaining thermal coupling in the eighth embodiment to which the invention is applied.

Therefore, as shown in FIG. 19, in the battery pack having the secondary battery 201, the temperature protecting device 202, and the voltage converter 203, the temperature protecting device 202 is thermally coupled with both the secondary battery 201 and the voltage converter 203.

A lithium ion secondary battery, a lithiumpolymer secondary battery, a nickel hydrogen secondary battery, a nickel-cadmium secondary battery, a lithium metal secondary battery, or the like can be used as a secondary battery 201. In the case of the lithium ion secondary battery, for example, it is constructed as a rectangular battery and the whole secondary battery 201 is covered with a battery can of iron. In the case of the lithium polymer secondary battery, it is sealed with a laminated film of aluminum. A secondary battery of a kind which will be developed in the future can be also similarly used.

The temperature protecting device 202 has a function of detecting abnormality of temperatures of both the secondary battery 201 and the voltage converter 203 and protecting them. If the secondary battery 201 enters an abnormal state and its temperature rises because the secondary battery 201 is physically damaged from the outside or the like, the temperature protecting device 202 is fused, thereby shutting off the discharge current and the charge current. If the voltage converter 203 fails, an abnormality such as short-circuit or the like occurs in the voltage converter and an abnormal heat generation occurs, the temperature protecting device 202 is fused, thereby shutting off the discharge current and the charge current.

A temperature fuse, a PTC (Positive Temperature Coefficient) thermistor, a thermostat, or the like can be used as a temperature protecting device 202. The temperature fuse is made of a rod-shaped metal of a low melting point. This metal of the low melting point is fused at a high temperature. A flux is deposited around the metal of the low melting point. A fusing temperature of the temperature fuse for the secondary battery is equal to about 90° C., about 100° C., about 130° C., or the like. There is a fuse "EYP2MT092" made by Matsushita Electronic Parts Co., Ltd. as an example of such a temperature fuse.

The PTC thermistor has a construction in which a conductor such as graphite, metal powder, or the like and a resin are mixed and when the temperature becomes high, the resin is expanded, junction density of the conductor decreases, and a resistance value increases. For example, when the temperature of the PTC thermistor rises from 23° C. to 130° C. that is equal to or higher than a trip temperature, the resistance value increases from 20 mΩ to 20Ω that is about 1000 times as high temperature. The trip temperature at which the resistance value of the PTC thermistor rises is equal to about 100° C. to about 130° C. As an example of such a PTC thermistor, there is a thermistor "VTP210S" made by Taiko Electronics Raychem Co., Ltd.

The thermostat is constructed by a laminated plate of metal (bimetal) made by adhering two kinds of metals and a metal plate having spring performance. A switch contact is provided for each of the bimetal and the metal plate. One of the bimetal and the metal plate operates vertically and the other is fixed. There is also a thermostat in which the switch contact is arranged only for either the bimetal or the metal plate in dependence on the kind of thermostat. Ordinarily, the switch contact provided for the bimetal and the switch contact provided for the metal plate are in contact with each other and they operate in such a manner that when the temperature reaches a predetermined temperature, the bimetal is warped in the opposite direction and the switch contact enters an open state. When the temperature is returned to the normal state, the switch contacts of the bimetal and the metal plate enter the contact state. As an example of such a thermostat, there is a thermostat "1MM" made by Texas Instruments Japan Co., Ltd.

Any of various kinds of converters can be used as a voltage converter 203. For example, any of the following converters can be used: a converter of a charger pump system using a capacitor and a switching element; a step-up converter (step-down converter) using a diode, an inductor, a capacitor, and a switching element; and a switching regulator using a transformer and a switching element. Further, a piezoelectric inverter using a piezoelectric transformer or a series regulator using a bipolar transistor device can be also used as a voltage converter 203. A thickness of voltage converter 203 is equal to about 0.5 to 10 mm and one with a thickness of about 1 mm is generally used. Therefore, the voltage converter can be relatively easily built in the battery pack. Although either of a voltage converter for discharging and a voltage converter for charging can be used as a voltage converter 203, it is assumed in this example that the voltage converter for discharging is applied.

There is a case where the voltage converter 203 includes an FET (Field Effect Transistor) and a capacitor therein. If the internal FET is broken, there is a possibility that a value of a resistance between a drain and a source of the FET increases and abnormal heat generation occurs. Also if a short-circuit of internal electrodes of the capacitor occurs, there is a possibility that a large current flows in the capacitor and the abnormal heat generation occurs.

An insulative plate can be arranged between the temperature protecting device 202 and the voltage converter 203. Plastics or an nonwoven fabric cloth can be used as a material of the insulative plate. Polyester, polyimide, polyamide, polyethylene, or the like can be given as an example of the plastics. A glass fiber or the like can be given as an example of the nonwoven fabric cloth.

Figure 20:
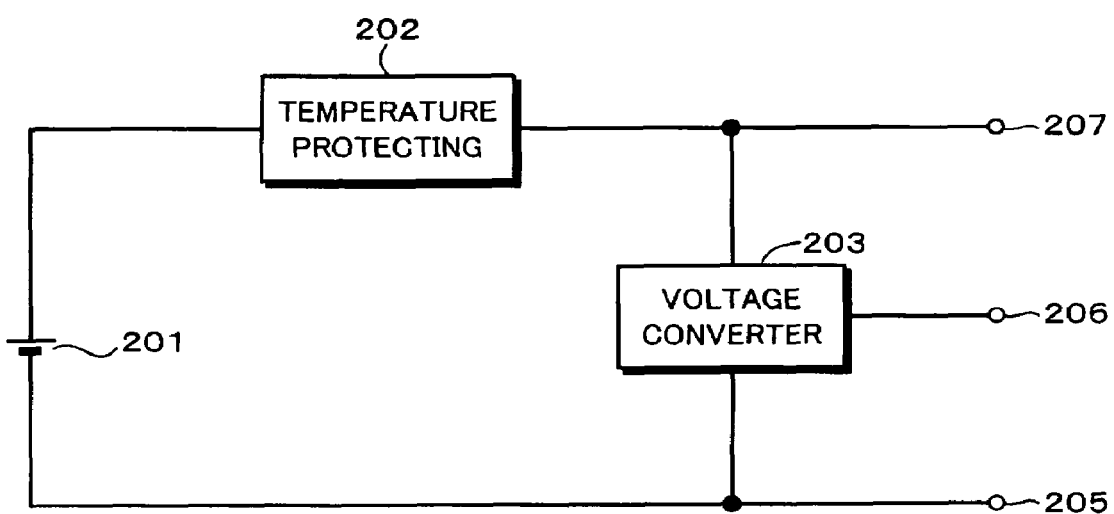
FIG. 20 is a circuit diagram for explaining the eighth embodiment to which the invention is applied.

An example of a circuit in the eighth embodiment is shown in FIG. 20. The temperature protecting device 202 is provided between the positive polarity of the secondary battery 201 and the plus external terminal 207. The minus external terminal 205 is led out from the negative polarity of the secondary battery 201. A battery voltage of the secondary battery 201 is directly outputted between the minus external terminal 205 and the plus external terminal 207. For example, as a battery voltage of the secondary battery 201, a voltage in a range from 2.5 to 4.3 V is set to a voltage value in a proper state, that is, a voltage value in the state of neither the overdischarge nor the overcharge.

One power terminal of the voltage converter 203 is connected to the positive polarity of the secondary battery 201 through the temperature protecting device 202 and the other power terminal is connected to the negative polarity of the secondary battery 201. In the following description, similarly, a DC voltage which is supplied to the power terminals of the voltage converter is an input DC voltage of the voltage converter. An output terminal of the voltage converter 203 is led out as a voltage conversion external terminal 206. An output voltage which is controlled so as to be constant by the voltage converter 203 and whose value differs from the battery voltage is taken out between the minus external terminal 205 and the voltage conversion external terminal 206.

As mentioned above, since the temperature protecting device 202, the secondary battery 201, and the voltage converter 203 are electrically connected, they are constructed so that the heat is propagated to by the metal plate or electric wirings for electrical connection. To thermally and more strongly couple them, it is desirable to increase a cross sectional area of the metal plate and shorten the distances among them. Although nickel is generally used as a material of the metal plate, copper, iron, iron alloy, or the like can be also used.

In the embodiment, to thermally couple the secondary battery 201, the temperature protecting device 202, and the voltage converter 203, an adhesive agent having high thermal conductivity, which will be explained hereinafter, is coated and the secondary battery 201 is used as a heat sink of the voltage converter 203. Since the adhesive agent having the high thermal conductivity is coated, the temperature protecting device 202 can be more strictly and thermally coupled with the secondary battery 201 and the voltage converter 203 and energy converting efficiency of the voltage converter 203 can be improved.

Usually, small aluminum powder is contained in the adhesive agent having the thermal conductivity which is coated in order to thermally couple them. It is preferable that fine metal powder is contained in order to improve the thermal conductivity. Further, an electric resistance value of such an adhesive agent having the thermal conductivity is high and is almost the same as that of an insulative material.

A thermally conductive gel-shaped plate can be also arranged between the temperature protecting device 202 and the voltage converter 203 in order to thermally couple them. Ordinarily, small aluminum powder is contained in the thermally conductive gel-shaped plate and it is desirable that fine metal powder is contained in order to improve the thermal conductivity. Moreover, an electric resistance value of this adhesive agent of the thermal conductivity is high and almost the same as that of an insulative material. Since the gel-shaped plate changes into such a shape as to absorb concave and convex portions of electronic parts and bury gaps, the thermal coupling between the temperature protecting device 202 and its peripheral parts becomes strong.

For example, various silicone for heat radiation made by Toray Dow Corning Silicone Co., Ltd. can be used. Table 1 shows classification and features of those various silicone for heat radiation. Those various silicone for heat radiation are silicone in which the ordinary silicone thermal conductivity is improved and "heat dissipation performance" is improved and have such a feature that the thermal conductivity is high. By arranging those silicone for heat radiation into a gap between a heat source such as power transistor, thermistor, or the like and the circuit board or a heat radiating plate, the heat dissipation of electronic apparatuses is fairly improved, thereby enabling a light weight, a thin body, and a small size of those apparatuses to be realized. Three kinds of rubber type, gel type, and oil compound type can be given as silicon for heat radiation.

TABLE 1

| Classification | Application | Name of representative product | External appearance | Remarks | |
|---|---|---|---|---|---|
| Additional reactive type rubber | | | | | |
| 1-liquid type | Adhesion of circuit board of power transistor, power IC, and power HIC and heat radiating plate | SE4450 | Gray | Workability, self adhesive property, particularly high thermal conductivity | |
| 2-liquid type | Adhesion and filling of dot printer head | SE4400 | Gray | Middle Viscosity | Flame resistance (UL94V-0), self adhesive property |
| | | SE4410 | Gray | Low viscosity | |
| | | SE4430 | Gray | Low viscosity | Flame resistance (UL94V-0), low hardness |
| 1-liquid RTV rubber | Adhesion to heat radiating plate of thermal printer head | SE4420 | White | Paste | Workability self adhesive property |
| | | SE4486CV | White | Middle viscosity | Product which can take measure against contact fault, high thermal conductivity, quick-dry/noncorrosive type, self adhesive property |

TABLE 1-continued

| Classification | Application | Name of representative product | External appearance | Remarks |
|---|---|---|---|---|
| Gel | Sealing of electronic parts | SE4440LP | Gray | Stress relaxation characteristics, 2-liquid type |
| | | SE4445CV | Gray | Flame resistance (UL94V-0), product which can take measure against contact fault, high thermal conductivity, 2-liquid type |
| Oil Compound | Sealing of gaps between transistor, diode, and rectifier and heat radiating plate | SH340 | White | Heat resistance |
| | | SC102 | White | General-purpose |
| | | SC4470 | Gray white | Product which can take measure against contact fault, high thermal conductivity, increase in heat resistance is small. |
| | | SE4490CV | White | Product which can take measure against contact fault, high thermal conductivity |

Specifically speaking, it is suitable if silicone gel for heat radiation of a 2-liquid thermo-setting type (SE4445CV A/B) is used. Heat conductivity of this silicone gel is equal to 1.26 W/m·k and excellent. Since the silicone gel is excellent in electrical insulation performance and has high elasticity, it has such features that it can cope with various clearances and the like. This silicone gel is poured into a die, heated for a long time, and hardened, thereby forming a plate-shaped gel sheet. The formed gel sheet as hard matter is of a flame resistive type which is excellent in adhesion, trackability, and stickness.

It is possible to use, for example, a quick-dry and noncorrosive silicone adhesive agent (SE9184 WHITE RTV) made by Toray Dow Corning Silicone Co., Ltd. This adhesive agent is a 1-component type room temperature hardening type silicone adhesive agent. This adhesive agent has such features that thermal conductivity is high to be equal to 0.84 W/m·k ($2.0 \times 10^{-3}$ cal/cm·sec·° C.), volume resistivity is equal to $1.0 \times 10^{15}$ Ω·cm, it is excellent in heat radiation performance, and the like.

It is possible to use, for example, a flame resistive and semi-flowability adhesive sealing material for general industrial use made by GE Toshiba Silicone Co., Ltd. This sealing material is liquid silicone rubber of a 1-component oxime type. Merely by extruding such a sealing material from a tube or a cartridge, it is hardened at room temperature and becomes a rubber-like elastic material. Therefore, by drying the sealing material after the coating, it is solidified. This sealing material has such features that thermal conductivity is high to be equal to 0.8 W/m·k ($1.9 \times 10^{-3}$ cal/cm·sec·° C.), volume resistivity is equal to $2.0 \times 10^{15}$ Ω·cm, it is excellent in heat radiation performance, and the like.

For example, a lambda gel (λGEL) made by Gel Tech Co., Ltd. can be used. This lambda gel is in a gel shape, it buries gaps of concave and convex parts and adheres them. No air layer is formed on a contact surface and the lambda gel has electrical insulation performance. This lambda gel has such features that thermal conductivity is high to be equal to 1.8 W/m·k, volume resistivity is equal to $3.4 \times 10^{12}$ Ω·cm, it is excellent in heat radiation performance, and the like.

For example, a thermal conductive double-sided adhesive tape "No. 7090" made by Teraoka Seisakusho Co., Ltd. can be used. This thermal conductive double-sided adhesive tape "No. 7090" has such features that thermal conductivity is high to be equal to $1.0 \times 10^{-3}$ cal/cm·sec·° C.) and the like.

By coating the adhesive agent of the high thermal conductivity or filling the gel-shaped filler as mentioned above, the temperature protecting device 202 can be more strongly and thermally coupled with the voltage converter 203 and the secondary battery 201.

A construction of the ninth embodiment of a battery pack to which the invention is applied will now be described with reference to FIG. 21. The battery pack comprises the secondary battery 201, the temperature protecting device 202, the voltage converter 203, and a circuit board 211. The minus external terminal 205, the voltage conversion external terminal 206, and the plus external terminal 207 are provided for the casing 204. As mentioned above, the battery pack of the ninth embodiment is constructed by adding the circuit board 211 to the construction of the eighth embodiment.

The voltage converter 203 is mounted on the circuit board 211. As shown at reference numeral 212, in an end portion of the circuit board 211, a copper foil land (not shown) provided on the circuit board 211 and wirings electrically connected to the temperature protecting device 202 are soldered. The voltage converter 203 is electrically connected to the copper foil land of the circuit board 211.

Figure 21:
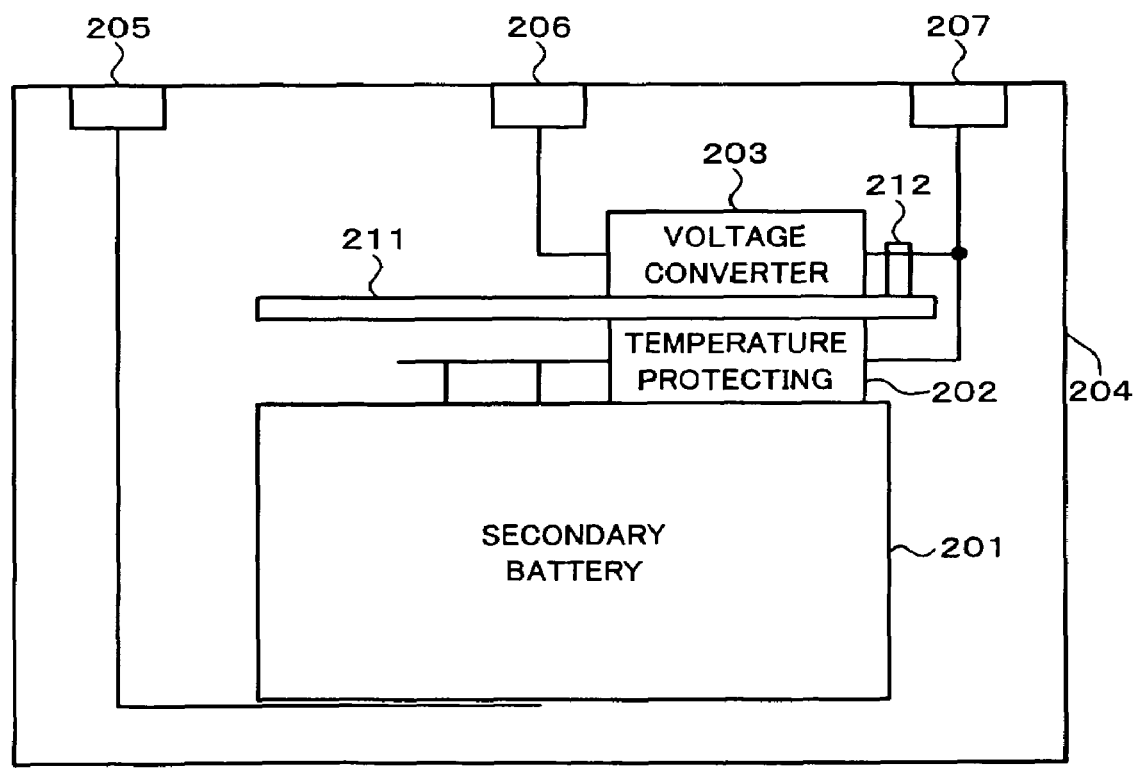
FIG. 21 is a schematic diagram for explaining a construction of a battery pack in the ninth embodiment to which the invention is applied.

As shown in FIG. 21, the temperature protecting device 202 is arranged near both the secondary battery 201 and the voltage converter 203 in terms of the distance. For example, the temperature protecting device 202 and the voltage converter 203 are arranged so as to be physically come into contact with the surface of the outer casing of the secondary battery 201. Although not shown, the temperature protecting device 202 and the voltage converter 203 can be also arranged in the deposited portion of the metal film, for example, the laminated film provided in the end portion of the secondary battery 201.

Therefore, as shown in FIG. 21, in the battery pack having the secondary battery 201, the temperature protecting device 202, and the voltage converter 203, the temperature protecting device 202 is thermally coupled with both the secondary battery 201 and the voltage converter 203.

Figure 22:
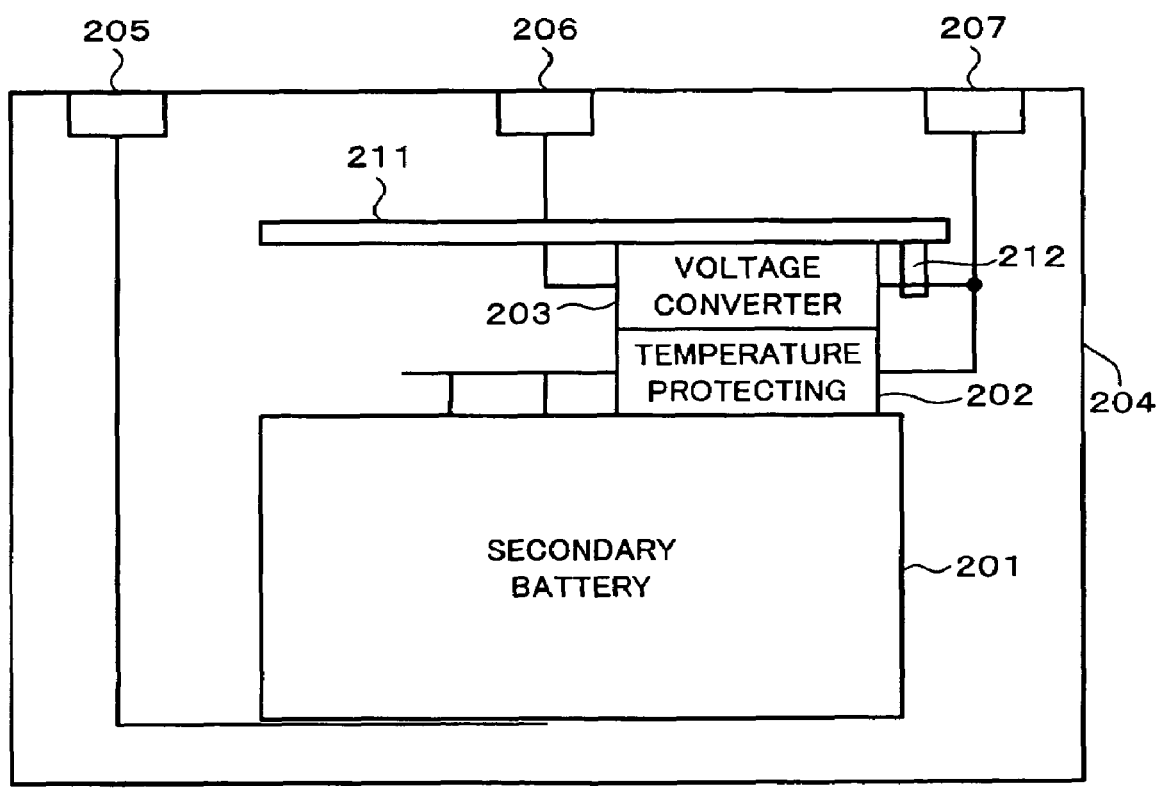
FIG. 22 is a schematic diagram for explaining a construction of another example of the battery pack in the ninth embodiment to which the invention is applied.

A construction of another example of the ninth embodiment of a battery pack to which the invention is applied will now be described with reference to FIG. 22. According to another example of FIG. 22, as compared with the construction of FIG. 21 mentioned above, the voltage converter 203 mounted on the circuit board 211 is arranged on the temperature protecting device 202 side. As shown in FIG. 22, the temperature protecting device 202 and the voltage converter 203 are physically in contact with each other. Therefore, the temperature protecting device 202 and the voltage converter 203 are thermally and more strongly coupled. In a manner similar to FIG. 21 mentioned above, as shown at reference numeral 212, in the end portion of the circuit board 211, the copper foil land (not shown) provided on the circuit board 211 and the wirings electrically connected to the temperature protecting device 202 are soldered. The voltage converter 203 is electrically connected to the copper foil land of the circuit board 211.

As shown in FIG. 22, the temperature protecting device 202 is arranged near both the secondary battery 201 and the voltage converter 203 in terms of the distance. For example, the temperature protecting device 202 and the voltage converter 203 are arranged so as to be physically come into contact with the surface of the outer casing of the secondary battery 201. Although not shown, the temperature protecting device 202 and the voltage converter 203 can be also arranged in the deposited portion of the metal film, for example, the laminated film provided in the end portion of the secondary battery 201.

Therefore, as shown in FIG. 22, in the battery pack having the secondary battery 201, the temperature protecting device 202, and the voltage converter 203, the temperature protecting device 202 is thermally coupled with both the secondary battery 201 and the voltage converter 203.

A construction of the tenth embodiment of a battery pack to which the invention is applied will now be described with reference to FIG. 23. The battery pack comprises the secondary battery 201, the temperature protecting device 202, a voltage converter 221 for discharging, and a voltage converter 222 for charging. The minus external terminal 205, an external terminal 223 for discharging, and an external terminal 224 for charging are provided for the casing 204. As mentioned above, the battery pack of the tenth embodiment is constructed by using the two voltage converters for discharging and for charging as compared with the construction of the eighth embodiment.

The temperature protecting device 202 and the voltage converter 221 for discharging are serially connected between the positive polarity of the secondary battery 201 and the external terminal 223 for discharging. The temperature protecting device 202 and the voltage converter 222 for charging are serially connected between the positive polarity of the secondary battery and the external terminal 224 for charging. The minus external terminal 205 is led out from the negative polarity of the secondary battery 201.

Figure 23:
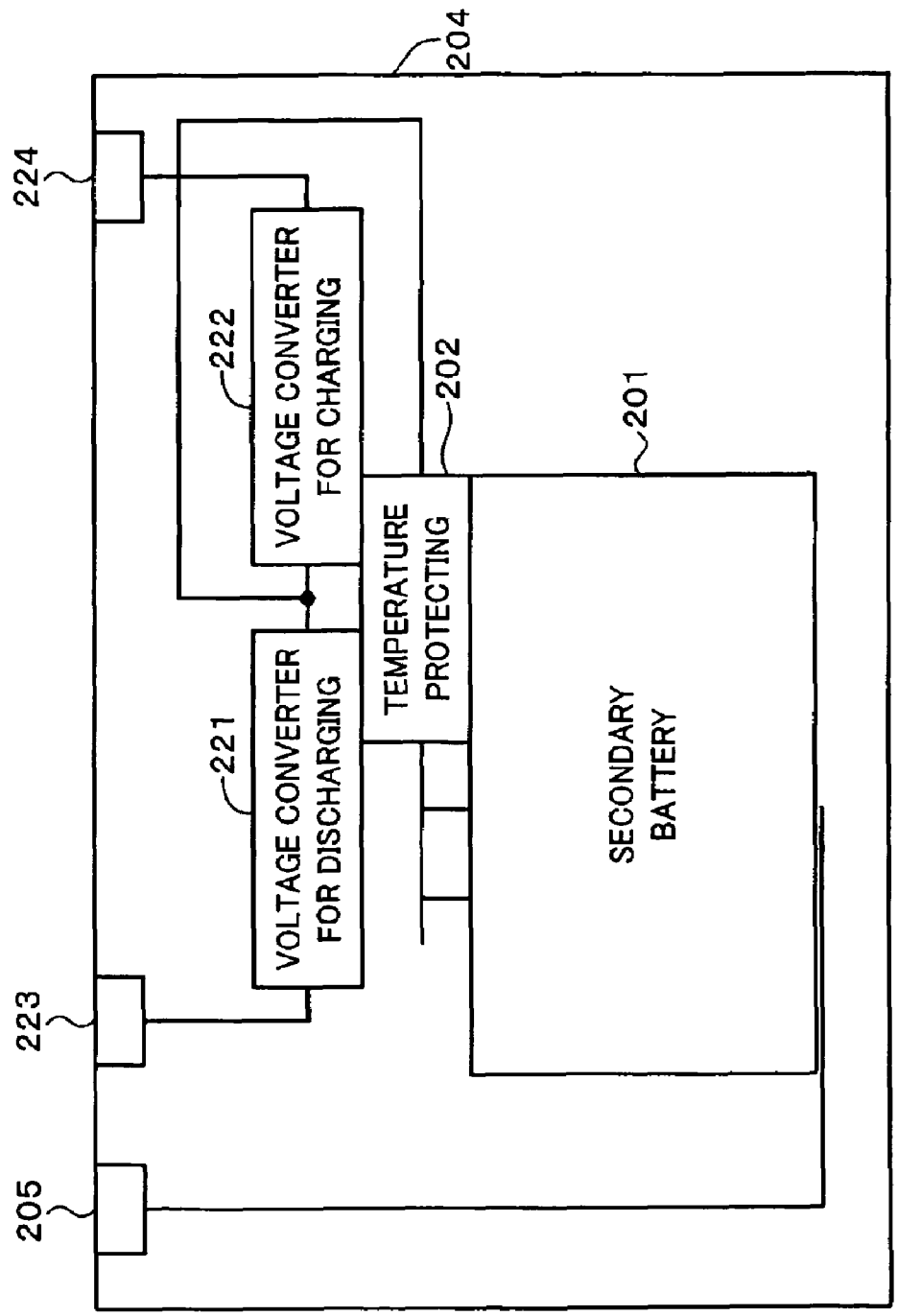
FIG. 23 is a schematic diagram for explaining a construction of a battery pack in the tenth embodiment to which the invention is applied.

As shown in FIG. 23, the temperature protecting device 202 is arranged near all of the secondary battery 201, the voltage converter 221 for discharging, and the voltage converter 222 for charging in terms of the distance. For example, the temperature protecting device 202, the voltage converter 221 for discharging, and the voltage converter 222 for charging are arranged so as to be physically come into contact with the surface of the outer casing of the secondary battery 201. Although not shown, the temperature protecting device 202, the voltage converter 221 for discharging, and the voltage converter 222 for charging can be also arranged in the deposited portion of the metal film, for example, the laminated film provided in the end portion of the secondary battery 201.

Figure 24:
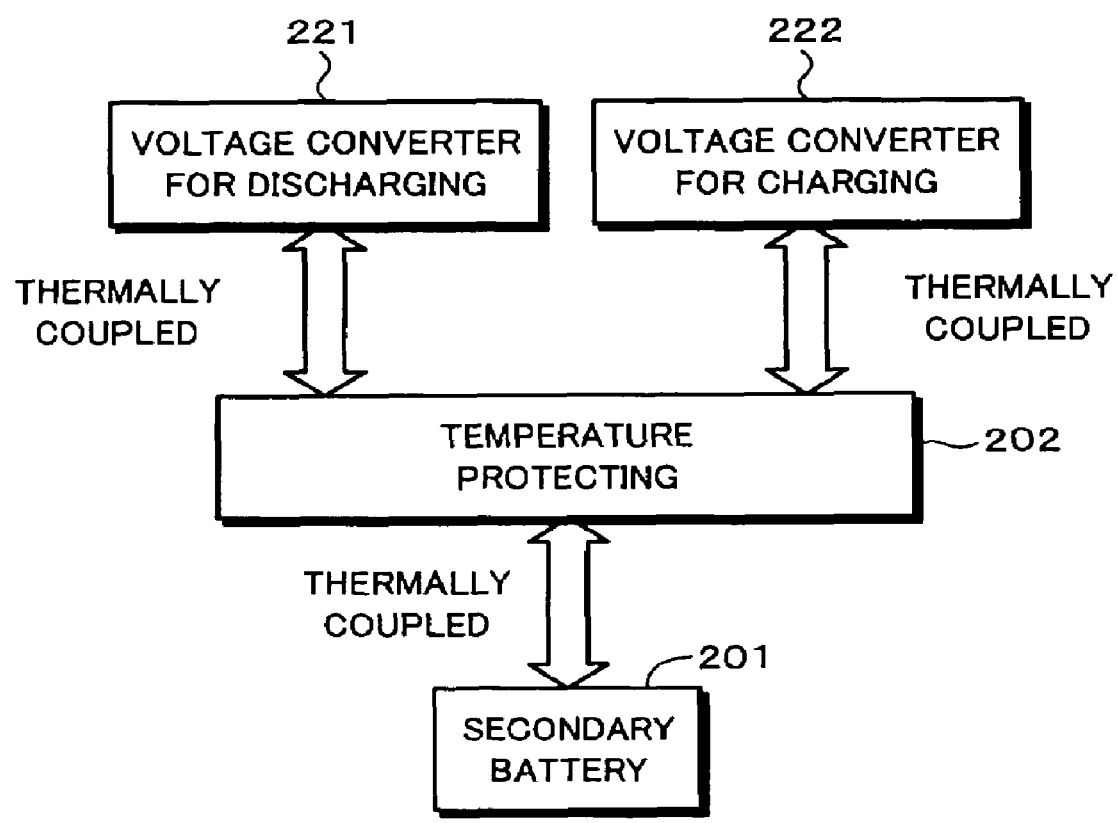
FIG. 24 is a schematic diagram for explaining thermal coupling in the tenth embodiment to which the invention is applied.

Therefore, as shown in FIG. 24, in the battery pack having the secondary battery 201, the temperature protecting device 202, the voltage converter 221 for discharging, and the voltage converter 222 for charging, the temperature protecting device 202 is thermally coupled with all of the secondary battery 201, the voltage converter 221 for discharging, and the voltage converter 222 for charging.

Figure 25:
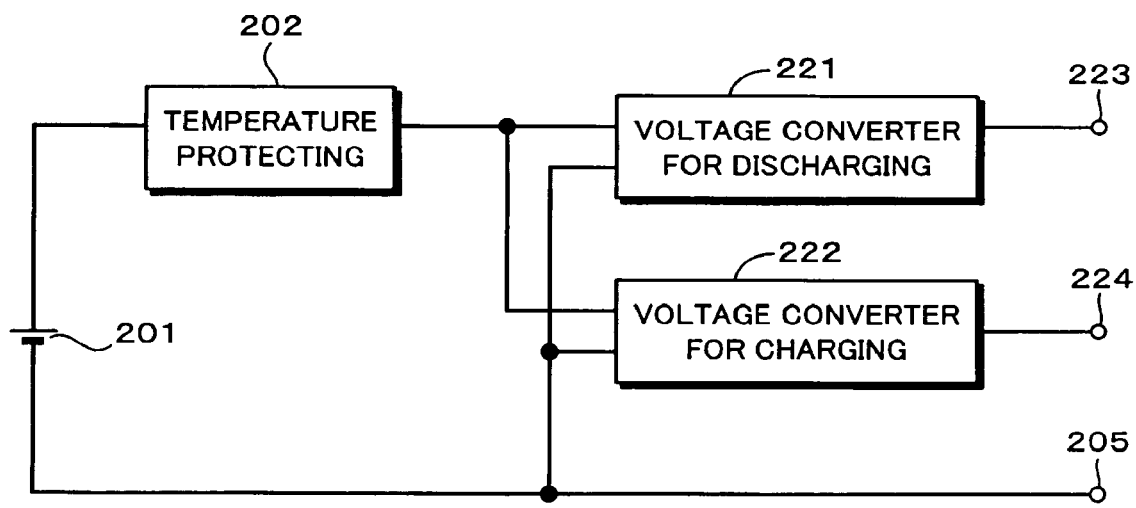
FIG. 25 is a circuit diagram for explaining the tenth embodiment to which the invention is applied.

An example of a circuit in the tenth embodiment is shown in FIG. 25. One power terminal of the voltage converter 221 for discharging is connected to the positive polarity of the secondary battery 201 through the temperature protecting device 202 and the other power terminal is connected to the negative polarity of the secondary battery 201. An output terminal of the voltage converter 221 for discharging is led out as an external terminal 223 for discharging. The minus external terminal 205 is led out from the negative polarity of the secondary battery 201. An output voltage which is controlled so as to be constant by the voltage converter 221 for discharging and whose value differs from the battery voltage is taken out between the minus external terminal 205 and the external terminal 223 for discharging.

In the case where the battery voltage of the secondary battery 201 is equal to or less than a predetermined value, that is, the overdischarge occurs, the secondary battery 201 can be protected against the overdischarge by stopping the operation of the voltage converter 221 for discharging.

An input terminal of the voltage converter 222 for charging is connected to the external terminal 224 for charging to which the charge voltage is supplied and the other power terminal is connected to the minus external terminal 205. The other power terminal of the voltage converter 222 for charging is also connected to the negative polarity of the secondary battery 201. An output terminal of the voltage converter 222 for charging is connected to the positive polarity of the secondary battery 201 through the temperature protecting device 202.

In the voltage converter 222 for charging, the charge voltage is supplied from the charger (not shown) through the minus external terminal 205 and the external terminal 224 for charging and the secondary battery 201 is charged in accordance with the supplied charge voltage.

Even if the voltage and current which cause the overcharge are supplied from the charger, since the optimum voltage and current can be supplied to the secondary battery 201 by the voltage converter 222 for charging, the secondary battery 201 can be protected against the overcharge.

As mentioned above, in another example of the circuit shown in FIG. 24, the secondary battery 201 can be protected against the overdischarge by the voltage converter 221 for discharging and the secondary battery 201 can be protected against the overcharge by the voltage converter 222 for charging. Therefore, the FET for the discharge control and the FET for the charge control can be omitted.

To thermally couple the secondary battery 201, the temperature protecting device 202, the voltage converter 221 for discharging, and the voltage converter 222 for charging, an adhesive agent having high thermal conductivity is coated. Consequently, the heat generation of the voltage converter 221 for discharging and the voltage converter 222 for charging can be radiated through the secondary battery 201. The energy converting efficiency of the voltage converter 221 for discharging and the voltage converter 222 for charging can be improved.

A construction of the eleventh embodiment of a battery pack to which the invention is applied will now be described with reference to FIG. 26. The battery pack comprises the secondary battery 201, the temperature protecting device 202, the voltage converter 203, and a secondary battery protecting circuit 231. The minus external terminal 205, the voltage conversion external terminal 206, and the plus external terminal 207 are provided for the casing 204. As mentioned above, the battery pack of the 11th embodiment is constructed by adding the secondary battery protecting circuit 231 to the construction of the eighth embodiment.

The secondary battery protecting circuit 231 is provided between the negative polarity of the secondary battery 201 and the minus external terminal 205. The secondary battery protecting circuit 231 is connected to the positive polarity of the secondary battery 201 through the temperature protecting device 202 and further connected to the positive polarity of the secondary battery 201 through the temperature protecting device 202 and the voltage converter 203. The secondary battery protecting circuit 231 has: a function (overvoltage charge protecting function) of switching the switching device to the open state when the secondary battery 201 is overvoltage-charged, that is, preventing the secondary battery 201 from being overvoltage-charged, and a function (overvoltage discharge protecting function) of switching the switching device to the open state when the secondary battery 201 is overvoltage-discharged, that is, preventing the secondary battery 201 from being overvoltage-discharged.

At this time, generally, the FET can be given as a switching device that is used in the secondary battery protecting circuit 231. When the FET is broken, there is a possibility that the value of the resistance between the drain and the source of the FET increases and the abnormal heat generation occurs.

Figure 26:
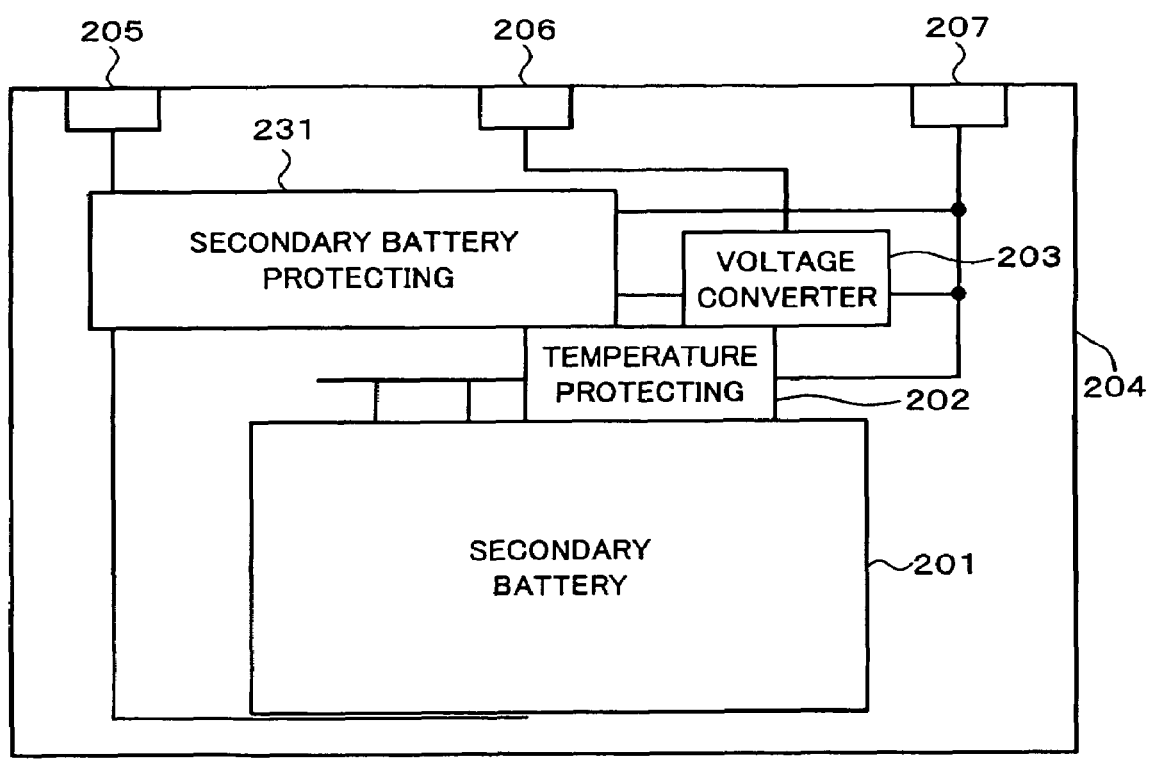
FIG. 26 is a schematic diagram for explaining a construction of a battery pack in the eleventh embodiment to which the invention is applied.

As shown in FIG. 26, the temperature protecting device 202 is arranged near all of the secondary battery 201, the voltage converter 203, and the secondary battery protecting circuit 231 in terms of the distance. For example, the temperature protecting device 202, the voltage converter 203, and the secondary battery protecting circuit 231 are arranged so as to be physically come into contact with the surface of the outer casing of the secondary battery 201. Although not shown, the temperature protecting device 202, the voltage converter 203, and the secondary battery protecting circuit 231 can be also arranged in the deposited portion of the metal film, for example, the laminated film provided in the end portion of the secondary battery 201.

Figure 27:
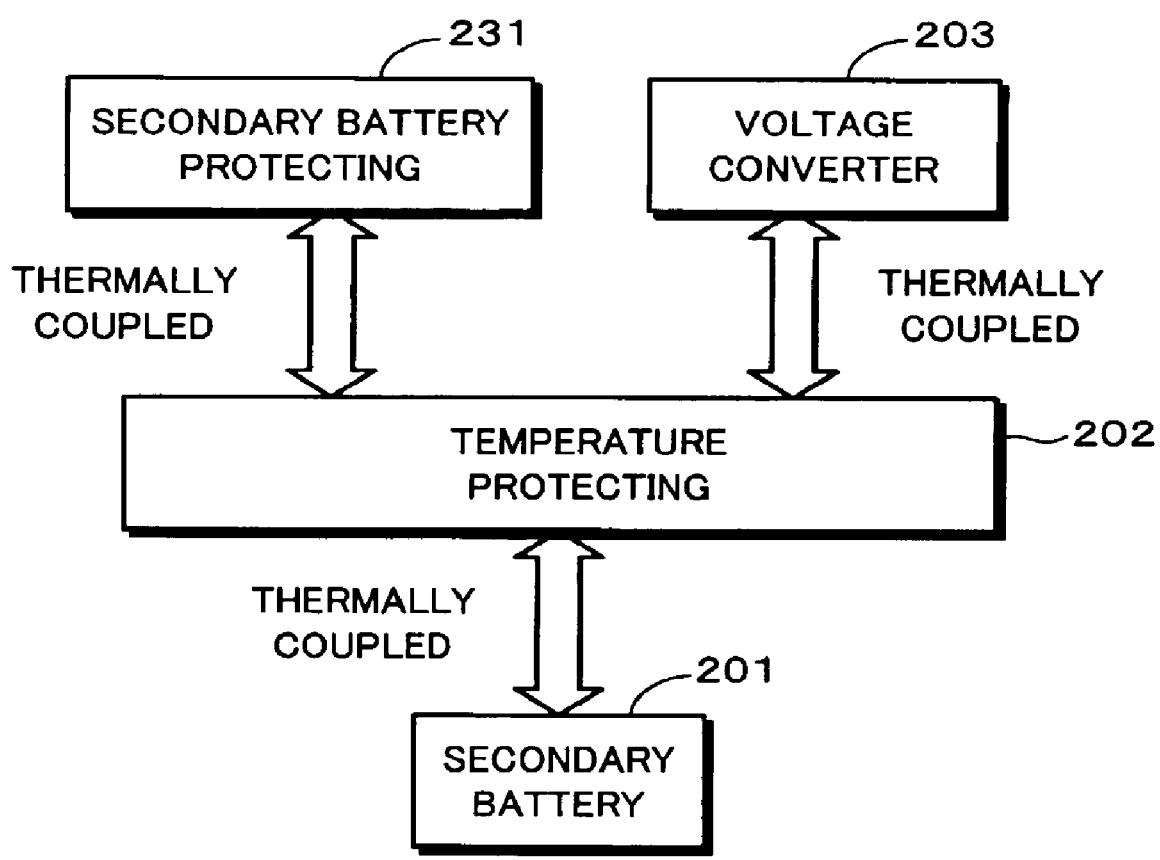
FIG. 27 is a schematic diagram for explaining thermal coupling in the 11th embodiment to which the invention is applied.

Therefore, as shown in FIG. 27, in the battery pack having the secondary battery 201, the temperature protecting device 202, the voltage converter 203, and the secondary battery protecting circuit 231, the temperature protecting device 202 is thermally coupled with all of the secondary battery 201, the voltage converter 203, and the secondary battery protecting circuit 231.

Figure 28:
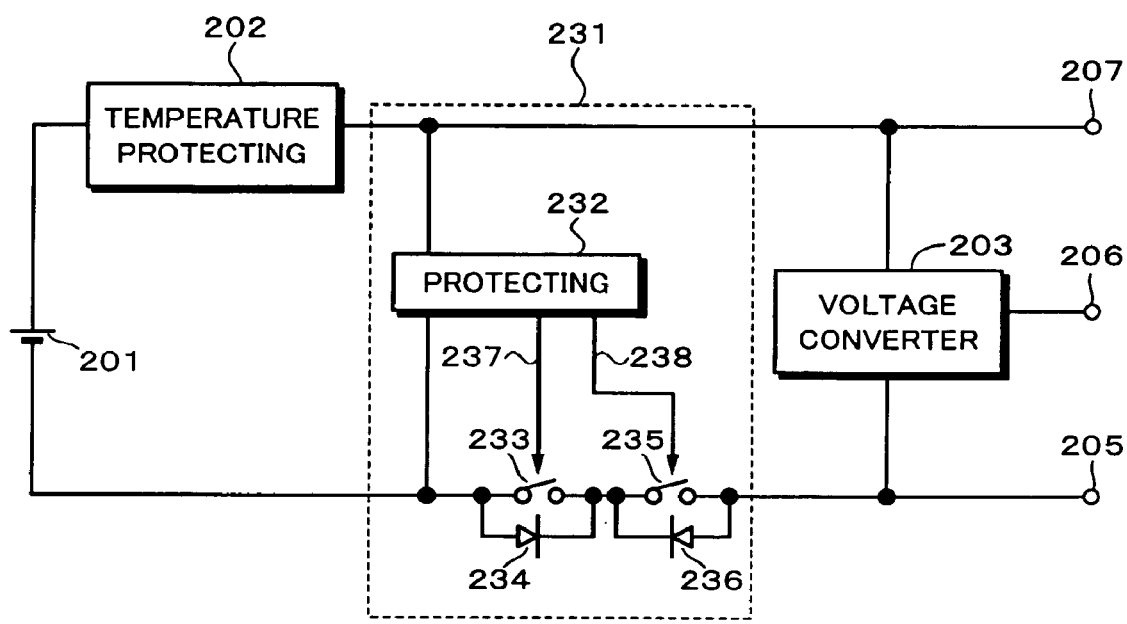
FIG. 28 is a circuit diagram for explaining the 11th embodiment to which the invention is applied.

An example of a circuit in the 11th embodiment is shown in FIG. 28. The temperature protecting device 202 and the secondary battery protecting circuit 231 are provided between the positive polarity of the secondary battery 201 and the plus external terminal 207. The secondary battery protecting circuit 231 is provided between the negative polarity of the secondary battery 201 and the minus external terminal 205. The battery voltage of the secondary battery 201 is directly outputted between the minus external terminal 205 and the plus external terminal 207. For example, as a battery voltage of the secondary battery 201, a voltage in a range from 2.5 to 4.3 V is set to a voltage value in a proper state, that is, a voltage value in the state of neither the overdischarge nor the overcharge.

One power terminal of the voltage converter 203 is connected to the positive polarity of the secondary battery 201 through the temperature protecting device 202 and the secondary battery protecting circuit 231 and the other power terminal is connected to the negative polarity of the secondary battery 201 through the secondary battery protecting circuit 231. The output terminal of the voltage converter 203 is led out as a voltage conversion external terminal 206. The output voltage which is controlled so as to be constant by the voltage converter 203 and whose value differs from the battery voltage is taken out between the minus external terminal 205 and the voltage conversion external terminal 206.

For example, the secondary battery protecting circuit 231 comprises a protecting circuit 232, FETs 233 and 235, and parasitic diodes 234 and 236. One power terminal of the protecting circuit 232 is connected to the positive polarity of the secondary battery 201 through the temperature protecting device 202 and the other power terminal is connected to the negative polarity of the secondary battery 201. The negative polarity of the secondary battery 201 and the minus external terminal 205 are connected through a switch 233 for a discharge current and a switch 235 for a charge current.

Each of the switches 233 and 235 is constructed by, for example, an n-channel type FET. The parasitic diodes 234 and 236 are connected in parallel with the switches 233 and 235. The switches 233 and 235 are controlled by a discharge control signal 237 and a charge control signal 238 from the protecting circuit 232, respectively.

The protecting circuit 232 has a general circuit construction. The switches 233 and 235 are controlled by the protecting circuit 232 and the protection against the overcharge, the overdischarge, and the overcurrent is performed. If the battery is in the normal state where the battery voltage is within the set voltage range, both the discharge control signal 237 and the charge control signal 238 are set to "1" (this means the logical level) and the switches 233 and 235 are turned on. Therefore, the discharge from the secondary battery 201 to the load and the charge from the charger to the secondary battery 201 can be freely executed.

When the battery voltage of the secondary battery 201 is higher than the set voltage range, for example, it is equal to or more than 4.3 V, the charge control signal 238 is set to "0" and the switch 235 is turned off, thereby inhibiting the charge. In this manner, when the battery voltage of the secondary battery 201 is abnormally high, the charge is stopped, thereby preventing the deterioration of the secondary battery 201. The discharge to the load is performed through the parasitic diode 236.

When the battery voltage of the secondary battery 201 is lower than the set voltage range, for example, it is equal to or less than 2.5V, the discharge control signal 237 is set to "0" (this means the logical level) and the switch 233 is turned off, thereby inhibiting the discharge current from flowing. In this manner, when the battery voltage of the secondary battery 201 is low, the discharge is stopped, thereby preventing the deterioration of the secondary battery 201. By connecting the charger after that, the charge is performed through the parasitic diode 234.

Further, when a circuit between the minus external terminal 205 and the plus external terminal 207 is short-circuited, there is a possibility that the overdischarge current flows and the FET is broken. Therefore, when the discharge current reaches a predetermined current value, the discharge control signal 237 is set to "0" and the switch 233 is turned off, thereby inhibiting the discharge current from flowing.

To thermally couple the secondary battery 201, the temperature protecting device 202, the voltage converter 203, and the secondary battery protecting circuit 231, the adhesive agent having the high thermal conductivity is coated. Since the heat generation of the voltage converter 203 can be radiated through the secondary battery 201 by such an adhesive agent and the energy converting efficiency of the voltage converter 203 can be improved.

Figure 29:
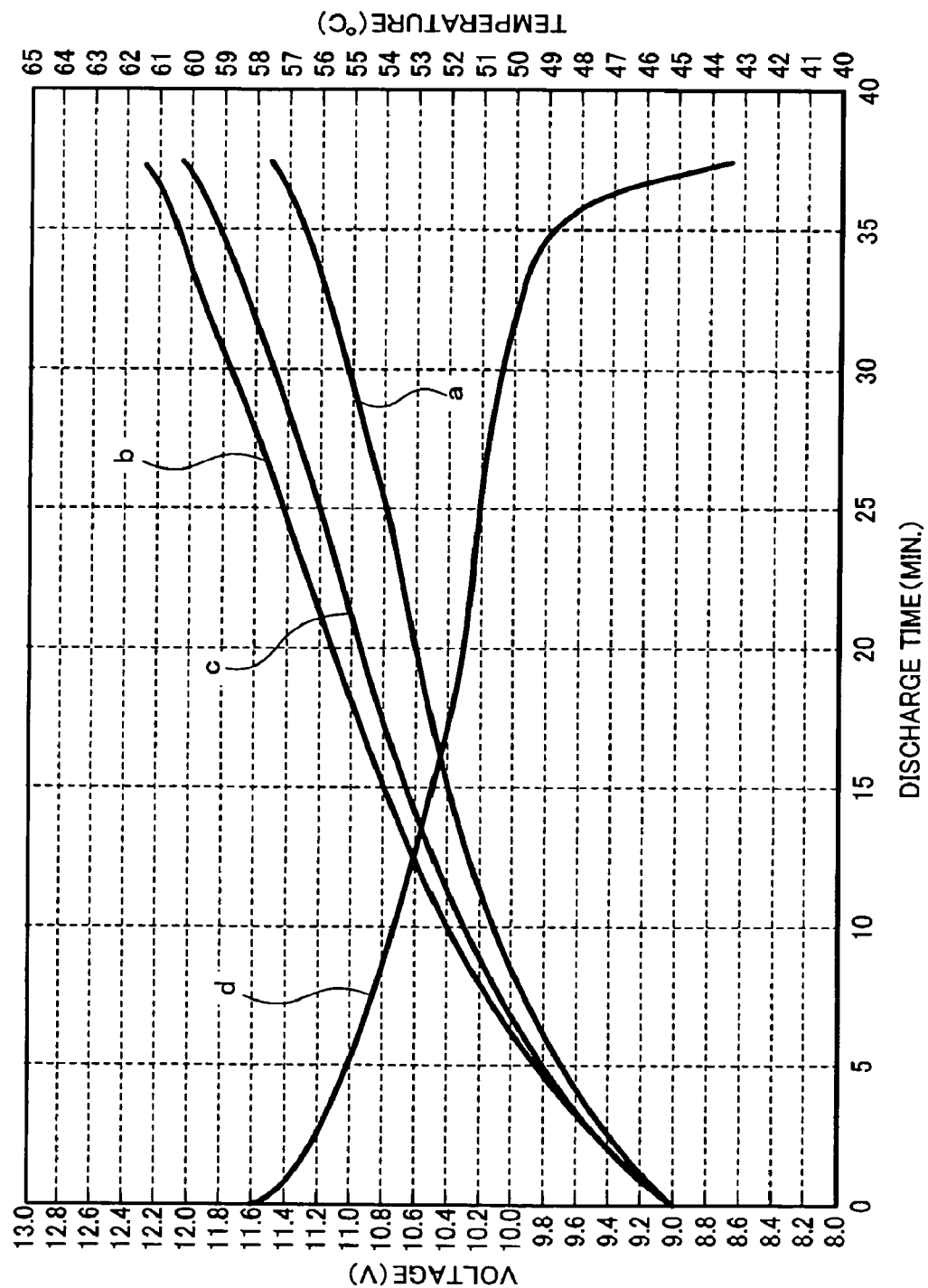
FIG. 29 is a characteristics diagram for explaining adhesive agents which are applied to the invention.

The adhesive agent or the like which is used in the embodiment will now be described. A characteristics diagram shown in FIG. 29 shows temperature curves (a, b, and c) in the case where a gap between the casing 204 and the secondary battery 201 is coated with the adhesive agent and the discharge of the high load current of 5.8 A at an atmospheric temperature of 45° C. as an ambient temperature of the battery pack is executed and a voltage curve (d) of the voltage between the plus external terminal 207 and the minus external terminal 205 of the battery pack, respectively.

The temperature curve (a) shows a temperature change when the adhesive agent "SC901" made by Sony Chemical Co., Ltd. is used. "SC901" is the silicone adhesive agent in which thermal conductivity is equal to 0.84 W/m·k ($2.0 \times 10^{-3}$ cal/cm·sec·° C.), a specific gravity is equal to 1.65, an amount of metal powder (aluminum powder) is equal to 50 wt %, adhesive strength (tensile strength) is equal to 2.9 MPa, and a volume is not expanded upon drying. The temperature of the secondary battery 201 rises with the lapse of time and the temperature of the secondary battery 201 at the end of the discharge is equal to about 57.6° C.

The temperature curve (b) shows a temperature change when the adhesive agent "Super X" made by Cemedine Co., Ltd. is used. "Super X" is the adhesive agent in which thermal conductivity is equal to 0.2 W/m·k ($0.48 \times 10^{-3}$ cal/cm·sec·° C.) and it is extremely bad. The temperature of the secondary battery 201 rises with the lapse of time and the temperature of the secondary battery 201 at the end of the discharge is equal to about 61.6° C.

The temperature curve (c) shows a temperature change when the adhesive agent whose thermal conductivity is equal to 0.4 W/m·k ($0.96 \times 10^{-3}$ cal/cm·sec·° C.) is used. According to this adhesive agent, an amount of metal powder (aluminum powder) is equal to 20 wt %, an amount of silicone is equal to 80 wt %, adhesive strength is equal to or more than 2 MPa, and a volume is not expanded upon drying. The temperature of the secondary battery 201 rises with the lapse of time and the temperature of the secondary battery 201 at the end of the discharge is equal to about 60.2° C.

The temperatures of the secondary battery 201 at the end of the discharge differ depending on the difference of the thermal conductivity of the adhesive agent as mentioned above. In the embodiment, therefore, in order to allow the temperature protecting device 202 to more strongly and thermally couple the secondary battery 201 and the voltage converter 203, for example, an adhesive agent whose thermal conductivity is equal to or more than 0.4 W/m·k ($0.96 \times 10^{-3}$ cal/cm·sec·° C.) is used as an adhesive agent having high thermal conductivity.

Although the voltages which are outputted from the battery pack are set to two different voltages in the embodiment, three or more different voltages can be outputted. In this case, a plurality of voltage converters can be provided or a plurality of different voltages can be also outputted from one voltage converter.

According to the 8th to 11th embodiments of the invention, since the temperature protecting devices of the voltage converters and the secondary battery which have conventionally been needed can be constructed as a single device, the battery pack can be miniaturized and the costs can be reduced.

Further, according to the invention, since the heat generation of the voltage converter is radiated to the secondary battery through the temperature protecting device, an increase in temperature of the voltage converter can be suppressed. According to an electromagnetic transformer, since electromagnetic induction efficiency at a lower temperature is higher, by suppressing the temperature as mentioned above, the converting efficiency of the voltage converter can be improved. Since the secondary battery can be constructed as a heat sink of the voltage converter, the radiator for the voltage converter which has been needed hitherto can be deleted, the battery pack can be miniaturized, and the costs can be reduced.

Figure 30:
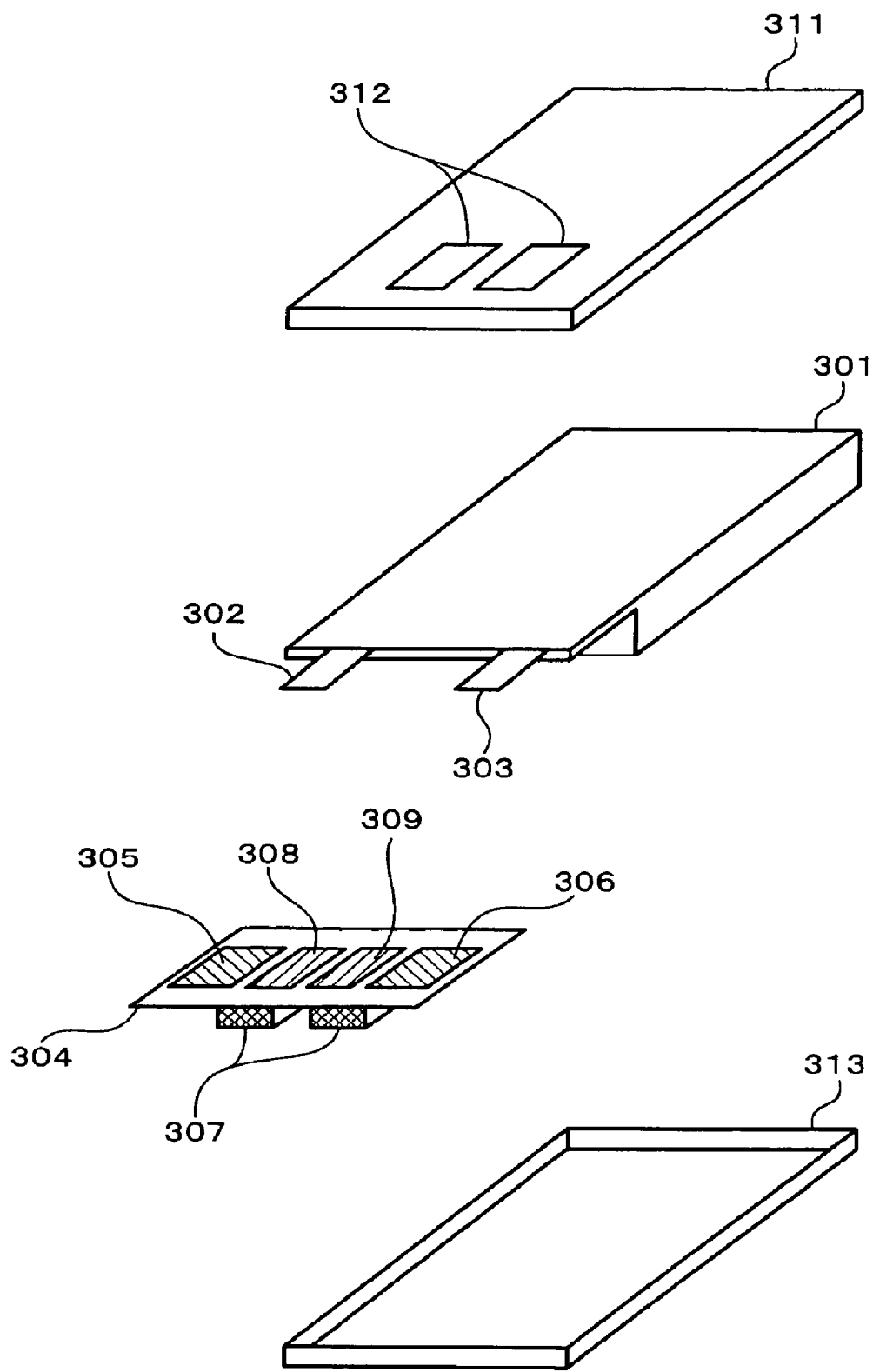
FIG. 30 is a constructional diagram of a conventional battery pack.

The 12th to 16th embodiments of the invention will be described hereinbelow with reference to the drawings. First, to make an explanation of the invention easy, a construction of the conventional battery pack will be described. FIG. 30 shows a conventional example of the battery pack. A plus electrode 302 and a minus electrode 303 are led out from a secondary battery 301. The plus electrode 302 is resistance-welded to a metal plate 305 provided on a circuit board 304. Similarly, the minus electrode 303 is resistance-welded to a metal plate 306 provided on the circuit board 304.

Electronic parts constructing a protecting circuit 307 to protect the secondary battery 301 against the overcharge and overdischarge are mounted on the circuit board 304. For example, an IC (Integrated Circuit), an FET (Field Effect Transistor), a capacitor, a resistor, and the like are mounted. Those electronic parts are soldered onto the circuit board 304. A plus external terminal 308 and a minus external terminal 309 are provided on the circuit board 304. The circuit board 304 is, for example, a glass epoxy board.

Notch portions 312 for exposing the plus external terminal 308 and the minus external terminal 309 are formed at two positions in an upper casing 311. The upper casing 311 and a lower casing 313 are fixedly bonded by ultrasonic welding. The upper casing 311 and the lower casing 313 can be also fixedly bonded with an adhesive agent or a double-sided adhesive tape. The upper casing 311 and the lower casing 313 have the same depth and are made of a material such as plastics.

Figure 31:
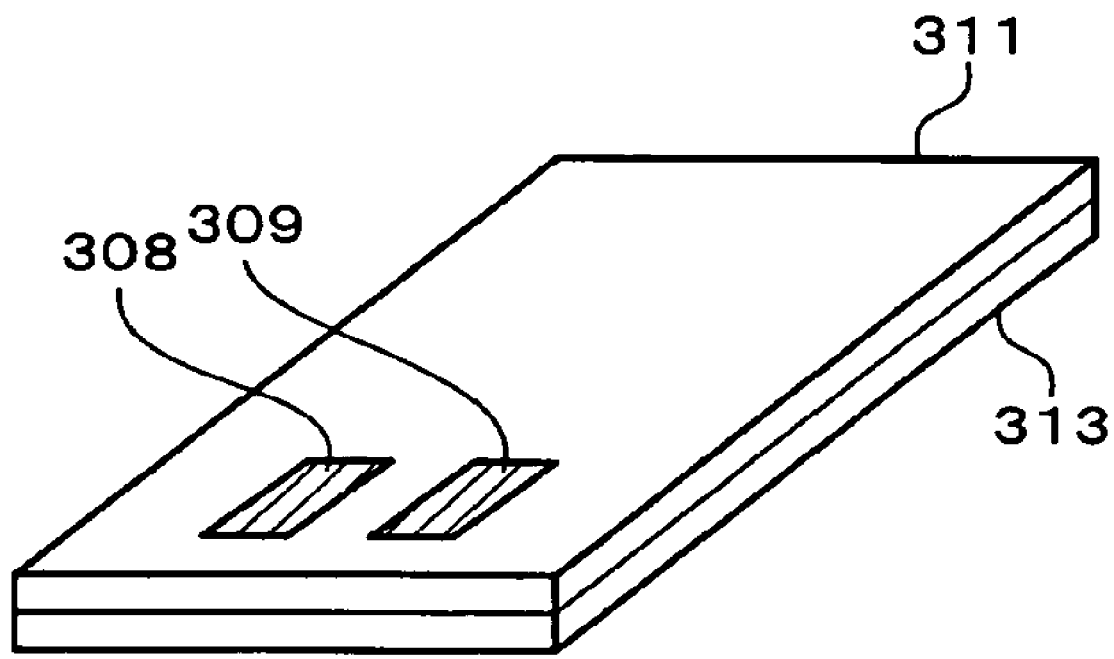
FIG. 31 is a constructional diagram of a conventional battery pack.

FIG. 31 shows an external view of a battery pack obtained by assembling those component parts. As shown in FIG. 31, the secondary battery 301 is covered with the upper casing 311 and the lower casing 313 and is not exposed. However, the plus external terminal 308 and the minus external terminal 309 are exposed from the notch portions 312 formed in two positions of the upper casing 311.

Figure 32:
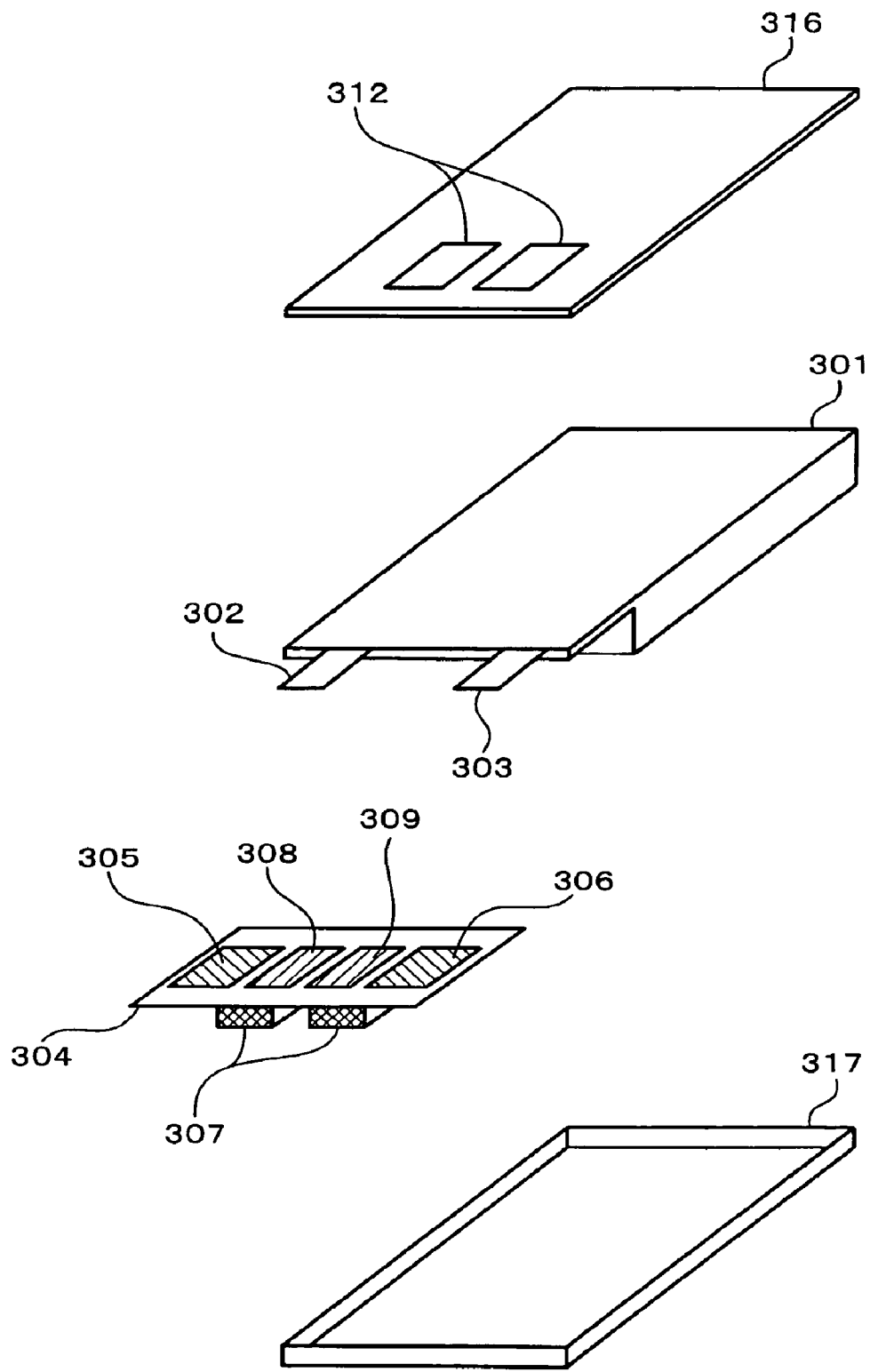
FIG. 32 is a constructional diagram of a conventional battery pack.

FIG. 32 shows another example of the conventional battery pack. An upper casing 316 of the battery pack shown in FIG. 32 is shallow and a lower casing 317 is deep. An almost plate-shaped casing can be applied as an upper casing 316.

Figure 33:
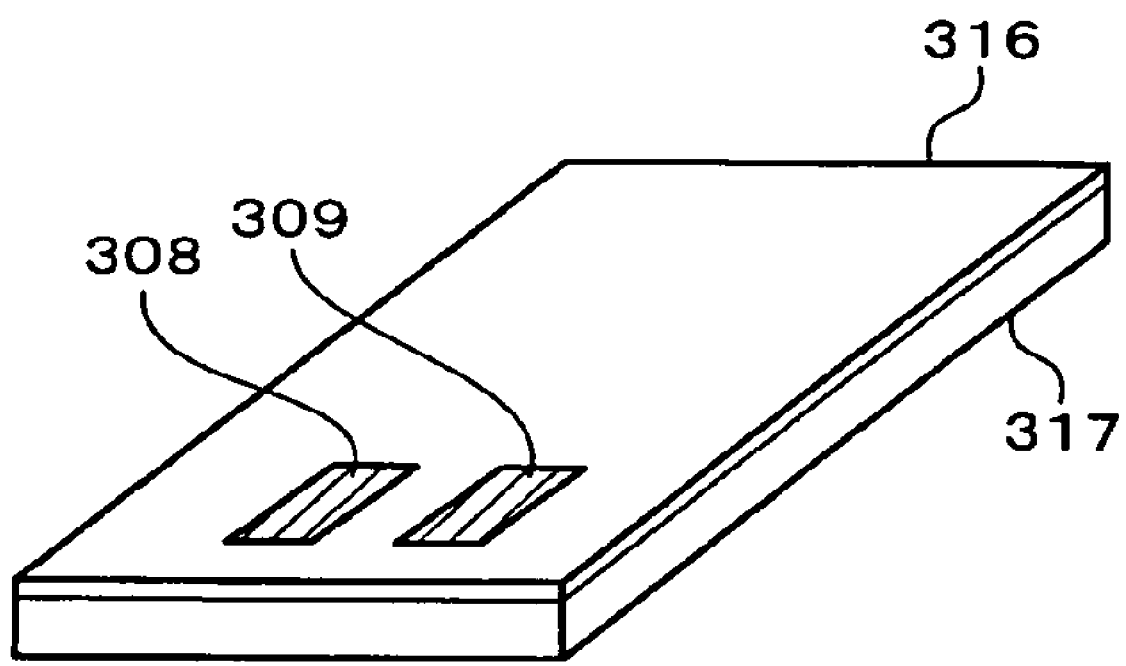
FIG. 33 is a constructional diagram of a conventional battery pack.

FIG. 33 shows an external view of a battery pack assembled by using the upper casing 316 and the lower casing 317. As shown in FIG. 33, the secondary battery 301 is covered with the upper casing 316 and the lower casing 317 and is not exposed. However, the plus external terminal 308 and the minus external terminal 309 are exposed from the notch portions 312 formed in two positions of the upper casing 316.

Figure 34:
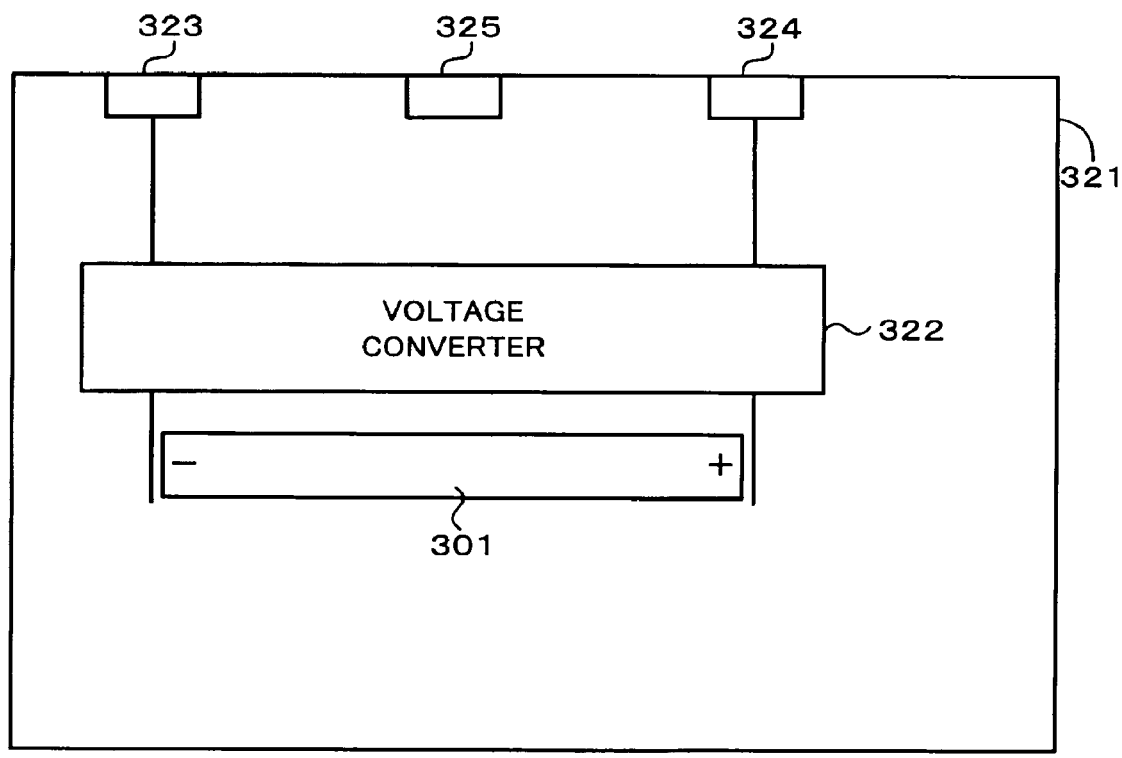
FIG. 34 is a schematic diagram for explaining an outline of a battery pack to which the invention is applied.

An outline of a battery pack to which the invention is applied will now be described with reference to FIG. 34. A battery pack 321 comprises the secondary battery 301 and a voltage converter 322 and external terminals 323, 324, and 325 are led out. A positive polarity and a negative polarity of the secondary battery 301 are connected to an input side of the voltage converter 322. An output side of the voltage converter 322 is connected to the external terminals 323 and 324.

For example, a lithium ion secondary battery, a lithium polymer secondary battery, a nickel hydrogen secondary battery, a nickel-cadmium secondary battery, a lithium metal secondary battery, or the like can be used as a secondary battery 301. In the case of the lithium ion secondary battery, for example, it is constructed as a rectangular battery and the whole secondary battery 301 is covered with a battery can of iron. In the case of the lithium polymer secondary battery, it is sealed with a laminated film of aluminum. A secondary battery of a kind which will be developed in the future can be also similarly used.

Any of various kinds of converters can be used as a voltage converter 322. For example, any of the following constructions can be used: a converter of a charger pump system using a capacitor and a switching element; a step-up converter (step-down converter) using a diode, an inductor, a capacitor, and a switching element; and a switching regulator using a transformer and a switching element. Further, a piezoelectric inverter using a piezoelectric transformer or a series regulator using a bipolar transistor device can be also used as a voltage converter 322.

In the embodiment, the voltage converter 322 is fixed to an outer mounting surface of the secondary battery 301 by an adhesive agent having high thermal conductivity, as will be explained hereinafter. The secondary battery 301 is used as a heat sink of the voltage converter 322.

Figure 35:
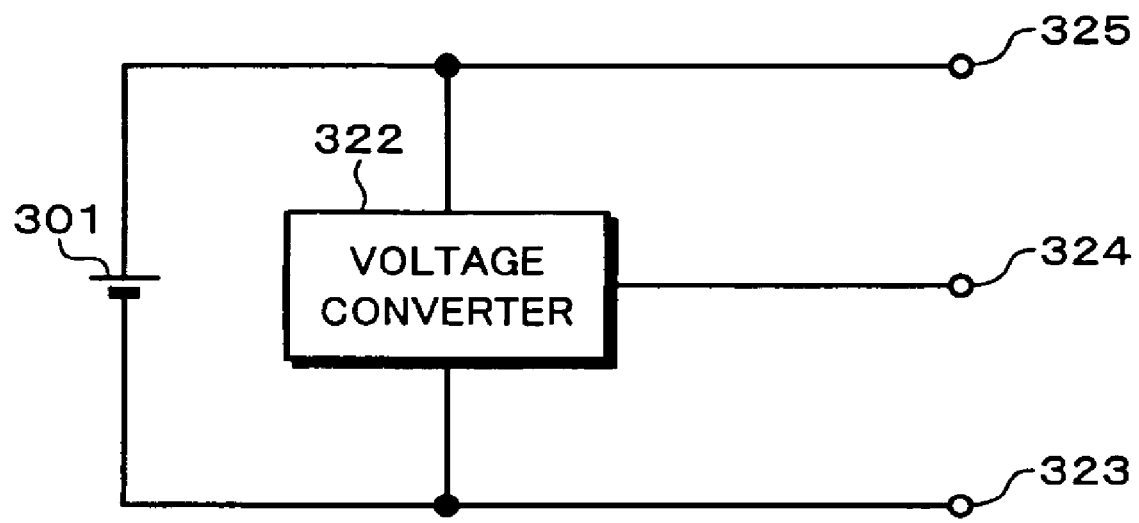
FIG. 35 is a circuit diagram for explaining an example of a circuit in an embodiment to which the invention is applied.

FIG. 35 shows an example of a circuit in this embodiment. The positive polarity of the secondary battery 301 and the external terminal 325 are connected and the negative polarity and the external terminal 323 are connected. The battery voltage of the secondary battery 301 is directly outputted between the external terminals 325 and 323. For example, as a battery voltage of the secondary battery 301, a voltage in a range from 2.5 to 4.3 V is set to a voltage value in a proper state, that is, a voltage value in the state of neither the overdischarge nor the overcharge.

One power terminal of the voltage converter 322 is connected to the positive polarity of the secondary battery 301 and the other power terminal is connected to the negative polarity of the secondary battery 301. In the following description, similarly, a DC voltage which is supplied to the power terminals of the voltage converter is an input DC voltage of the voltage converter. An output terminal of the voltage converter 322 is led out an external terminal 324. An output voltage which is controlled so as to be constant by the voltage converter 322 and whose value differs from the battery voltage is taken out between the external terminals 224 and 323.

The secondary battery 301 and the voltage converter 322 are coated with an adhesive agent of high thermal conductivity so as to be thermally coupled. Since the secondary battery are thermally coupled with the voltage converter by such an adhesive agent, it is used as a heat radiating plate and the voltage converter can be miniaturized.

Another example of a circuit in the embodiment will now be described with reference to FIG. 36. The positive polarity of the secondary battery 301 is connected to one power terminal of a voltage converter 326 for discharging and the negative polarity is connected to the other power terminal of the voltage converter 326. The negative polarity of the secondary battery 301 is connected to the external terminal 323. Two external terminals 327 and 328 at which different output voltages are taken out are led out from the voltage converter 326.

In the case where the battery voltage of the secondary battery 301 is equal to or less than a predetermined value, that is, the overdischarge occurs, the secondary battery 301 can be protected against the overdischarge by stopping the operation of the voltage converter 326.

An input terminal of a voltage converter 329 for charging is connected to an external terminal 330 to which the charge voltage is supplied and the other power terminal is connected to the external terminal 323. The other power terminal of the voltage converter 329 for charging is connected to the negative polarity of the secondary battery 301. An output terminal of the voltage converter 329 for charging is connected to the positive polarity of the secondary battery 301.

In the voltage converter 329 for charging, the charge voltage is supplied from the charger (not shown) through the external terminals 323 and 330 and the secondary battery 301 is charged in accordance with the supplied charge voltage.

Even if the voltage and current which cause the overcharge are supplied from the charger, since the optimum voltage and current can be supplied to the secondary battery 301 by the voltage converter 329 for charging, the secondary battery 301 can be protected against the overcharge.

Figure 36:
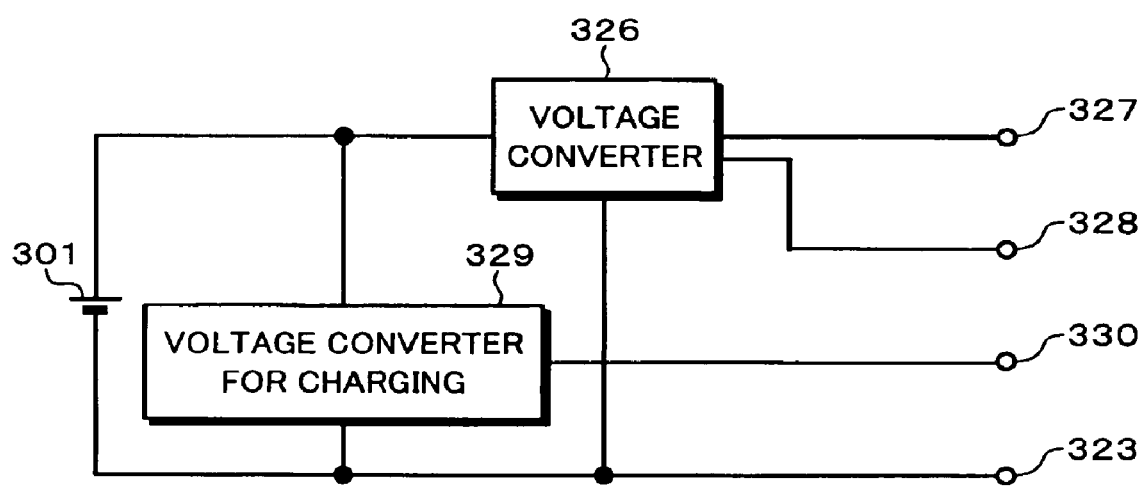
FIG. 36 is a circuit diagram for explaining another example of the circuit in the embodiment to which the invention is applied.

As mentioned above, in another example of the circuit shown in FIG. 36, the secondary battery 301 can be protected against the overdischarge by the voltage converter 326 and the secondary battery 301 can be protected against the overcharge by the voltage converter 329 for charging. Therefore, the FET for the discharge control and the FET for the charge control can be omitted.

Figure 37:
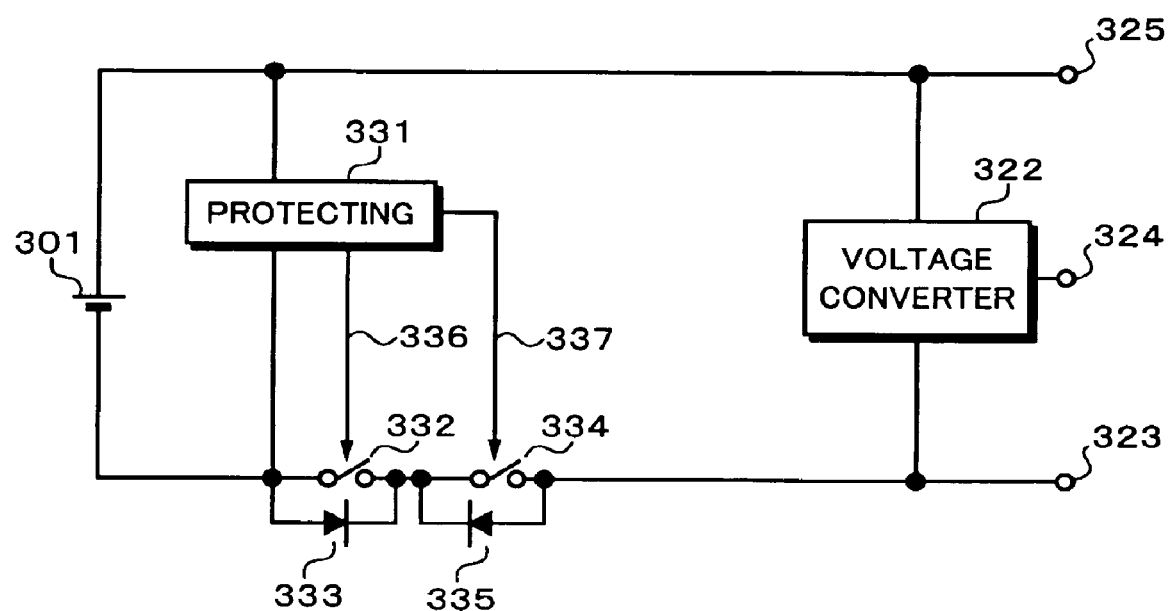
FIG. 37 is a circuit diagram for explaining further another example of the circuit in the embodiment to which the invention is applied.

FIG. 37 shows a construction of further another example of the circuit in the embodiment. The circuit of FIG. 37 is constructed by adding a protecting circuit for charging and a protecting circuit for discharging to the circuit of FIG. 35. The positive polarity of the secondary battery 301 and the external terminal 325 are connected and the negative polarity and the external terminal 323 are connected through a switch 332 for a discharge current and a switch 334 for a charge current. The battery voltage of the secondary battery 301 is directly outputted between the external terminals 325 and 323. For example, as a battery voltage of the secondary battery 301, a voltage in a range from 2.5 to 4.3 V is set to a voltage value in a proper state, that is, a voltage value in the state of neither the overdischarge nor the overcharge.

Each of the switches 332 and 334 is constructed by, for example, an n-channel type FET. Parasitic diodes 333 and 335 are connected in parallel with the switches 332 and 334. The switches 332 and 334 are controlled by a discharge control signal 336 and a charge control signal 337 from a protecting circuit 331, respectively.

The protecting circuit 331 has a general circuit construction. The switches 332 and 334 are controlled by the protecting circuit 331 and the protection against the overcharge, the overdischarge, and the overcurrent is performed. If the battery is in the normal state where the battery voltage is within the set voltage range, both the discharge control signal 336 and the charge control signal 337 are set to "1" (this means the logical level) and the switches 332 and 334 are turned on. Therefore, the discharge from the secondary battery 301 to the load and the charge from the charger to the secondary battery 301 can be freely executed.

When the battery voltage is lower than the set voltage range, the discharge control signal 336 is set to "0" (this means the logical level) and the switch 332 is turned off, thereby inhibiting the discharge current from flowing. After that, when the charger is connected, the battery is charged through the parasitic diode 333.

When the battery voltage is higher than the set voltage range, the charge control signal 337 is set to "0" and the switch 334 is turned off, thereby inhibiting the charge. The discharge to the load is performed through the parasitic diode 335.

Further, if the circuit between the external terminals 325 and 323 is short-circuited, there is a possibility that the overdischarge current flows and the FETs are broken. Therefore, when the discharge current reaches a predetermined current value, the discharge control signal 336 is set to "0" and the switch 332 is turned off, thereby inhibiting the discharge current from flowing.

One power terminal of the voltage converter 322 is connected to the positive polarity of the secondary battery 301 and the other power terminal is connected to the negative polarity of the secondary battery 301 through the switches 332 and 334. An output terminal of the voltage converter 322 is led out as an external terminal 324. An output voltage which is controlled so as to be constant by the voltage converter 322 and whose value differs from the battery voltage is taken out between the external terminals 324 and 323.

Figure 38A:
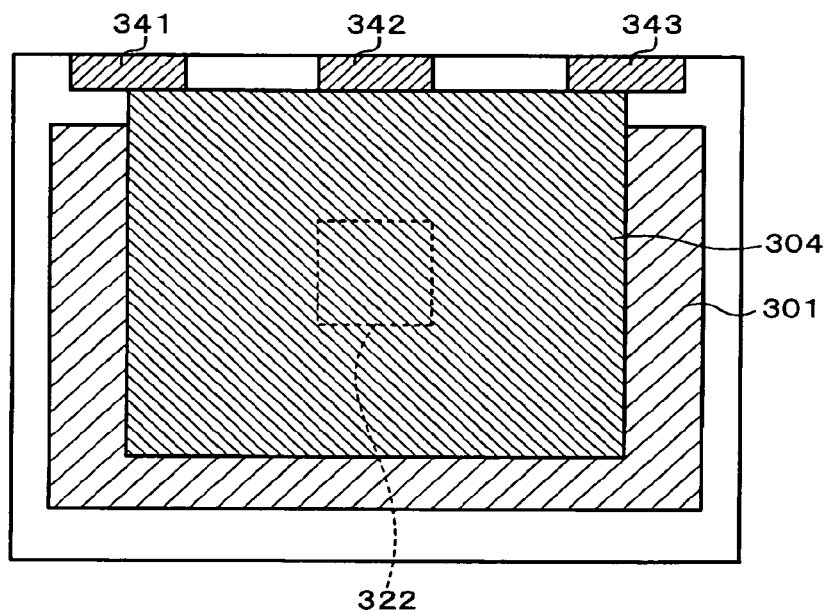
FIGS. 38A and 38B are constructional diagrams for explaining the 12th embodiment to which the invention is applied.
Figure 38B:
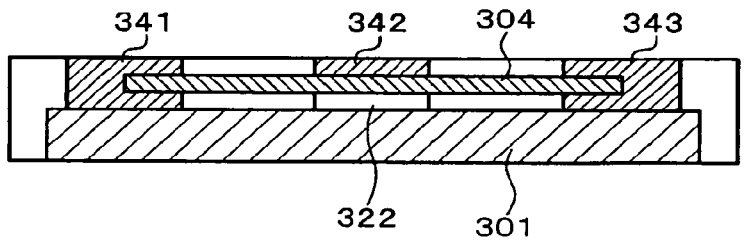

Several examples of the construction for thermally coupling the circuit portions such as a voltage converter 322 and the like as mentioned above with the secondary battery 301 will now be described. FIGS. 38A and 38B show the 12th embodiment of the invention. FIG. 38A shows a plan view of a battery pack and FIG. 38B shows a side elevational view of the battery pack. A plus external terminal 341 (external terminal 325), a voltage conversion external terminal 342 (external terminal 324), and a minus external terminal 343 (external terminal 323) are bonded to, for example, the circuit board 304 by soldering. The voltage converter 322 is arranged between the circuit board 304 and the secondary battery 301.

The battery pack is constructed so that the voltage converter 322 is come into contact with the outer mounting surface of the secondary battery 301 as mentioned above. The gap between the outer mounting surface of the secondary battery 301 and the voltage converter 322 is coated with the adhesive agent of the high thermal conductivity. Further, the gaps among the secondary battery 301, the circuit board 304, and the voltage converter 322 and the casing around them are filled with the filler of the high thermal conductivity as necessary.

Figure 39A:
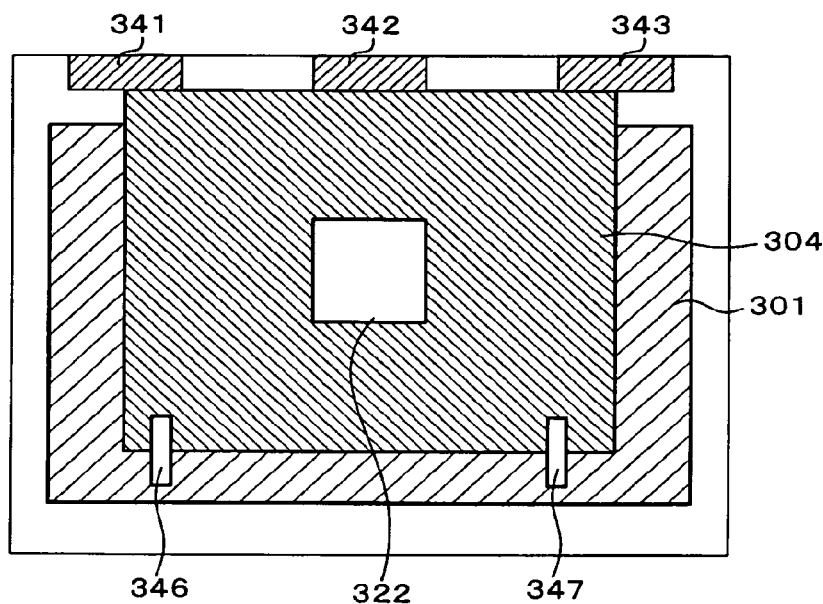
FIGS. 39A and 39B are constructional diagrams for explaining the 13th embodiment to which the invention is applied.
Figure 39B:
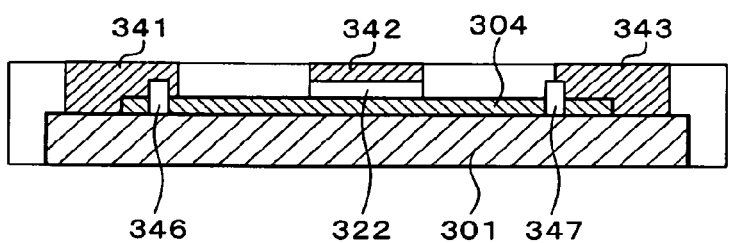

FIGS. 39A and 39B show the 13th embodiment of the invention. FIG. 39A shows a plan view of a battery pack and FIG. 39B shows a side elevational view of the battery pack. The secondary battery 301 and the circuit board 304 are connected through a plus terminal 346 and a minus terminal 347.

The battery pack is constructed so that the circuit board 304 on which the voltage converter 322 is mounted is come into contact with the outer mounting surface of the secondary battery 301. The gap between the secondary battery 301 and the circuit board 304 is coated with the adhesive agent of the high thermal conductivity. Further, the gaps among the secondary battery 301, the circuit board 304, and the voltage converter 322 and the casing around them are filled with the filler of the high thermal conductivity as necessary.

Figure 40:
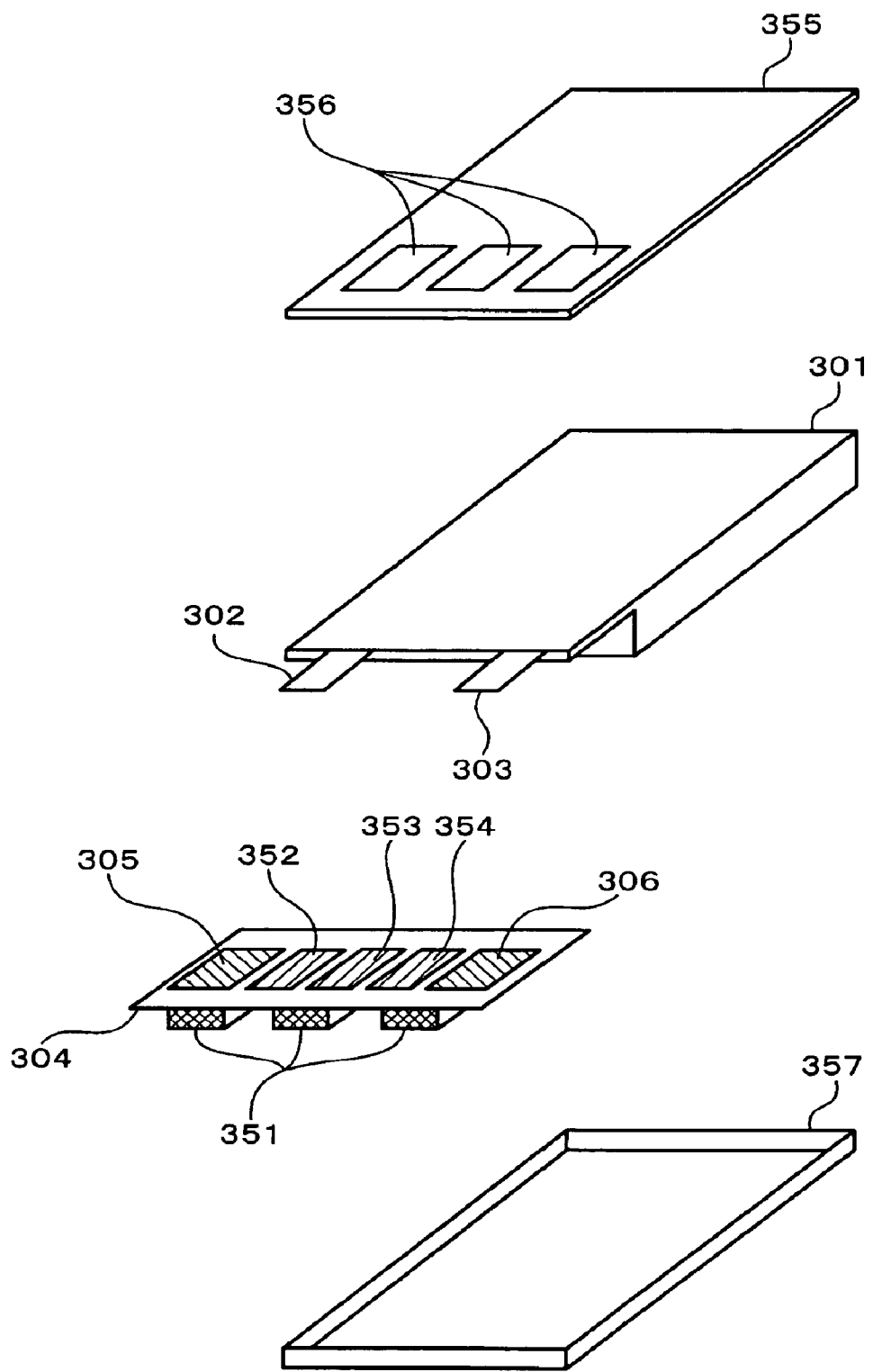
FIG. 40 is a constructional diagram for explaining the 14th embodiment to which the invention is applied.
Figure 41:
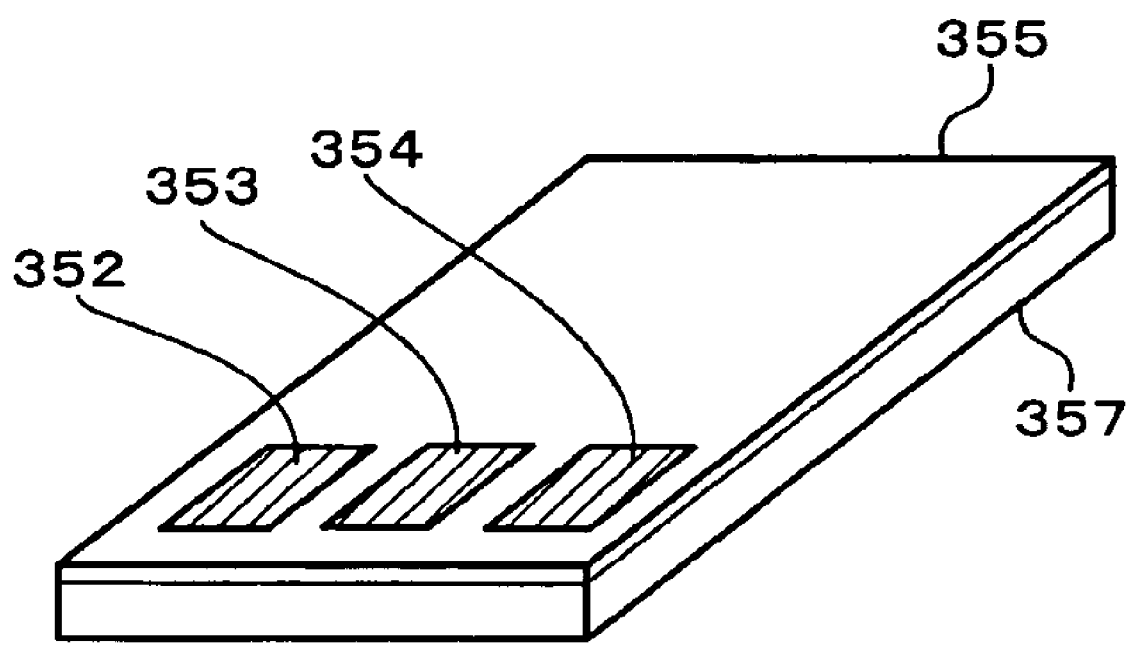
FIG. 41 is a constructional diagram for explaining the 14th embodiment to which the invention is applied.

FIGS. 40 and 41 show the 14th embodiment of the invention in which the invention is applied to the circuit example shown in FIG. 37. Electronic parts 351 constructing the protecting circuit for protecting the secondary battery 301 against the overcharge and overdischarge, for example, an FET, a capacitor, a resistor, a voltage converter, a choke coil, and the like are mounted on the circuit board 304 shown in FIG. 40. The voltage converter mounted on the circuit board 304 is the voltage converter 322.

A very small voltage converter in about 4 mm square has already been developed as a voltage converter of the charger pump system or a switching regulator. The voltage converter 322 can be relatively easily built in the battery pack as one of the electronic parts 351. Those electronic parts 351 are soldered onto the circuit board 304. A plus external terminal 352, a voltage conversion external terminal 353, and a minus external terminal 354 are provided on the circuit board 304.

Notch portions 356 for exposing the plus external terminal 352 (external terminal 325), the voltage conversion external terminal 353 (external terminal 324), and the minus external terminal 354 (external terminal 323) are formed at three positions in an upper casing 355. The upper casing 355 is shallow and a lower casing 357 is deep. An almost plate-shaped casing can be applied as an upper casing 355. The upper casing 355 and the lower casing 357 are fixedly bonded by ultrasonic welding. The upper casing 355 and the lower casing 357 can be also fixedly bonded with an adhesive agent or a double-sided adhesive tape. The upper casing 355 and the lower casing 357 are made of a material such as plastics.

FIG. 41 shows an external view of a battery pack assembled by those component parts. As shown in FIG. 41, the secondary battery 301 is covered with the upper casing 355 and the lower casing 357 and is not exposed. However, the plus external terminal 352, the voltage conversion external terminal 353, and the minus external terminal 354 are exposed from the notch portions 356 formed in three positions of the upper casing 355. As mentioned above, the secondary battery 301 and the voltage converter 322 are enclosed in the common casing.

According to the battery pack of the 14th embodiment, when it is filled with the filler of the high thermal conductivity upon assembling, since the lower casing 357 is deep, the filler hardly overflows to the outside. If the lower casing 313 is shallow as shown in FIGS. 30 and 31, there is such inconvenience that when a large quantity of filler is coated upon assembling, the filler overflows to the outside of the casing and an external appearance deteriorates. However, if the lower casing 357 is deep as shown in FIGS. 40 and 41, such inconvenience can be eliminated.

Since the secondary battery 301, the circuit board 304, the upper casing 355, and the lower casing 357 are fixed by filling the filler of the high thermal conductivity into the inside (gap) between the upper casing 355 and the lower casing 357 as mentioned above, the battery pack which is strong against a shock can be constructed. Further, since the portions near the circuit board 304 are coated with a large quantity of adhesive agent of the high thermal conductivity, the voltage converter 322 and the secondary battery 301 are thermally and more strongly coupled.

Although not shown, gaps, slits, or the like for heat radiation can be also formed in the upper casing 355 and the lower casing 357.

Since the resin of the high thermal conductivity is sealed into the battery pack as mentioned above, the casing and the contents can be integrated. Therefore, strength against vibration and drop can be improved and the battery pack which is stronger against the shock than the conventional battery pack can be realized. Further, since it is possible to avoid the entering of foreign matter from the outside, the short-circuit of the circuit in the battery pack can be avoided. Since the outflow of an organic electrolyte, that is, a liquid leakage of the battery can be prevented, it is possible to avoid that the organic electrolyte is adhered onto the circuit board. Consequently, the production of fire and the emission of smoke can be prevented.

Figure 42A:
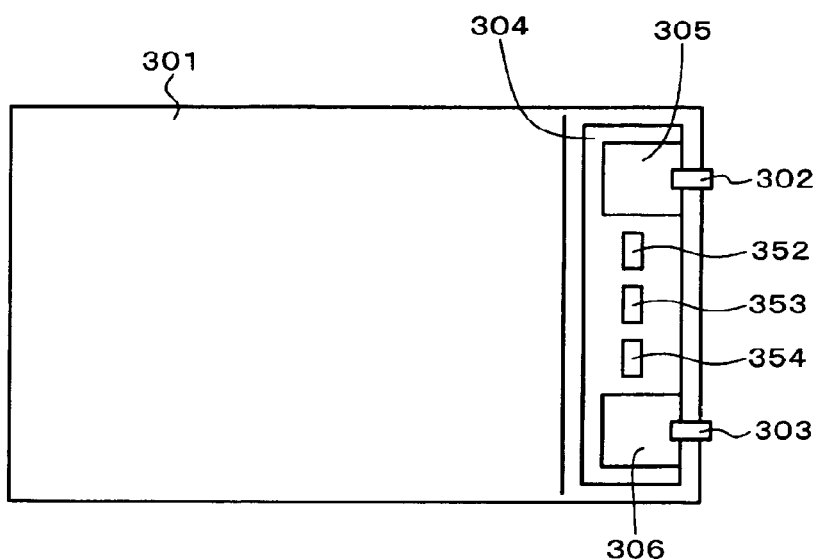
FIGS. 42A and 42B are external views for explaining the 15th embodiment to which the invention is applied.
Figure 42B:
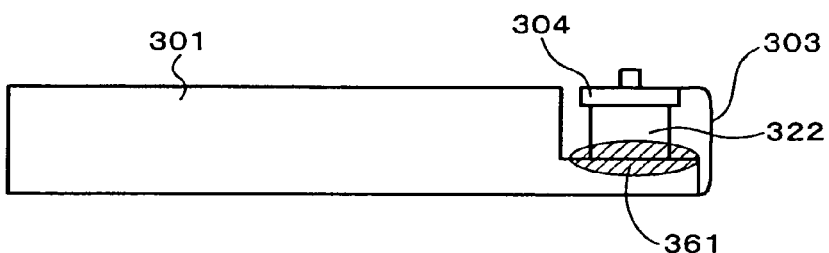

FIGS. 42A and 42B show external views of the 15th embodiment of the invention. FIG. 42A shows a plan view of the secondary battery 301 and the like and FIG. 42B shows a side elevational view of the secondary battery 301 and the like. As shown in FIGS. 42A and 42B, the voltage converter 322, a voltage detecting circuit, a semiconductor switch, and the like are provided on one surface of the circuit board 304. The plus external terminal 352, the voltage conversion external terminal 353, the minus external terminal 354, and the metal plates 305 and 306 are provided on the other surface of the circuit board 304. The plus electrode 302 and the minus electrode 303 which are led out from the secondary battery 301 are connected to the metal plates 305 and 306.

The voltage converter 322 and the like are arranged in a terrace portion 361 provided in an end portion of the secondary battery 301. In other words, the terrace portion 361 has such a size that the voltage converter 322 and the like provided on one surface of the circuit board 304 can be arranged. The terrace portion 361 is a deposited portion of the metal film, for example, the laminated film provided in the end portion of the secondary battery 301. To thermally and more strongly couple the secondary battery 301 with the voltage converter 322, the adhesive agent of the high thermal conductivity is coated between the terrace portion 361 and the voltage converter 322.

The gaps among the secondary battery 301, the circuit board 304, and the voltage converter 322 and the casing around them can be also filled with the filler of the high thermal conductivity as necessary.

Figure 43A:
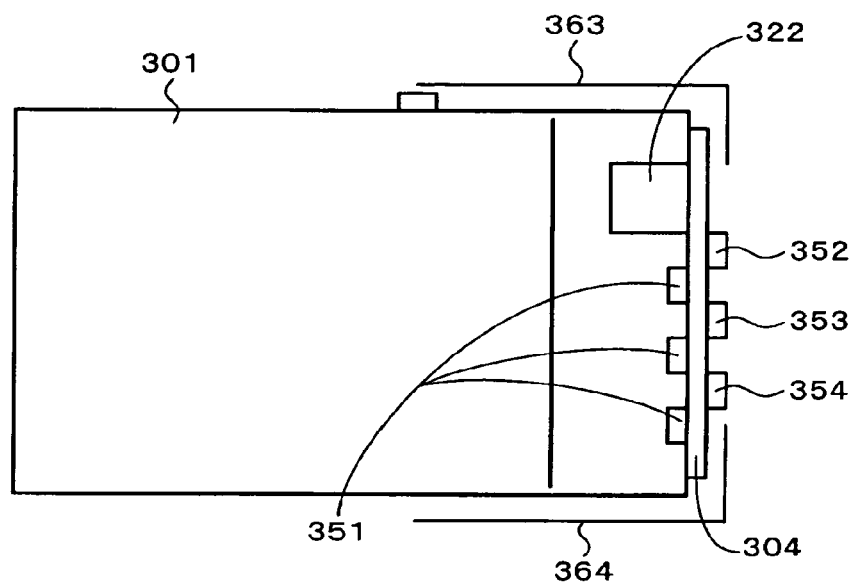
FIGS. 43A and 43B are external views for explaining the 16th embodiment to which the invention is applied.
Figure 43B:
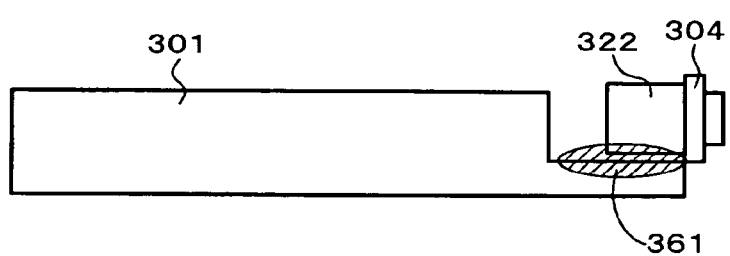

FIGS. 43A and 43B show external views of the 16th embodiment of the invention. FIG. 43A shows a plan view of the secondary battery 301 and the like and FIG. 43B shows a side elevational view of the secondary battery 301 and the like. Tabs 363 and 364 are omitted in FIG. 43B. As shown in FIGS. 43A and 43B, the voltage converter 322, the voltage detecting circuit, the semiconductor switch, and the like are provided on one surface of the circuit board 304. The plus external terminal 352, the voltage conversion external terminal 353, the minus external terminal 354, and the like are provided on the other surface of the circuit board 304.

The voltage converter 322 and the like are arranged in the terrace portion 361 provided in the end portion of the secondary battery 301. In other words, the terrace portion 361 has such a size that the voltage converter 322 and the like provided on one surface of the circuit board 304 can be arranged. The terrace portion 361 is a deposited portion of the metal film, for example, the laminated film provided in the end portion of the secondary battery 301. To thermally and more strongly couple the secondary battery 301 with the voltage converter 322, the adhesive agent of the high thermal conductivity is coated between the terrace portion 361 and the voltage converter 322.

The metal plate 305 (not shown) provided on the other surface of the circuit board 304 and the negative polarity of the secondary battery 301 are connected through the tab 363. For example, the tab 363 is subjected to the resistance welding, spot welding, or the like and connected to the metal plate 305 and the negative polarity of the secondary battery 301. Similarly, the metal plate 305 (not shown) provided on the other surface of the circuit board 304 and the negative polarity of the secondary battery 301 are connected through the tab 364. For example, the tab 364 is subjected to the resistance welding, spot welding, or the like and connected to the metal plate 305 and the negative polarity of the secondary battery 301.

The gaps among the secondary battery 301, the circuit board 304, and the voltage converter 322 and the casing around them can be also filled with the filler of the high thermal conductivity as necessary.

Figure 44:
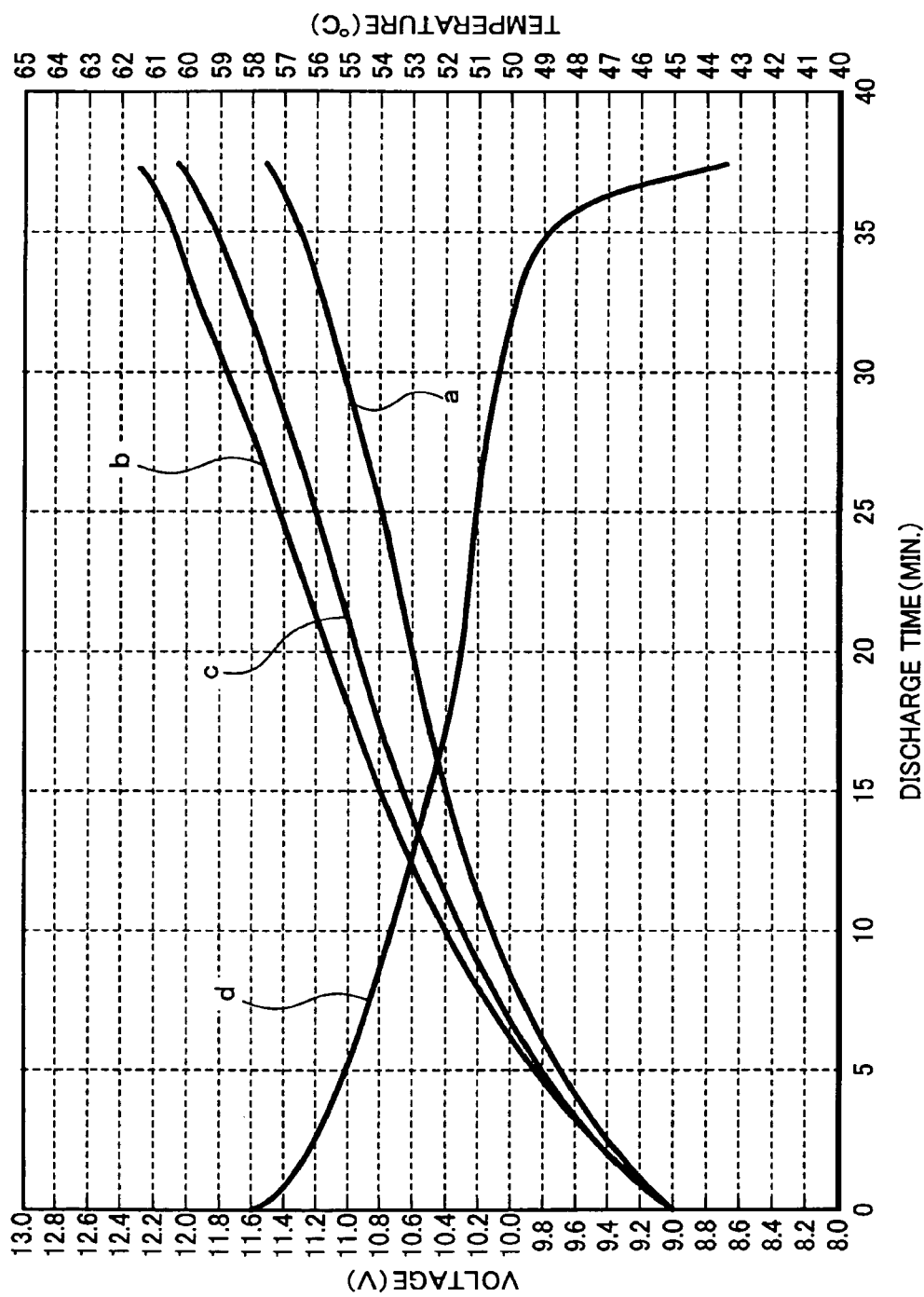
FIG. 44 is a characteristics diagram for explaining fillers which are applied to the invention.

The adhesive agent and the filler which are used in the embodiment will now be described. A characteristics diagram shown in FIG. 44 shows temperature curves (a, b, and c) of the secondary battery 301 in the case where the gap between the casing and the secondary battery 301 is coated with the adhesive agent and the discharge of the high load current of 5.8 A at an atmospheric temperature of 45° C. as an ambient temperature of the battery pack is executed and a voltage curve (d) of the voltage between the plus external terminal 352 and the minus external terminal 354 of the battery pack, respectively.

The temperature curve (a) shows a temperature change when the adhesive agent "SC901" made by Sony Chemical Co., Ltd. is used. "SC901" is the silicone adhesive agent in which thermal conductivity is equal to 0.84 W/m·k ($2.0 \times 10^{-3}$ cal/cm·sec·° C.), a specific gravity is equal to 1.65, an amount of metal powder (aluminum powder) is equal to 50 wt %, adhesive strength (tensile strength) is equal to 2.9 MPa, and a volume is not expanded upon drying. The temperature of the secondary battery 301 rises with the lapse of time and the temperature of the secondary battery 301 at the end of the discharge is equal to about 57.6° C.

The temperature curve (b) shows a temperature change when the adhesive agent "Super X" made by Cemedine Co., Ltd. is used. "Super X" is the adhesive agent in which thermal conductivity is equal to 0.2 W/m·k ($0.48 \times 10^{-3}$ cal/cm·sec·° C.) and it is extremely bad. The temperature of the secondary battery 301 rises with the lapse of time and the temperature of the secondary battery 301 at the end of the discharge is equal to about 61.6° C.

The temperature curve (c) shows a temperature change when the adhesive agent whose thermal conductivity is equal to 0.4 W/m·k ($0.96 \times 10^{-3}$ cal/cm·sec·° C.) is used. According to this adhesive agent, an amount of metal powder (aluminum powder) is equal to 20 wt %, an amount of silicone is equal to 80 wt %, adhesive strength is equal to or more than 2 MPa, and a volume is not expanded upon drying. The temperature of the secondary battery 301 rises with the lapse of time and the temperature of the secondary battery 201 at the end of the discharge is equal to about 60.2° C.

The temperatures of the secondary battery 301 at the end of the discharge differ depending on the difference of the thermal conductivity of the adhesive agent as mentioned above. In the embodiment, therefore, in order to more strongly and thermally couple the voltage converter 322 and the secondary battery 301, for example, an adhesive agent whose thermal conductivity is equal to or more than 0.4 W/m·k ($0.96 \times 10^{-3}$ cal/cm·sec·° C.) is used as an adhesive agent of the high thermal conductivity.

Several examples of the adhesive agent and the filler which are used in the embodiment are shown below. First, "SE4445CV A/B" made by Toray Dow Corning Silicone Co., Ltd. can be mentioned as an example of silicone gel for heat radiation of the 2-liquid thermo-setting type. This "SE4445CV A/B" is a plate-shaped gel sheet manufactured by a method whereby it is poured into a die, heated for a long time, and hardened. The formed hard matter sheet is of a flame resistive type which is excellent in adhesion, trackability, and stickness. Its thermal conductivity is equal to or more than 1.26 W/m·k and this sheet is also excellent in electrical insulation performance. Therefore, it can cope with various gaps (clearances).

"SE9184 WHITE RTV" made by Toray Dow Corning Silicone Co., Ltd. can be given as an example of the 1-component type room temperature hardening type silicone adhesive agent. According to this adhesive agent, thermal conductivity is high to be equal to 0.84 W/m·k ($2.0 \times 10^{-3}$ cal/cm·sec·° C.) and it is also excellent in heat radiation performance. Volume resistivity is equal to $1.0 \times 10^{15}$ Ω·cm and it is excellent in electrical insulation performance.

"TSE3843-W" made by GE Toshiba Silicone Co., Ltd. can be given as an example of liquid silicone rubber of the 1-component oxime type. After the silicone rubber "TSE3843-W" is coated and dried, it is solidified. Thermal conductivity is high to be equal to 0.8 W/m·k ($1.9 \times 10^{-3}$ cal/cm·sec·° C.) and it is also excellent in heat radiation performance. Volume resistivity is equal to $2 \times 10^{15}$ Ω·cm and it is excellent in electrical insulation performance. Merely by extruding such silicone rubber from a tube, it is hardened at room temperature and becomes a rubber-like elastic material.

The lambda gel (λGEL) made by Gel Tech Co., Ltd. can be given as an example of the gel-shaped plate. According to this lambda gel, thermal conductivity is high to be equal to 1.8 W/m·k and it is also excellent in heat radiation performance. Volume resistivity is equal to $3.4 \times 10^{12}$ Ω·cm and it is excellent in electrical insulation performance. Since it is in a gel shape, it buries the gaps of the concave and convex parts and adheres to them. No air layer is formed on a contact surface.

"SE4486" made by Toray Dow Corning Silicone Co., Ltd. can be given as an example of the adhesive agent. Thermal conductivity of "SE4486" is high to be equal to 1.59 W/m·k ($3.8 \times 10^{-3}$ cal/cm·sec·° C.).

For example, a thermal conductive double-sided adhesive tape "No. 7090" made by Teraoka Seisakusho Co., Ltd. can be given as an example of the double-sided adhesive tape. Thermal conductivity of this thermal conductive double-sided adhesive tape "No. 7090" is equal to $1.0 \times 10^{-3}$ cal/cm·sec·° C.).

By using the adhesive agent of the high thermal conductivity as mentioned above, the voltage converter 322 and the secondary battery 301 provided on the circuit board 304 can be more strongly and thermally coupled.

Although the voltages which are outputted from the battery pack are set to two different voltages in the embodiment, three or more different voltages can be outputted. In this case, a plurality of voltage converters can be provided on the circuit board or a plurality of different voltages can be also outputted from one voltage converter.

According to the 12th to 16th embodiments of the invention, by thermally coupling the secondary battery and the voltage converter, the heat generation of the voltage converter can be suppressed. Since the secondary battery can be used as a heat sink of the voltage converter as mentioned above, the voltage converter can be miniaturized. Since the heat generation of the voltage converter is supplied to the secondary battery, low-temperature characteristics of the secondary battery can be improved.

Further, According to invention, by thermally coupling the secondary battery and the voltage converter, the voltage converter which is needed in the electronic apparatus can be miniaturized. Therefore, even if it is built in the battery pack, the battery pack whose size is almost equal to that of the conventional battery pack can be realized. Since the voltage detecting circuit, the semiconductor switch, and the like needed in the conventional battery pack can be made unnecessary, the costs can be reduced.

As many apparently widely different embodiments of the present invention can be made without departing from the spirit and scope thereof, it is to be understood that the invention is not limited to the specific embodiments except as defined in the Claims.

What is claimed is:

1. A battery pack having a secondary battery therein, comprising:
    one or more voltage converters;
    a discharge control FET to permit or shut off a discharge of said secondary battery in accordance with a first signal which is supplied to a gate terminal of said discharge control FET;
    a charge control FET to permit or shutoff a charge of said secondary battery in accordance with a second signal which is supplied to a gate terminal of said charge control FET;
    a protecting circuit to permit output of the first signal that permits the discharge to said gate terminal of said discharge control FET when a battery voltage of said secondary battery is equal to or more than a lower limit value in a rated voltage range of said secondary battery or to permit output of the second signal that permits the discharge to said gate terminal of said charge control FET when the voltage of said secondary battery is equal to or less than an upper limit value in the rated voltage range of said secondary battery;
    an output terminal of said voltage converter connected to at least either the gate terminal of said discharge control FET or the gate terminal of said charge control FET;
    a first switch for the discharge control FET connected between the output terminal of said voltage converter and the gate terminal of said discharge control FET;
    a second switch for the charge control FET connected between the output terminal of said voltage converter and the gate terminal of said charge control FET;
    a first resistor connected between an output terminal of said protecting circuit from which the signal to permit said discharge is outputted and the gate terminal of said discharge control FET;
    a first diode anode connected to the output terminal of said voltage converter;
    a first diode cathode connected to one terminal of said first switch for the discharge control FET;
    a second resistor connected between the output terminal of said protecting circuit from which the signal to permit said charge is outputted and the gate terminal of said charge control FET;
    a second diode anode connected to the output terminal of said voltage converter; and
    a second diode cathode connected to one terminal of said second switch for the charge control FET.

2. The battery pack according to claim 1, wherein if the gate terminal of said discharge control FET is connected to the output terminal of said voltage converter in a predetermined range that is equal to or more than said lower limit value, then an output voltage which is supplied to said output terminal is higher than the battery voltage of said secondary battery.

3. The battery pack according to claim 1, wherein if the gate terminal of said charge control FET is connected to the output terminal of said voltage converter in a predetermined range that is equal to or less than said upper limit value, then the output voltage which is supplied to said output terminal is higher than the battery voltage of said secondary battery.

4. The battery pack according to claim 1, wherein:
    said first switch for the discharge control FET includes a first n-channel type FET, a first p-channel type FET, and a third resistor,
    said second switch for the charge control FET includes a second n-channel type FET, a second p-channel type FET, and a fourth resistor,
    the cathode of said first diode is connected to a source terminal of said first p-channel type FET of said first switch for the discharge control FET,
    the gate terminal of said discharge control FET is connected to a drain terminal of said first p-channel type FET of said first switch for the discharge control FET,
    both end terminals of said third resistor are respectively connected to the source terminal and a gate terminal of said first p-channel type FET of said first switch for the discharge control FET,
    the gate terminal of said first p-channel type FET of said switch for the discharge control FET is connected to a drain terminal of said first n-channel type FET of said first switch for the discharge control FET, a gate terminal of said first n-channel type FET of said first switch for the discharge control FET is connected to the output terminal of said protecting circuit from which the signal to permit said discharge is outputted, a source terminal of said first n-channel type FET of said first switch for the discharge control FET is connected to a minus terminal of said secondary battery, the cathode of said second diode is connected to a source terminal of said second p-channel type FET of said second switch for the charge control FET, the gate terminal of said charge control FET is connected to a drain terminal of said second p-channel type FET of said second switch for the charge control FET, both end terminals of said fourth resistor are respectively connected to the source terminal and a gate terminal of said second p-channel type FET of said second switch for the charge control FET, the gate terminal of said second p-channel type FET of said second switch for the charge control FET is connected to a drain terminal of said second n-channel type FET of said switch for the charge control FET, a gate terminal of said second n-channel type FET of said second switch for the charge control FET is connected to the output terminal of said protecting circuit from which the signal to permit said charge is outputted, and a source terminal of said second n-channel type FET of said second switch for the charge control FET is connected to the minus terminal of said secondary battery.

5. The battery pack according to claim 1, further comprising:

a cathode of a third diode connected to one terminal of said first resistor;

an anode of said third diode connected to the output terminal of said protecting circuit from which the signal to permit said discharge is outputted;

a cathode of a fourth diode connected to one terminal of said second resistor;

an anode of said fourth diode connected to the output terminal of said protecting circuit from which the signal to permit said charge is outputted;

a third resistor having end terminals respectively connected to the gate terminal and a source terminal of said discharge control FET; and a fourth resistor having end terminals respectively connected to the gate terminal and a source terminal of said charge control FET.

6. A battery pack having a secondary battery therein, comprising:

one or more voltage converters;

a discharge control FET to permit or shut off a discharge of said secondary battery in accordance with a first signal which is supplied to a gate terminal;

a charge control FET to permit or shut off a charge of said secondary battery in accordance with a second signal which is supplied to a gate terminal;

a voltage comparator to compare an output voltage of said voltage converter with a voltage of said secondary battery and to output a result of the comparison as a voltage comparison signal;

a first switch for the discharge control FET to control the supply of the signal of the voltage of said secondary battery to the gate terminal of said discharge control FET;

a second switch for the discharge control FET to control the supply of the signal of the output voltage of said voltage converter to the gate terminal of said discharge control FET;

a first switch for the charge control FET to control the supply of the signal of the voltage of said secondary battery to the gate terminal of said charge control FET;

a second switch for the charge control FET to control the supply of the signal of the output voltage of said voltage converter to the gate terminal of said charge control FET; and a protecting circuit to permit output of the first signal that permits the discharge to said gate terminal of said discharge control FET when the voltage of said secondary battery is equal to or more than a lower limit value in a rated voltage range of said secondary battery, or to permit output of the second signal that permits the discharge to said gate terminal of said charge control FET when the voltage of said secondary battery is equal to or less than an upper limit value in the rated voltage range of said secondary battery, wherein, said protecting circuit receives the voltage comparison signal from said voltage comparator and controls opening or closure of each of said first switch for the discharge control FET, said second switch for the discharge control FET, said first switch for the charge control FET, and said second switch for the charge control FET so as to output the first signal to permit the discharge or to output the second signal to permit the charge by using the higher one of the output voltage of said voltage converter and the voltage of said secondary battery.

7. The battery pack according to claim 6, further comprising:

a first resistor having end terminals respectively connected to the gate terminal and a source terminal of said discharge control FET;

a first capacitor having end terminals respectively connected to the gate terminal and the source terminal of said discharge control FET;

a second resistor having end terminals respectively connected to the gate terminal and a source terminal of said charge control FET; and a second capacitor having end terminals respectively connected to the gate terminal and the source terminal of said charge control FET.

8. The battery pack according to claim 6, further comprising:

a first resistor arranged between said second switch for the discharge control FET and an output terminal of said voltage comparator;

a second resistor arranged between said second switch for the charge control FET and the output terminal of said voltage comparator;

a third resistor having end terminals respectively connected to the gate terminal and a source terminal of said discharge control FET; and a fourth resistor having end terminals respectively connected to the gate terminal and a source terminal of said charge control FET.

* * * * *